US011507913B2

(12) United States Patent
Chung

(10) Patent No.: US 11,507,913 B2
(45) Date of Patent: Nov. 22, 2022

(54) SMART TERMINAL FACILITY AND METHOD SUITABLE FOR THE HANDLING OF CARGO CONTAINERS

(71) Applicant: Avante International Technology, Inc., Princeton Junction, NJ (US)

(72) Inventor: Kevin Kwong-Tai Chung, Princeton, NJ (US)

(73) Assignee: AVANTE INTERNATIONAL TECHNOLOGY, INC., Princeton Junction, NJ (US)

( * ) Notice: Subject to any disclaimer, the term of this patent is extended or adjusted under 35 U.S.C. 154(b) by 947 days.

(21) Appl. No.: 16/280,102

(22) Filed: Feb. 20, 2019

(65) Prior Publication Data
US 2020/0104790 A1  Apr. 2, 2020

Related U.S. Application Data

(60) Provisional application No. 62/747,234, filed on Oct. 18, 2018, provisional application No. 62/766,259, (Continued)

(51) Int. Cl.
*H04L 9/32* (2006.01)
*G06Q 10/08* (2012.01)
(Continued)

(52) U.S. Cl.
CPC ....... *G06Q 10/0833* (2013.01); *B65G 65/005* (2013.01); *G06F 16/29* (2019.01);
(Continued)

(58) Field of Classification Search
CPC ........ G06F 16/29; G06F 16/909; G06F 16/93; G06Q 10/0835; G06Q 10/0833;
(Continued)

(56) References Cited

U.S. PATENT DOCUMENTS 5,697,099 A  12/1997  Siska, Jr. et al.
6,657,543 B1  12/2003  Chung
(Continued)

FOREIGN PATENT DOCUMENTS

KR  10-2015-0056703  5/2015
WO  2006/020747  2/2006
(Continued)

OTHER PUBLICATIONS

International Searching Authority/US, "International Search Report and Written Opinion" International Application No. PCT/US2019/051958, dated Dec. 5, 2019, 15 pgs.
(Continued)

*Primary Examiner* — Tri M Tran
(74) *Attorney, Agent, or Firm* — Clement A. Berard, Esq.; Dann, Dorfman, Herrell & Skillman, PC

(57) ABSTRACT

A system and method for operating a terminal facility handling containers may comprise: a sensor set sensing containers entering and/or exiting the facility for providing container identification data and location data to a relational database; and container handling equipment having a sensor set for providing container identification data and location data to the database when a container is grasped and/or released. Sensors may sense when the equipment grasps and/or releases a container for storing a record thereof in the database, and/or geo-tagged identification data and location data relating to carriers that are to pick up and/or to deliver a container is received and stored as records in the database. The relational database contains records representing the current location of each container and each container handling equipment substantially in real time and can estimate arrival time.

42 Claims, 19 Drawing Sheets

Related U.S. Application Data filed on Oct. 10, 2018, provisional application No. 62/766,210, filed on Oct. 5, 2018, provisional application No. 62/766,124, filed on Oct. 2, 2018.

(51) Int. Cl.

| | | |
|---|---|---|
| *B65G 65/00* | (2006.01) | |
| *G06F 16/29* | (2019.01) | |
| *G06K 7/14* | (2006.01) | |
| *G06F 16/93* | (2019.01) | |
| *H04W 4/02* | (2018.01) | |
| *H04W 4/80* | (2018.01) | |
| *H04B 17/318* | (2015.01) | |

(52) U.S. Cl.
CPC .......... *G06F 16/93* (2019.01); *G06K 7/1404* (2013.01); *G06Q 10/0835* (2013.01); *H04L 9/3231* (2013.01); *H04W 4/026* (2013.01); *H04W 4/80* (2018.02); *H04B 17/318* (2015.01)

(58) Field of Classification Search
CPC ..... B65G 65/005; B65G 63/004; H04W 4/80; H04W 4/029; H04W 4/026; H04L 9/3231; H04B 17/318; G06K 7/1404
See application file for complete search history.

(56) References Cited

U.S. PATENT DOCUMENTS

| | | |
|---|---|---|
| 6,696,954 B2 | 2/2004 | Chung |
| 6,703,935 B1 | 3/2004 | Chung et al. |
| 6,883,710 B2 | 4/2005 | Chung |
| 6,943,688 B2 | 9/2005 | Chung et al. |
| 7,036,729 B2 | 5/2006 | Chung |
| 7,319,397 B2 | 1/2008 | Chung et al. |
| 7,342,497 B2 | 3/2008 | Chung et al. |
| 7,423,535 B2 | 9/2008 | Chung et al. |
| 7,513,425 B2 | 4/2009 | Chung |
| 7,839,289 B2 * | 11/2010 | Chung ............... G08B 13/08 340/572.4 |
| 9,286,511 B2 | 3/2016 | Chung et al. |
| 9,434,397 B2 | 9/2016 | Chung et al. |
| 9,452,597 B2 | 9/2016 | McMahan |
| 9,804,278 B2 | 11/2017 | Chung et al. |
| 9,937,938 B2 | 4/2018 | Chung et al. |
| 2006/0145812 A1* | 7/2006 | Sajkowsky ........ G06Q 20/4014 705/18 |
| 2006/0220851 A1* | 10/2006 | Wisherd ................ G01S 5/06 700/229 |
| 2006/0277666 A1 | 12/2006 | Gertsch |
| 2008/0091347 A1 | 4/2008 | Tashiro |
| 2009/0023421 A1 | 1/2009 | Parkulo |
| 2009/0231423 A1 | 9/2009 | Becker |
| 2012/0210498 A1 | 8/2012 | Mack |
| 2013/0215281 A1 | 8/2013 | Hobby |
| 2017/0267267 A1* | 9/2017 | Bollapragada .......... B66C 13/48 |
| 2018/0135989 A1* | 5/2018 | Schreier ............ G01C 21/3415 |
| 2018/0222505 A1 | 8/2018 | Chung |
| 2018/0249130 A1* | 8/2018 | Arena ............... H04M 1/72403 |

FOREIGN PATENT DOCUMENTS

| | | |
|---|---|---|
| WO | 2008/085511 | 7/2008 |
| WO | 2011/057306 | 5/2011 |

OTHER PUBLICATIONS

U.S. Department of Homeland Security, "Access Control Technologies Handbook" manual [online]. Sep. 2015 [retrieved Nov. 12, 2019] Retrieved from the internet: <URL:https://www.dhs.gov/sites/default/files/publications/ACT-HB_0915-508.pdf>; Section 3.3, 64 pages.
Reed, L., "Here's Where the Future of Biometrics is Headed"; article [online]. Sep. 18, 2017 [retrieved Nov. 12, 2019] Retrieved from the Internet: <URL:https://www.securitysales.com/emerging-tech/where-future-biometrics-headed/>; entire document, 8 pages.
Konecranes, "Industries Container Handling", © 2018, 9 pages, https://www.konecranes.com/industries/container-handling.

* cited by examiner

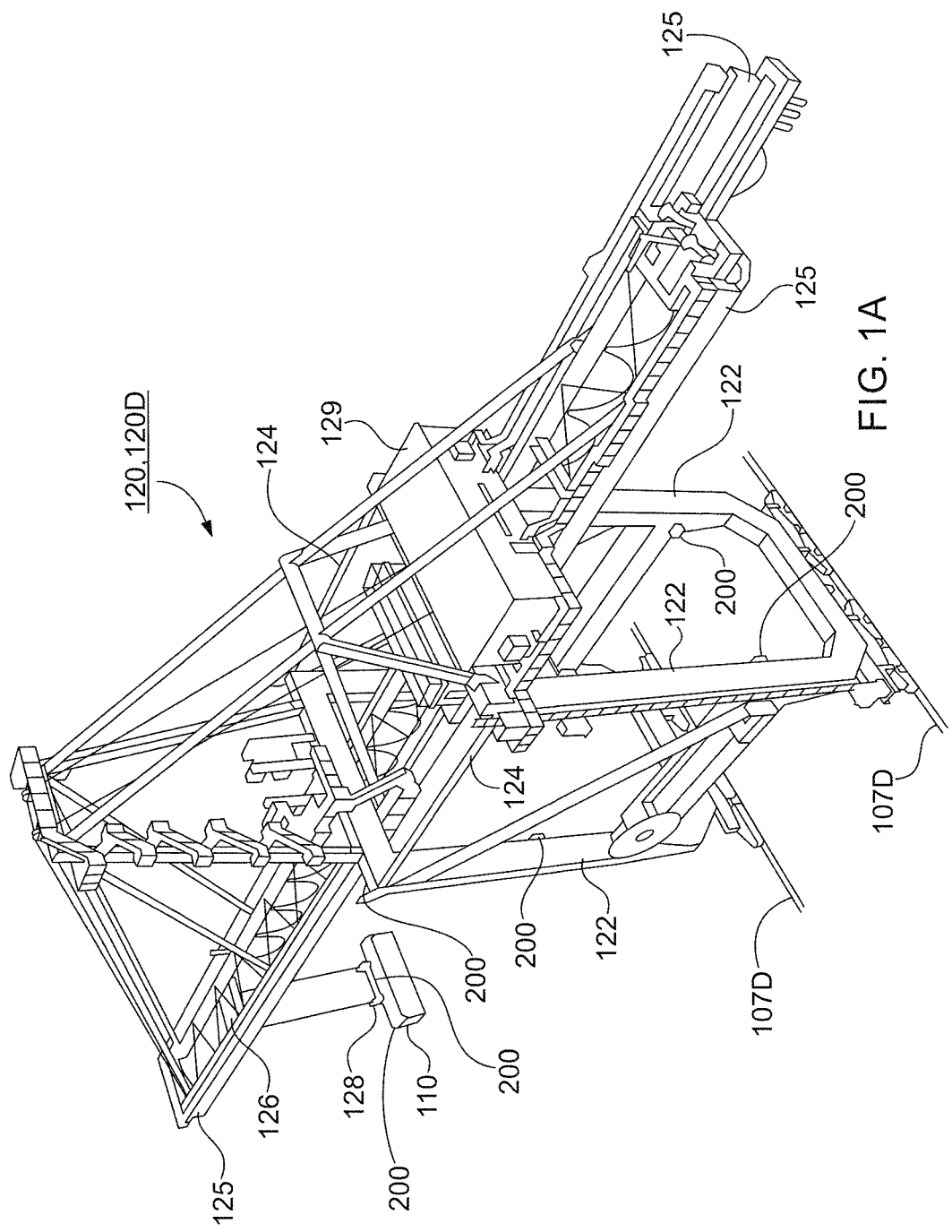

SMART TERMINAL FACILITY AND METHOD SUITABLE FOR THE HANDLING OF CARGO CONTAINERS

This application claims the benefit of U.S. Provisional Patent Application No. 62/747,234 filed Oct. 18, 2018, entitled "Real-Time Visibility of All Operating Assets and Machines, Containers-Trailers, Trucks and Drivers, Rail-Cars and Trains in a Smart Rail Terminal," of U.S. Provisional Patent Application No. 62/766,259 filed Oct. 10, 2018, entitled "Real-Time Visibility of All Operating Assets and Machines, Containers-Trailers, Trucks and Drivers, Rail-Cars and Trains in a Smart Rail Terminal," of U.S. Provisional Patent Application No. 62/766,210 filed Oct. 5, 2018, entitled "Real-Time Visibility of All Operating Assets and Machines, Containers-Trailers, Trucks and Drivers, Rail-Cars and Trains in a Smart Rail Terminal," and of U.S. Provisional Patent Application No. 62/766,124 filed Oct. 2, 2018, entitled "Real-Time Visibility of All Operating Assets and Machines, Containers-Trailers, Trucks and Drivers, Rail-Cars and Trains in a Smart Rail Terminal," each of which is hereby incorporated herein by reference in its entirety.

The present invention relates to a smart terminal facility and method and, in particular, to a smart terminal facility and method suitable for handling cargo containers and other containers.

Tens of millions of containers move around the world by ship, air, rail, roadway, and other modes of transport, with any particular container, and its cargo, typically moving over several modes of transport along its journey. During that journey, a container not only is carried by various modes of transport, but it also moves through various types and kinds of transfer and/or storage facilities whereat it may be loaded, unloaded, transferred between modes of transport, and/or stored, whether for a relatively short time or for a relatively longer time.

Accurately keeping track of these containers and their locations is a monumental task that can often overwhelm conventional trackers and record keepers. The task is made even more difficult due to the myriad of different containers and the myriad of different routes and locations through which they may be pass and be disposed in during their transport.

Conventional tracking of containers typically employs a bar code and/or other identifier that is marked on the exterior of a container that is entered into records of the carrier or transfer or storage facility, often manually by the operators thereof and their employees. This slows down handling of the containers, especially in locating containers in a large facility. Locating of containers is especially slow and burdensome when the recorded location of the container is erroneous or missing.

Applicant believes there may be a need for a smart facility and method for handling containers in which the accuracy of container location and tracking data can be more easily accessed and provided and/or operations managed thereby.

Accordingly, a system for a terminal facility for handling containers may comprise: container handling equipment for grasping, carrying and releasing containers; an equipment sensor set associated with each container handling equipment including an imaging device and/or an RFID reading device for providing container identification data when the container is proximate the container handling equipment, a locating device for providing location data of the container handling equipment, and communicating container identification data, container handling equipment location data and container handling equipment identification data to a relational database when the container handling equipment grasps and releases a container. Records of the identification data and location data for each container and for each container handling equipment at the terminal facility are stored in the relational database. The equipment sensor set further may include a load/unload sensor for sensing when the container handling equipment grasps a container and releases a container and communicating a record of the container identification data and the associated location data to the relational database, whereby the relational database contains data records representing the location of each container at the terminal facility substantially in real time; and/or geo-tagged identification data and location data relating to carrier vehicles that are to arrive at the terminal facility to pick up and/or deliver a container may be received and stored as records in the relational database, whereby the relational database contains data records from which arrival times of the carrier vehicles at the terminal facility can be estimated.

Further, a method for operating a terminal facility for handling containers, wherein container handling equipment associated with the terminal facility include a lifting head for grasping and releasing containers and an equipment sensor set for providing container identification data when the container is proximate the container handling equipment and location data representing the location of the container handling equipment, and for communicating container identification data, equipment location data and equipment identification data. The method for operating the terminal facility may comprise:

sensing a container entering and/or exiting the terminal facility including:
  imaging container identifying information and/or reading the container RFID device or both for providing container identification data from the container identifying information and/or the container RFID device when the container enters the terminal facility and exits the terminal facility, and
  communicating the container identification data and location data to a relational database at least when a container enters the terminal facility and exits the terminal facility;
operating the lifting head of the container handling equipment for grasping, carrying and releasing containers including:
  imaging container identifying information or reading the container RFID device or both for providing container identification data at least when the container handling equipment grasps a container and releases a container;
  providing location data representing the location of the container handling equipment at least when the container handling equipment grasps a container and releases a container; and
  communicating container identification data, container handling equipment location data and container handling equipment identification data to the relational database at least when the container handling equipment grasps a container and releases a container;
whereby records of the identification data and location data for each container and for each container handling equipment at the terminal facility are stored in the relational database;
the method further comprising:
  sensing when the container handling equipment grasps a container and when the container handling equipment releases a container, and causing a record of the container identification data and the associated then present location data to be communicated to and stored in the relational database, whereby the relational database contains data records representing the then current location of each container at the terminal facility substantially in real time;

and/or receiving geo-tagged identification data and location data relating to carrier vehicles that are to arrive at the terminal facility to pick up a container and/or to deliver a container, and storing the geo-tagged identification data and location data relating to carrier vehicles as records in the relational database, whereby the relational database contains data records from which arrival times of the carrier vehicles at the terminal facility can be estimated.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include:

FIGS. 1A through 1E are illustrations of example embodiments of equipment for loading, unloading and/or moving the example containers;

Figure 1:
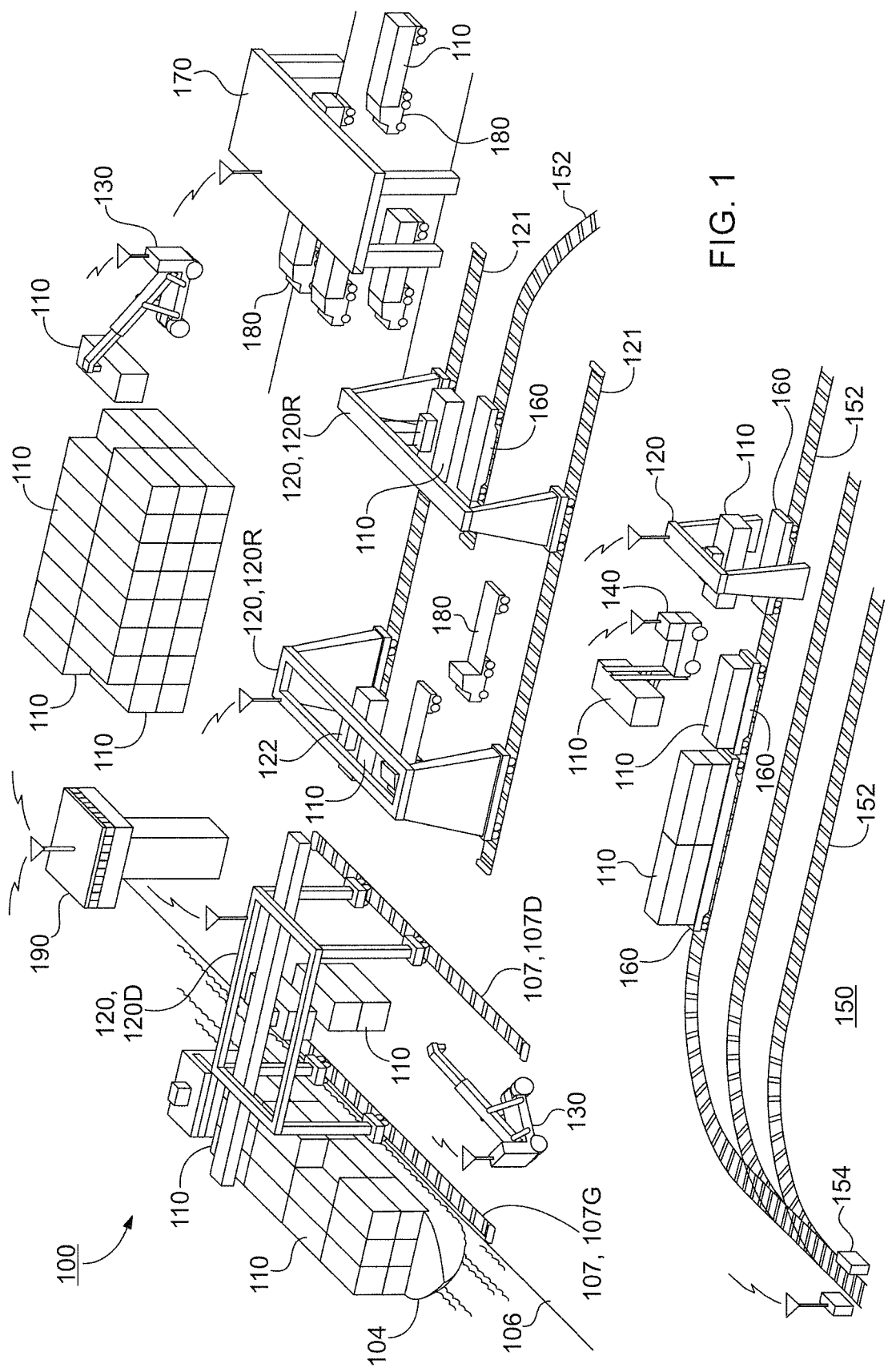
FIG. 1 is a schematic diagram of an example embodiment of a facility for receiving, unloading, storing, loading and removing example containers to and from various example modes of transport.

In the Drawing, where an element or feature is shown in more than one drawing figure, the same alphanumeric designation may be used to designate such element or feature in each figure, and where a closely related or modified element is shown in a figure, the same alphanumerical designation may be primed or the like to designate the modified element or feature. Similar elements or features may be designated by like alphanumeric designations in different figures of the Drawing and with similar nomenclature in the specification. As is common, the various features of the drawing are not to scale, the dimensions of the various features may be arbitrarily expanded or reduced for clarity, and any value stated in any Figure is by way of example only.

DESCRIPTION OF THE PREFERRED EMBODIMENT(S)

The present arrangement generally relates to a system and method for managing shipping containers containing various types and kinds of cargo as they arrive at, are transferred within, are transferred through, are stored at and/or are removed from or leave one or more transfer and/or storage facilities of various types and kinds. An advantage of the present arrangement is that substantial improvement to the efficiency of container handling facilities can be obtained without a substantial and expensive addition of infrastructure to the facility. This advantage comes by adding sensors that can provide real time identifying, tracking and monitoring data accumulated in a relational database from which it can quickly and easily be retrieved for facilitating and speeding up the operations conducted by the facility.

Container or shipping container is intended to include any moveable container into and/or onto which cargo may be loaded for transport and/or storage, and in which cargo may be transported and/or stored. Examples of moveable containers include shipping containers of various sizes and construction, trailers that may be moved by a tractor, vehicles, trucks, pallets, cartons, and the like. Containers may be loaded onto/into and carried by ships, e.g., container ships arranged to receive and carry a large number of containers and/or smaller vessels such as boats, barges and tenders, by railroad cars, e.g., flatbed rail cars arranged to receive and carry one or more containers, flatbed chassis and other road chassis arranged to receive one or more containers, trucks, aircraft, and the like. The system and method described herein is suitable for use with containers of any type and kind and with carriers thereof and conveyances therefor of any type and kind.

Although the lengths of standard shipping containers vary from 8 to 56 feet (2.4 to 17.1 m), about 80% of the world's containers in 2012 were either twenty or forty foot long standard length boxes for dry freight. These typical containers are rectangular, closed box models, with doors fitted at one end, and are made of corrugated weathering steel. Example standard ISO shipping containers are about 8 ft. (about 2.43 m) wide, about 8.5 ft. (about 2.59 m) high and come in two lengths: about 20 ft. (about 6.06 m) and about 40 ft. (about 12.2 m). Extra tall shipping containers called "high-cube" containers are about 9.5 ft. (about 2.89 m) high. Longer units of about 45 ft. (about 13.7 m), about 48 ft. (about 14.6 m) and about 53 ft. (about 16.15 m) are used in the United States and Canada.

Certain standardized shipping containers are known as "intermodal" containers which are large standardized shipping containers, designed and built for intermodal freight transport, meaning these containers can be used across different modes of transport—from ship to rail to truck to aircraft—all without unloading and reloading their cargo.

Intermodal and other standardized containers are primarily used to store and transport materials and products efficiently and securely in the global containerized intermodal freight transport system, but smaller numbers of different sizes are in regional use as well. Because these containers are of a standardized size and configuration, they are stackable one upon the other, as might be done for carriage by ship or rail or air or road, and/or for storage. They are standardized to easily mount onto correspondingly configured rail car beds, truck chassis, and/or aircraft, e.g., for ease of transport via different modes (forms) of conveyance without having to unload and reload their cargo.

ISO containers have standardized castings with openings for twist-lock fasteners at each of the eight corners, to allow gripping the container box from above, below, or the side, and securing containers to a carrier upon which they are loaded and/or to each other. Containers can be stacked up to ten units high, e.g., in storage and/or on container ships. Some intermodal containers, e.g., European and U.S. domestic units, however, are mainly transported by road and rail, and can be stacked up to three laden units high. These standardized connections facilitate stacking the containers, e.g., for shipping and/or storage, as well as securing them on truck chassis, rail cars, aircraft, and the like, for transport.

Similarly, terminal facility, facility, yard and similar terms are intended to include any location at which a container of any type or kind might be received, loaded, unloaded, stored, dispatched, and the like, whether via the same or different modes of transport, e.g., ship, truck, rail, air, and the like. Examples include quays, docks, dockyards, airports, rail yards, trucking yards, transfer yards, airport facilities, container yards, storage yards, factories, manufacturing locations, shipping locations, distribution locations, warehouses, and the like, as well as points of origin and of destination. The inclusion of the word terminal does not imply that a facility is an origin or a destination.

Within a facility or yard, many different types and kinds of container handling equipment may be employed for loading, unloading and/or otherwise moving example containers. Equipment or yard equipment is intended to encompass all of the various types and kinds of such equipment, e.g., cranes, overhead hoists, gantry cranes, mobile lifts, straddle carriers, sprinter carriers, front end loaders, forklifts, trucks, lift trucks, terminal tractors, guided vehicles, and the like, whether operated by a human operator or through automation, whether the operator and/or automation is located on board the equipment or is located remotely from the equipment.

FIG. 1 is a schematic diagram of an example embodiment of a facility 100 for receiving, unloading, storing, loading and removing example containers 110 to and from various example modes of transport 104, 160, 180; and FIGS. 1A through 1E are schematic diagrams of example embodiments of equipment 120, 130, 140, 160, 180 for loading, unloading and/or moving the example containers 110.

Example facility 100 includes a quay or dock 106 at which ships 104 may dock for having example containers 110 loaded thereon and unloaded therefrom. One or more cranes and/or gantries 120, 120D typically are moveable on quay 106 and have a lifting head 122 that rides on a carriage for extending out over the containers 110 on ship 104 to grasp and lift containers 110 and then to move them horizontally to be over dock 106 and vertically to lower them onto a conveyance, e.g., a truck or other vehicle, or onto a stack of one or more containers 110. In similar manner, one or more gantries 120, 120D grasp and lift containers 110 vertically from conveyances and move them horizontally to be stacked on ship 104. Containers 110 being unloaded from ship 104 and/or loaded onto ship 104 may be transferred to or from a carrier such as a truck 180 or railcar 160 or may be carried within facility 100 by a gantry 120, 120R, by a lift truck 130, by a forklift 140, and/or by any other conveyance or equipment.

The various gantries 120, lift trucks 130 and other container handling equipment may be constrained so as to be moveable only in predetermined directions for predetermined distances, e.g., by tracks, or may be moveable without such constraint and over greater distances, as may be necessary or desirable in the operation of facility 100. Each may include an operator station, e.g., an operator cab, mounted on or adjacent to the equipment, from where the equipment is operable by a person on the equipment, and/or may be automated so as to be operable by a remotely located operator and/or by one or more automation computers that may include a computer mounted on the equipment and/or a computer at a control location 190, e.g., control tower 190.

Example control location 190, e.g., a control tower 190, while being remote from the equipment and/or operations it monitors and/or controls in relation to facility 100, may be located within facility 100 or nearby to facility 100, and/or may be located more remotely therefrom. Control location 190 typically includes various computers, servers and other processors that receive data from the equipment and sensors thereof, as well as containers 100, ships 104, railcars 160, trucks 180 and the like, that are at facility 100, store data therefrom in memory devices associated with such various computers, servers and other processors (including in one or more databases 190D thereof), process the received and/or stored data for monitoring, tracking, controlling, and/or managing the equipment and sensors thereof that are at facility 100 as well as the containers 110, carriers, e.g., trucks, railcars, ships and the like, that are at facility 100. It is preferred that all data communicated 270 and/or stored in database 190D be hashed and/or encrypted for privacy and security.

Facility 100 preferably includes a communication system 270 for transmitting data, images, digital communications, voice messages, and other forms of information, between and among all of the locations, functions and equipment associated with facility 100, including one or more control locations 190, and/or external locations, facilities and/or equipment. The communication system 270, represented diagrammatically in FIG. 1 by triangles for antennas of various locations and equipment and jagged lines indicating communication links between and among the locations, functions and equipment thereof. The communication links may include any suitable communication technology including but not limited to wired connections and/or networks, e.g., those employing wires, cables, fiber optics and the like, and/or wireless connections and/or networks, e.g., those employing a wireless network, a WiFi network, an ad hoc network, radio communication, a relay, a cellular network, satellite links, an intranet, the Internet, and the like, and/or any combination thereof.

Elements of the communication system 270 may be located in control location 190, e.g., communication device 190C, and with the various equipment 120, 120D, 120R, 130, 140, 150, 170, e.g., communication device 190C, associated with facility 100, as well as with various buildings, shelters, towers and the like of facility 100, as may be provided, e.g., for such elements and/or for utilities and other features of facility 100.

Example dockside gantries and cranes 120, 120D, such as the example thereof illustrated in FIG. 1A, are large structures typically including a support structure typically including an even number of spaced apart substantially vertical supports, e.g., four support towers 122 at the four corners thereof, and a platform structure 124 that is supported at its corners by the towers 122 and that supports a transfer structure 125 thereunder. Transfer structure 125 is moveable forward, backward and sideways generally parallel to platform 124, i.e. transversely to its length, and extends and/or is extendable beyond the platform 124 sufficiently for loading containers 110 onto a ship 104 docked at quay 106 and for unloading containers 110 from a ship 104 docked at quay 106.

A crane carriage 126 is supported by and is moveable along the length of transfer structure 125 so as to cooperate to position a lifting head 128 that is supported by cables to be positioned over positions on the quay or dock 106 and ship 104. Lifting head 128 is configured to grasp, lift, manipulate, and release, containers 110. The cables supporting lifting head 128 may be extended so as to lower lifting head 128 to ship 104 and dock 106 and may be retracted so as to raise lifting head 128 above ship 104 and dock 106. A counter weight may be provided to be moveable along crane carriage 126 oppositely to lifting head 128 so as to counter the weight of containers 110 being lifted, e.g., to improve the stability and lifting capacity of gantry 120, 120D.

Gantries 120, 120D may be fixed or moveable. Where gantry 120, 120D is moveable, each tower 122 thereof is typically supported by wheels on one or more tracks 107 on dock 106 that run substantially parallel to the edge of dock 106 so that gantry 120, 120D is moveable along the length of ship 104 for loading and unloading containers 110 to and from all of the container holds and spaces thereof. The track 107 may simply be one or more defined track ways 107 along which rubber-tired wheels under each tower 122 of gantry 120, 120D ride or may be steel rails 107 along which railroad-like flanged wheels thereunder ride. Gantry 120, 120D thereby provides a versatile crane 120, 120D that can lift and transfer containers 110 from dock 106 onto ship 104, including from vehicles 130, 140, 160, 180 that may be on dock 106, and that can lift and transfer containers from ship 104 onto dock 106, including onto vehicles 130, 140, 160, 180 that may be on dock 106.

In addition, each dockside gantry 120, 120D preferably includes a set of sensors 200 that are preferably located in proximity to lifting head 128 thereof. Certain of the sensors are in locations from which identifying markings of containers 100 that are within the field of view of and/or range those sensors can be determined. The set of sensors 200 and related devices are described below in relation to FIG. 2.

Typically, a set of sensors 200 for each dockside gantry 120, 120D includes one or more location sensors 230, preferably a pair of location sensors 230, located on lifting head 128 for determining the location at which each container 110 is grasped and the location at which it is released, and the orientation thereof at such times. Each dockside gantry 120, 120D also includes a load/unload sensor 240 for determining when a container 110 is grasped and when it is released, e.g., for indicating the time and date with which to geo-tag the location data. In addition, one or more imaging devices are provided on ones of towers 122 for determining the identity of the container 110 from the identifying markings 116 thereon and/or one or more RFID readers 220 for determining the identity of the container 110 by reading an RFID device associated therewith.

Figure 1B:
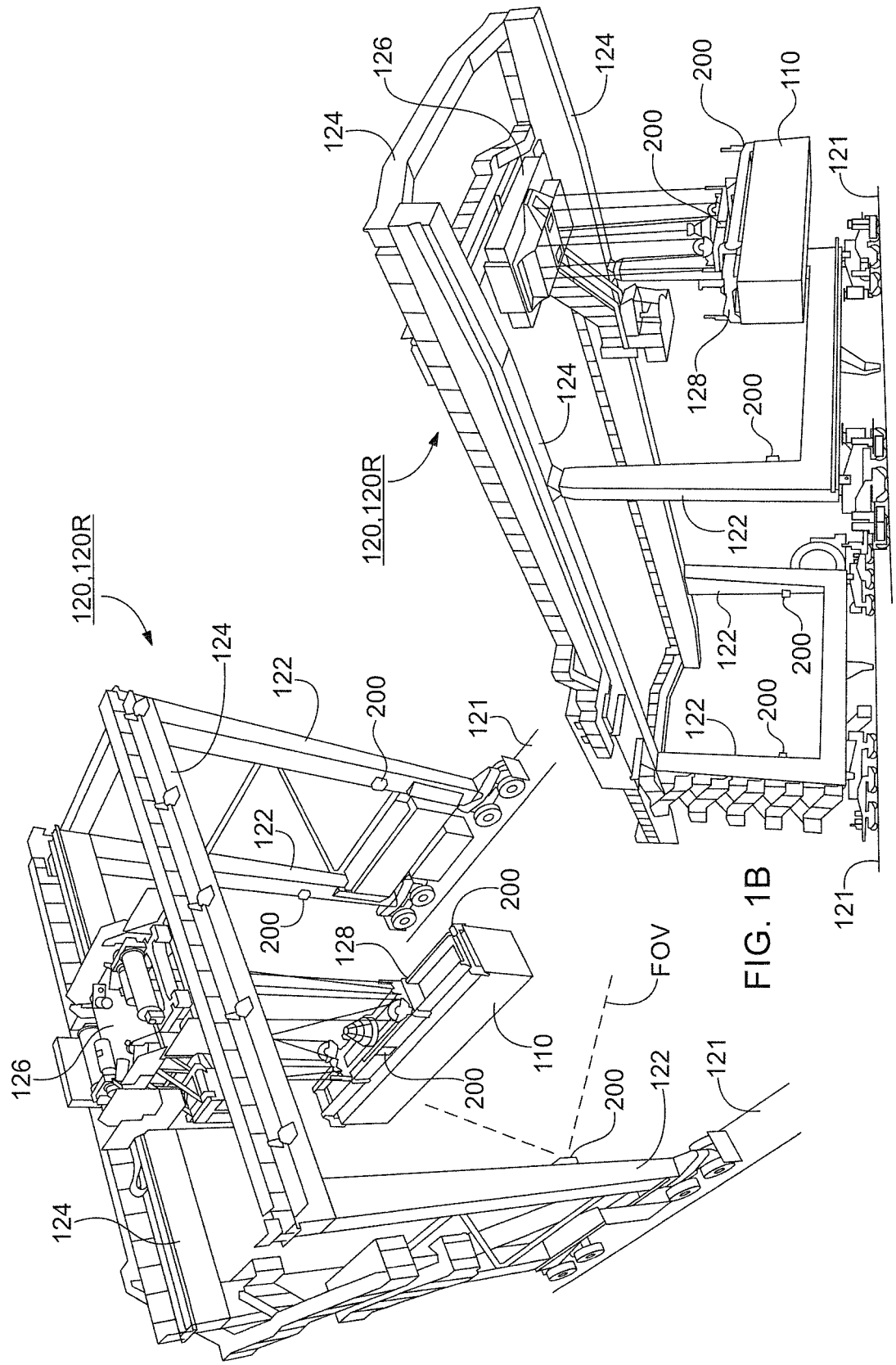

Example gantries 120, 120R, such as the example illustrated in FIG. 1B, are intended to place and remove containers 110, including stacking and un-stacking containers 110, thereunder onto and off of carriers thereunder, e.g., rail cars 160 and trucks 180 thereunder. Example gantries 120, 120R are large structures typically including an even number of spaced apart substantially vertical supporting structure, e.g., two support towers 122, and a connecting platform structure 124 that is supported at its ends by the two towers 122.

A crane carriage 126 is supported by and is moveable along the length of connecting platform structure 125 so as to position a lifting head 128 that is supported by cables to be positioned over positions on the surface of facility 100. Lifting head 128 is configured to grasp, lift, manipulate, and release, containers 110. The cables supporting lifting head 128 may be extended so as to lower lifting head 128 to the surface of facility 100 and may be retracted so as to raise lifting head 128 above the surface.

Gantries 120, 120R may be fixed or moveable. Where gantry 120, 120R is moveable, each tower 122 thereof is typically supported by wheels on one or more tracks 107 on facility 100 that run substantially parallel to each other so that gantry 120, 120R is moveable along a length of facility 100 for loading and unloading containers 110 to and from the surfaces thereof and carrier vehicles on that surface. Track 107 may simply be one or more defined track ways 107 along which rubber-tired wheels under each tower 122 of gantry 120, 120R ride or may be steel rails 107 along which railroad-like flanged wheels thereunder ride. Gantry 120, 12RD thereby provides a versatile crane 120, 120R that can lift and transfer containers 110, including to and from vehicles 130, 140, 160, 180 that may be on facility 100.

In addition, each gantry 120, 120R preferably includes a set of sensors that are preferably located in proximity to lifting head 128 thereof. Certain of the sensors are in locations from which identifying markings of containers 100 that are within the field of view of and/or range those sensors can be determined. The set of sensors 200 and related equipment are described below in relation to FIG. 2.

Regarding gantries 120, 120D, 120R, the set of sensors 200 typically includes one or more locating devices 210 that determine the geographic location of the gantry 120, 120D, 120R and preferably determine the location and orientation of its lifting head 128. Also preferably, the plural locating devices 210 are spaced apart relative to lifting head 128, e.g., one near the center thereof and another near an end thereof or one near the center of the lifting head and another on the chassis of the lifting equipment where the orientation of the lifting head is fixed relative to the lifting equipment, so that the location and orientation in azimuth of lifting head 128, and therefore of the container 110 being carried thereby, can be determined, particularly when a container 110 is grasped at one location and when it is released at that or at another location.

Sensor set 200 also preferably includes one or more RFID readers 220, e.g., a pair of RFID readers/transponders 220, wherein one of the RFID readers/transponders 220 is located on one of the vertical towers 122 and another RFID reader 220 is located on an opposing vertical tower 122 for reading one or more RFID devices 118 of containers 110 being handled thereby, which are typically between the two towers 122.

In addition, sensor set 200 also preferably includes one or more video cameras or imagers 230, e.g., a pair of video cameras or imagers 230, wherein one of the cameras or imagers 230 is located on one of the vertical towers 122 and the other camera or imager 230 is located on an opposing vertical tower 122 for reading one or more identifiers 116 of containers 110 being handled thereby. The identifiers, which typically include an alphanumeric and/or symbolic marking, and/or a barcode, are typically on one and/or on plural sides of containers 110 which are between the two towers 122 when container 110 is being handled.

Sensing when a load, e.g., a container 110, is grasped or is released by lifting head 128 may be accomplished by various types and kinds of load/unload sensors 240. Examples thereof may include, operator commands that signal the lifting head 128 to close to grasp a load or to open to release a load, whether the lifting head 128 command signal is generated manually or by an automated control for the lifting head 128. Further, the opening and/or closing of electrical switches that are part of lifting head 128 may be used to indicate the grasping and releasing actions. In each case, the load/unload sensor 240 preferably initiates capturing the equipment and container identifying data and associating it with the then present location of the lifting head and the time and date to create a geo-tagged database record of each grasping and releasing of containers 110.

Optionally, but preferably, load/unload sensor 240 may include a load proximity sensor 240 that may be provided on lifting head 128 to determine the presence of a load, e.g., a container 110, being carried thereby, as well as when such load is grasped and when it is released, thereby enabling the geo-tagging of the data relating to that load 110 and particularly of when and where it is picked up (loaded) and of when and where it is set down (unloaded).

Geo-tagging refers to associating the date, time and/or location of an event, e.g., the grasping of a load, e.g., the releasing of a load, e.g., the moving of a load, with the data relating to that event, e.g., location data from locating device 210, image data from an imager 230, identifying data determined by an RFID reader 220, and/or load present or not present data from a load sensor 240 and/or a load/unload sensor 240, or a combination thereof. Geo-tagging of data may be initiated automatically in response to a load/unload sensor 240 or in response to operating a lifting head 128, 138, 148 to grasp or release a container 110, or manually by operator action, e.g., the giving of "drop load" and "pick up load" or similar commands.

Figure 1C:
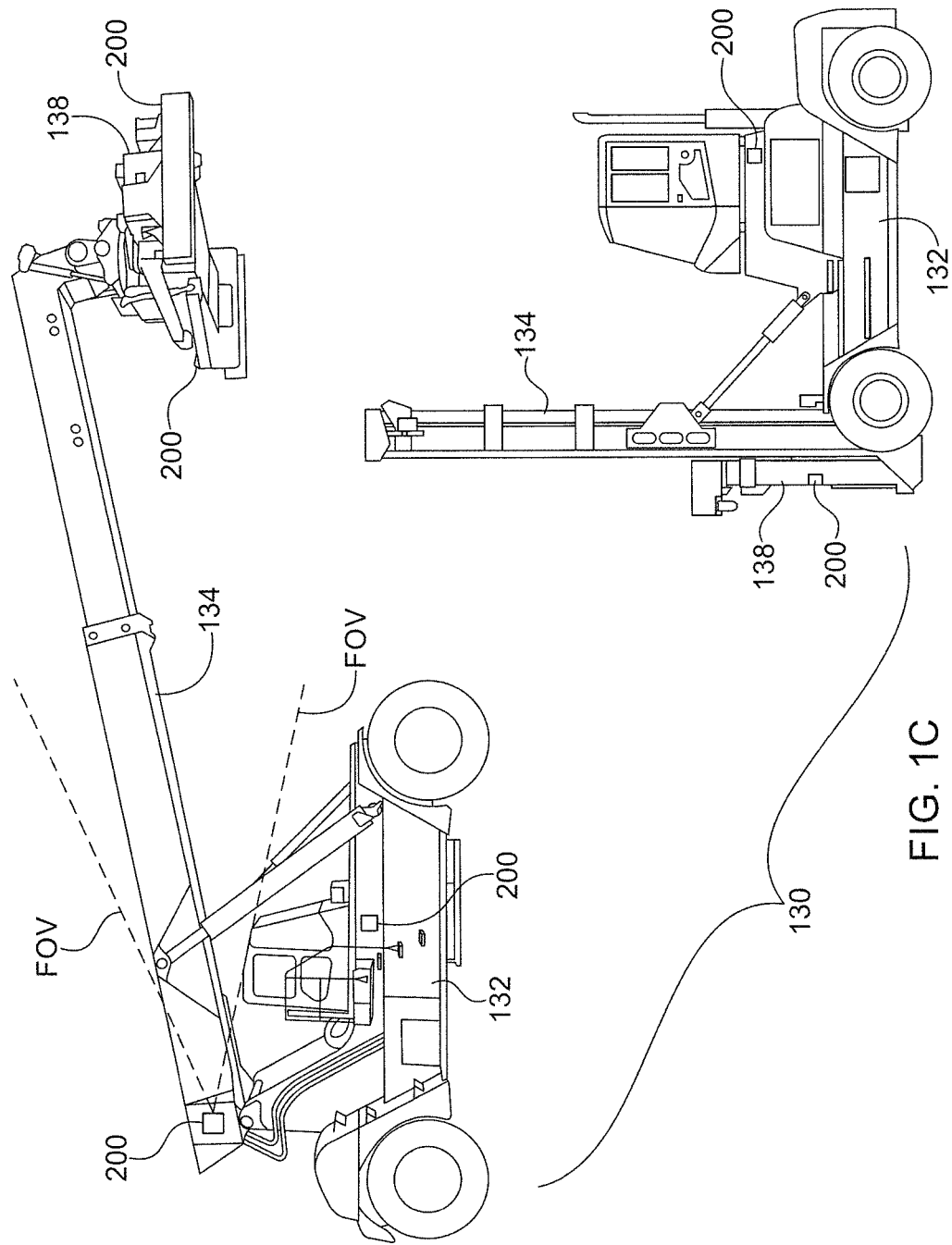

Example lift trucks 130, such as the examples illustrated in FIG. 1C, include wheeled motorized chassis 132 that are moveable and steerable to reach various locations of facility 100. Chassis 132 supports a lifting structure 134, typically mounted at the front end thereof, that has a lifting head 138 thereon configured for grasping and moving containers 110.

Example lifting structures 134 include pivoted lifting structures 134, e.g., pivoted at the rear end of chassis 132, so that the forward end thereof can move the lifting head 138 thereat higher and lower as needed for grasping and releasing containers 110 at desired locations. Pivoted lifting structures 134 may be extendable to a longer length and retractable to a shorter length, e.g., using a telescoping structure, for moving the lifting head 138 forward and rearward as needed for grasping and releasing containers 110 at desired locations.

Other example lifting structures 134 include vertical lifting structures 134, e.g., located at the forward end of chassis 132, for moving the lifting head 138 thereon higher and lower vertically as needed for grasping and releasing containers 110 at desired locations. Vertical lifting structures 134 may be extendable to a longer length and retractable to a shorter length, e.g., using a telescoping structure, for moving the lifting head 138 upward and downward vertically over a greater distance as needed for grasping and releasing containers 110 at desired locations.

In addition, each lift truck 130 preferably includes a set of sensors 200 that are preferably located in proximity to lifting head 138 thereof. Certain of the sensors 200 are in locations from which identifying markings of containers 100 that are within the field of view (FOV) of and/or range those sensors can be determined. The set of sensors 200 and related devices are described below in relation to FIG. 2.

Optionally, all or parts of a sensor set 200, e.g., an imager 230 and/or RFID reader 220, that is/are mounted on lift truck 130, e.g., on the chassis 132 or on lifting structure 134 thereof, may be deployable sideways to extend away from the chassis 132 thereof so as to read identifying information 116 and/or read an RFID device 118 that may be on an end of a container 110. The deployable parts of sensor set 200, if any, preferably are also retractable to return to where they are mounted on lift truck 130. The deployment mechanism may include, e.g., a telescoping pole or a tape that rolls when deployed to form a tube, and the like, and may be driven by, e.g., an electric motor, a hydraulic actuator, or another drive mechanism.

Figure 1D:
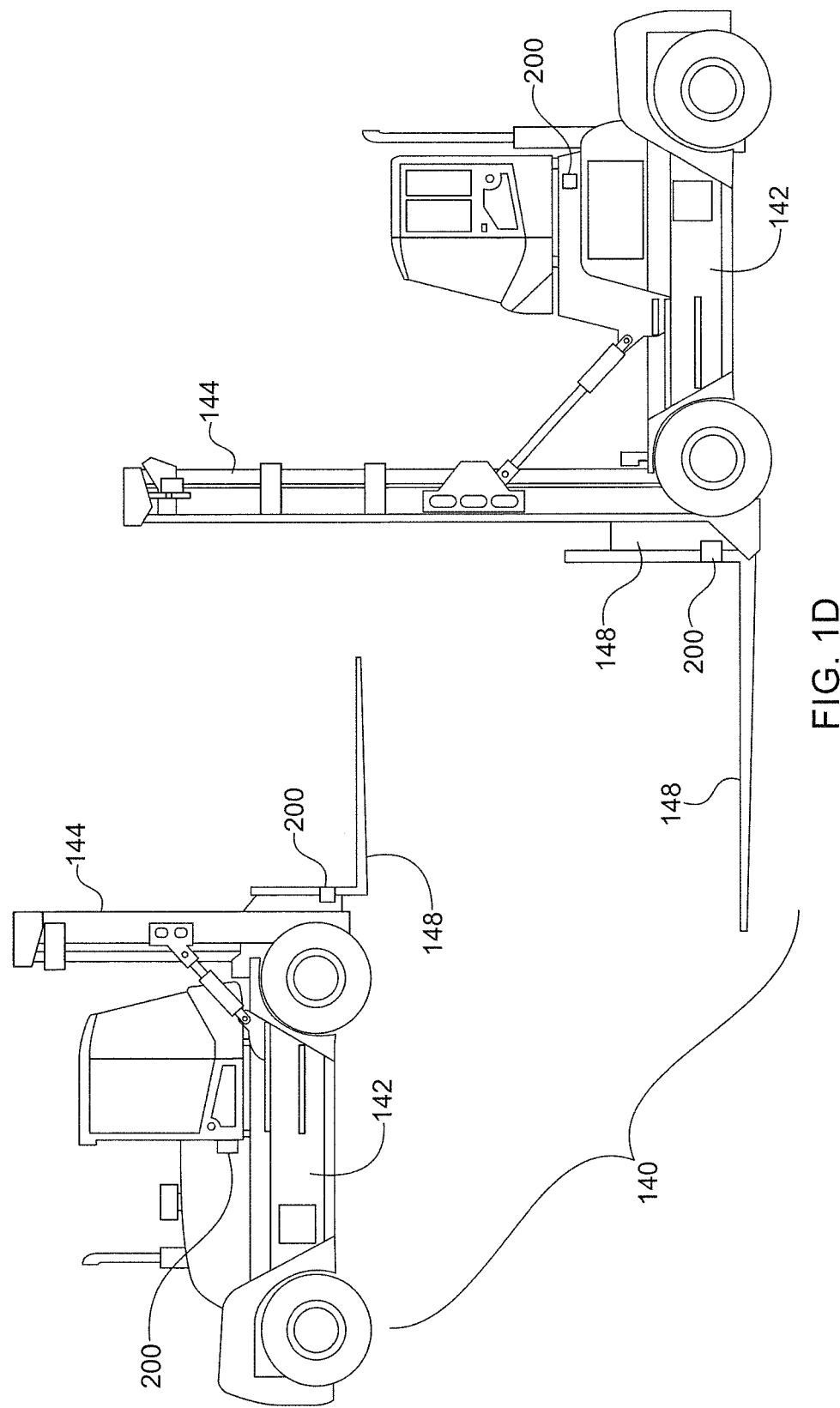

Example fork lifts 140, such as the examples illustrated in FIG. 1D, include wheeled motorized chassis 142 that are moveable and steerable to reach various locations of facility 100. Chassis 142 supports a lifting structure 144, typically mounted at the front end thereof, that has a pair of fork lifting tines 148 extending therefrom and configured for being inserted under containers 110 and other objects for lifting and moving containers 110 and other objects to and from desired locations. Vertical lifting structures 144 may be extendable to a longer length and retractable to a shorter length, e.g., using a telescoping structure, for moving the lifting tines 148 upward vertically over a greater distance and downward as needed for lifting and depositing containers 110 at desired locations.

In addition, each fork lift 140 preferably includes a set of sensors 200 that are preferably located in proximity to the lifting structure 144 and/or fork tines 148 thereof. In addition, each fork lift 140 preferably includes a set of sensors 200 that are preferably located in proximity to lifting head 148, e.g., the lifting tines 148, thereof. Certain of the sensors are in locations from which identifying markings of containers 100 that are within the field of view of and/or range those sensors can be determined. The set of sensors 200 and related devices are described below in relation to FIG. 2.

Regarding lift trucks 130 and fork lifts 140, the set of sensors 200 typically includes one or more locating devices 210 that determine the geographic location of the lift truck 130 and/or fork lift 140 and preferably of its lifting head 138, 148. The plural locating devices 210 are preferably spaced apart, e.g., one on the chassis 132, 142 of lift truck 130 and/or fork lift 140 and another near or on the lifting device 138, 148 thereof, so that the location and orientation of lift truck 130 and/or fork lift 140, and therefore of lifting head 128, and of the container 110 being carried thereby, can be determined. The latitude and longitude of the location of the lift truck 130 and/or fork lift 140 may be obtained from the data produced by either or both locating devices 210 while the location and elevation (distance above ground) of the container 110 carried thereby may be obtained from the data produced by the locating device 210 closest to the container, e.g., the locating device on lifting head 138, 148 and/or the elevation may be obtained from the measured vertical extension of the lifting head 138, 148 relative to the chassis 132, 142 of the lift truck 130 and/or fork lift 140.

This sensor set 200 also preferably includes a pair of RFID readers 220 or transponders 220 wherein one of the RFID readers/transponders 220 is located on one side of the chassis 132, 142 or on the lifting structure 134, 144 or on the lifting head 128, 148 thereof and the other RFID reader/transponder is located on an opposing side of the chassis 132, 142 or lifting structure 134, 144 or lifting head 138, 148 thereof for reading one or more RFID devices 118 of containers 110 being handled thereby, which are typically supported by the lifting device 138, 148 thereof.

In addition, this sensor set 200 also preferably includes at least one video camera or imager 230, and preferably includes a pair of video cameras or imagers 230 wherein one of the cameras or imagers 230 is located on one side of the lifting structure 134, 144 and the other camera or imager 230 is located on an opposing side of lifting structure 134, 144 with their respective fields of view (FOV) directed towards lifting head 138, 148 for reading one or more identifiers 116 of containers 110 being handled thereby. The identifiers, which typically include an alphanumeric and/or symbolic marking, and/or a barcode, are typically on one and/or on plural sides of containers 110 which are at the lifting head 138, 148 which is at the end of lifting structure 134, 144 when container 110 is being handled. The one or more video cameras or imagers 230 preferably include, or are associated with, optical character recognition (OCR) or similar processing for decoding the identifying information and data represented by the alphanumeric and/or symbolic marking 116 and/or barcode 116.

Additionally and optionally, but preferably, load/unload sensor 240 may include a load proximity sensor 240 that may be provided on lifting head 138, 148 to determine the presence of a load, e.g., a container 110, being carried thereby, as well as when such load is grasped and when it is released. Sensing when a container 110 is grasped and released enables the automated geo-tagging of the location data and identifying data relating to that load and particularly to when and where it is picked up (loaded) and to when and where it is set down (unloaded).

Optionally, all or parts of a sensor set 200, e.g., an imager 230 and/or RFID reader 220, that is/are mounted on forklift 140, e.g., on the chassis 144 or on lifting structure 144 thereof, may be deployable sideways away from the chassis 142 thereof so as to read identifying information 116 and/or read an RFID device 118 that may be on an end of a container 110. The deployable parts of sensor set 200, if any, are also retractable to return to where they are mounted on forklift 140 or other equipment. Telescoping poles driven by various motors, e.g., electric or hydraulic, are examples of suitable extension mechanisms.

Figure 1E:
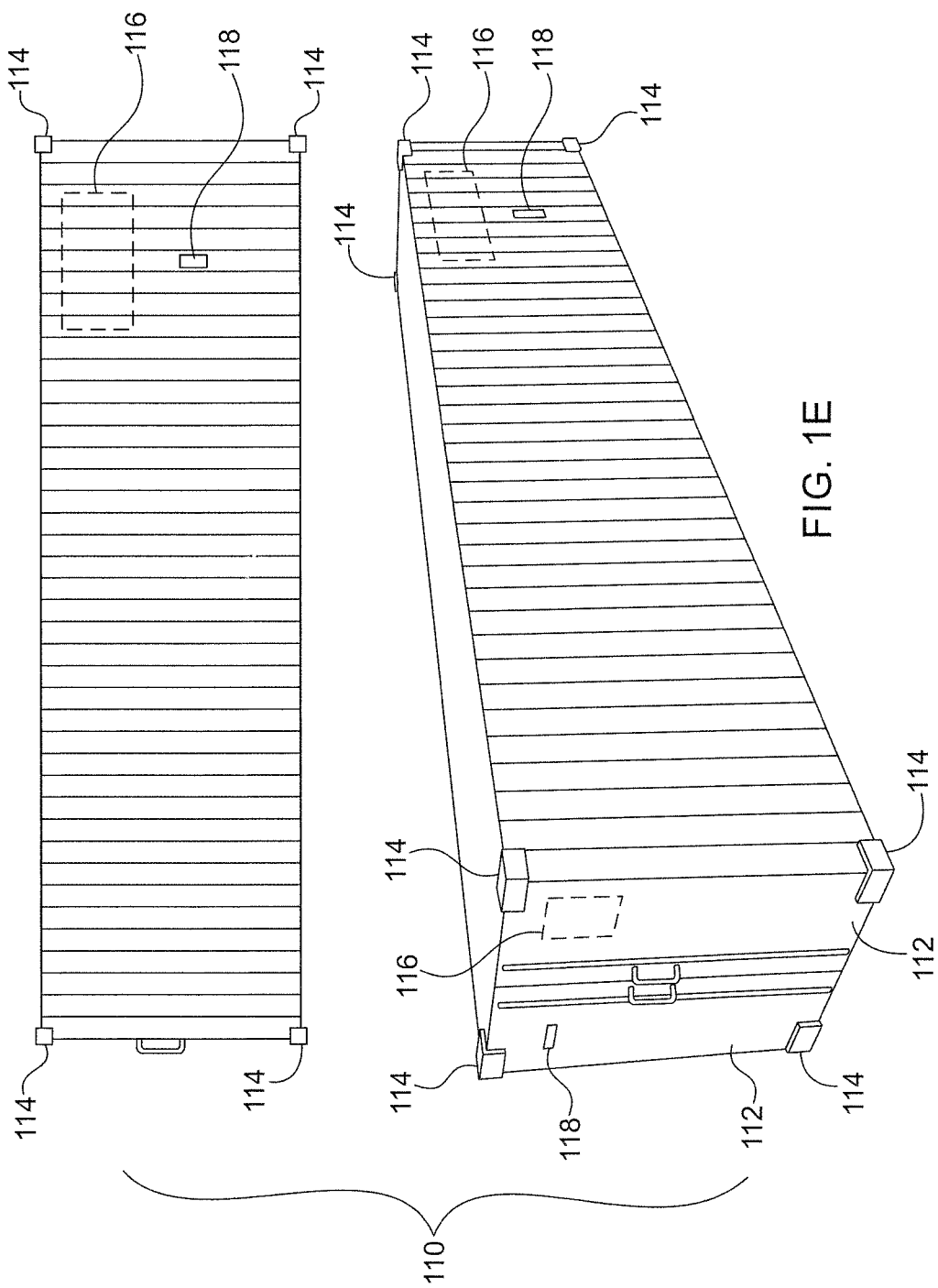

Example container 110, such as the example illustrated in FIG. 1E, is of the type and kind described above and includes access doors 112, usually at one end thereof, and lifting and/or securing fixtures 114, e.g., standardized castings 114, at least at the corners thereof. Lifting and/or securing fixtures 114 are preferably standardized in location and configuration so that containers 110 may be picked up and carried, as well as stacked, compatibly by various equipment having a complementary lifting head.

Containers 110 have one or more identifying features, e.g., alphanumeric markings 116, symbols 116, barcodes 116, RFID devices 118, and the like, that uniquely identify each container 110, and in conjunction and cooperation with electronic and/or paper manifest documents, their contents, destination, origin, and route of travel. Such identifying features are typically marked on at least one long side and one end of a container, often if not usually proximate an upper edge thereof, but may be marked on additional sides and surfaces thereof as may be desired.

Preferred alphanumeric markings 116 thereof typically include a unique three part alphanumeric marking 116, wherein a first part or preamble includes a BIX code uniquely representing the owner or party responsible for that container 110, followed by a unique serial number for that container 110 and a check bit letter or number by which incorrect reading of the alphanumeric markings 116 may be recognized, e.g., leading to re-reading or correction thereof.

Preferred symbols 116 may include a barcode, logo, trademark, service mark or other graphic representative of the owner or responsible party. Preferably a barcode 116 on container 110 may be a one-dimensional or a two-dimensional barcode into which is encoded all or part of the information represented by the alphanumeric markings 116, and may include such additional information as the container owner or proprietor, or container handling or governing entities, may desire to include.

Access doors 112 of container 110 may be secured by physical latches and locking devices, including RFID enabled locking devices that can transmit the status of that locking device, e.g., as being secured, unlocked and/or tampered with. RFID readers 220 of sensor set 200 may be configured to receive such data transmitted by such RFID enabled locking devices or specialized RFID readers 220 may be provided therefor.

The RFID devices 118 referred to herein associated with containers 110, as well as those associated with rail cars 160 and/or trucks 180 and the like described below, or with something else, may be passive RFID devices 118 or active RFID devices 118. Passive RFID devices 118 receive an interrogation signal from an RFID reader 220 and respond thereto using energy captured from the interrogating signal to transmit the identifying data and status data stored therein, while active RFID devices 118 include an internal source of electrical power, e.g., a long life battery, and transmit their identifying and status data periodically and/or in response to an interrogating signal.

These RFID devices 118 are configured for being attached, either permanently or for a time, to containers 110, e.g., magnetically and/or by an adhesive or other fastener, and are housed in a weatherproof container through which radio signals can pass so that the RFID devices 118, e.g., tags 118, therein can be interrogated and the data transmitted thereby can be received by an RFID reader 220 or RFID transponder 220 within range. Typically, and preferably, plural RFID devices 118 may be provided on each container 110, e.g., typically one near each end thereof or one on a side thereof and another on an end thereof, often in proximity to alphanumeric identifier 116.

Figure 2:
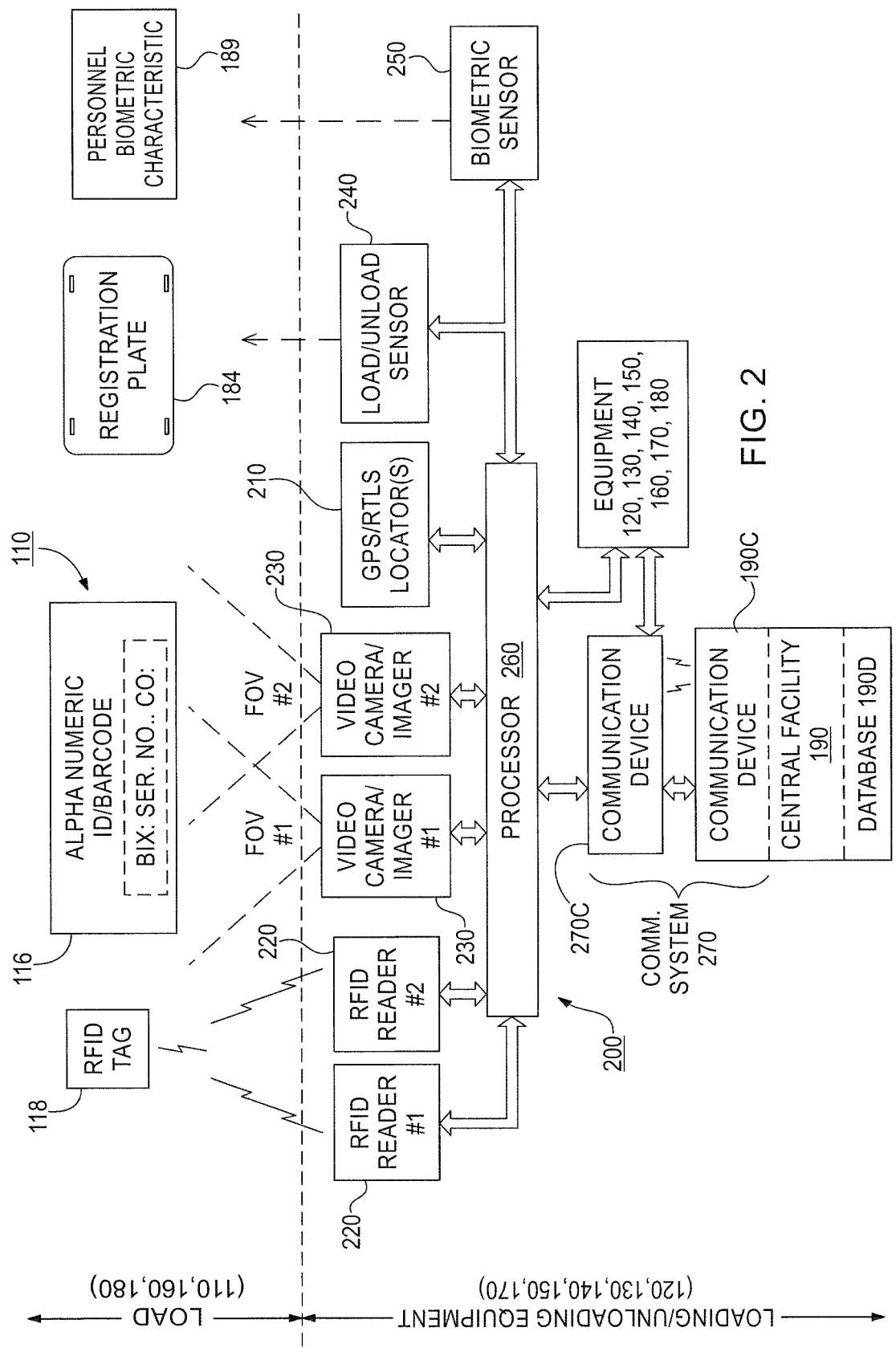
FIG. 2 is a diagram illustrating an example embodiment of a set of sensors useful with the example facility and example equipment of FIGS. 1 through 1E.

FIG. 2 is a diagram illustrating an example embodiment of a set of sensors 200 useful with the example facility 100 and example equipment 120-140 of FIGS. 1 through 1E. Sensor set 200 associated with container handling equipment is configured to sense at least the location (latitude, longitude and elevation) at which each container 110 is grasped by that particular equipment and the location (latitude, longitude and elevation) at which that container 110 is released by that particular equipment, thereby to provide accurate and complete data as to the current location (latitude, longitude and elevation) of each container 110 as well as the previous location or locations (latitude, longitude and elevation) at which it was stored and/or from which it was moved. Thus, any container 110 may easily be accurately located and/or tracked, from when it enters facility 100 until it departs therefrom, as may be needed to facilitate the efficient operation of facility 100 as well as the management thereof.

Sensor set 200 preferably includes, e.g., a location sensor 210, an RFID reader 220, an imaging sensor or imager 230, and/or optionally a load/unload sensor 240, each of which is located at a position on the equipment it is associated with as to reliably sense and provide data representative of the parameter, condition or thing that it is intended to sense. Additionally, sensor set 200 preferably also includes, e.g., a processor 260 for receiving data from each sensor of set 200 and a communication device 270C which in cooperation with other elements of communication system 270 transmits and receives data including, e.g., sensor data, processed sensor data, and command and control data received relative to that sensor set 200 and/or the equipment with which it is associated.

Location sensor 210 or locating device 210 is for sensing the positions (locations) of each container 110 that is handled by the particular equipment in "real time" and so is preferably located on the particular equipment as close as practicable to the container 110 being handled. Any real time locating system (RTLS) having sufficient accuracy, e.g., sufficient for locating containers 100 within a fraction of the dimensions of container 110, may be employed. "Real time" refers to a time that is substantially contemporaneous with the event being measured, e.g., the handling of the container. Since containers and container handling equipment typically move relatively slowly, delays of many seconds, or even minutes, may be tolerated without losing the substantially contemporaneous advantage of the "real time" geo-location and tracking thereof.

Location data provided by the location sensors 210 is at least in two dimensions, e.g., in latitude and longitude relative to the Earth (also referred to as X-Y axis location) or to another reference such as a map of terminal facility 100, thereby enabling containers 110 to be easily tracked and located. Preferably, location data also includes a third dimension, e.g., altitude or elevation, (also referred to as Z-axis location), whereby the location of containers 110 that are in a stack of containers 110, whether on the ground in facility 100 or on a carrier 104, 160, 180 therein, can be tracked and located within the stack of containers 110, thereby further reducing the time required to locate and retrieve containers. Because the elevation of the ground level is known, e.g., from a survey or GPS location, the elevation of the container above the ground, e.g., the height at which it is stacked on other containers, is easily calculated by subtraction.

An equipment location sensor 210 that is used to provide location data relating to a container 110 the equipment 120, 130, 140 is handling is preferably mounted on the lifting head 128, 138, 148 of the equipment, and more preferably at a relatively central location thereon. An equipment location sensor 210 that is used to provide location data relating to the equipment 120, 130, 140 may be mounted at a convenient location on the equipment In addition, plural location sensors 210 may be and preferably are provided in known relative locations on a piece of equipment so that two different items of location data are provided, whereby the orientation in azimuth of the equipment and of a container being handled by that equipment may be determined from the two items of location data. The locations thereof may be on the lifting head and on the chassis of the equipment, or may be near the center of the lifting head and at a location of the lifting head that is spaced apart from its center. The latter is preferred where the orientation of the lifting head relative to the chassis or structure of the equipment is not fixed, e.g., as where the lifting head is rotatable in azimuth. Knowing both the location and orientation of a container can improve the efficiency of operations for container handling equipment in approaching and grasping a container.

For example, for gantries 120, 120D, 120R, location sensor 210 is preferably located on or very close to lifting head 128 thereof, for lifting trucks 130 location sensor 210 is preferably located on or very close to lifting head 138 thereof, and for fork lift 140 location sensor 210 is preferably located on or very close to fork tines 148 thereof, or at least on the moveable structure that supports fork tines 148.

Location sensor 210 is preferably a receiver for a GPS or other satellite-based locating system capable of providing location, including elevation, to a high accuracy, e.g., within a few meters or less. Location sensor 210 preferably includes one or more Global Positioning System (GPS) devices 210 operable with signals from GPS satellites to accurately determine the geographic position of the GPS unit on the Earth. Use of plural locating units reduces the likelihood of having a loss of location data due to inoperability of an on-board GPS device, but also increases cost.

Optionally, global position determining units (locating devices) 132 responsive to two or more different and independent global positioning systems, e.g., the US GPS system, the Russian GLONASS system, the European Galileo system, the Indian IRNSS system and/or the Chinese BDS system, may be employed so that geographic location data is available even when one GPS system is out of range or out of service, however, such redundancy has an economic cost that may not be affordable in certain situations.

Suitable alternative location sensors (locating devices) 210 include those determining location from plural sources of radio (wireless) signals of known location, e.g., by triangulation, or of known signal strength, e.g., by a received signal strength indicator (RSSI) from WiFi and/or Bluetooth and/or other protocol signals, by determining location from differential arrival times of signals, and the like, that may be available and/or provided in any given facility or situation. Any of these alternative location sensors (devices) 210 may be used in conjunction with a GPS location sensor 210, e.g., for providing redundancy and/or improving the accuracy of location data.

RFID reader 220, also referred to as RFID transponder 220, receives signals transmitted by RFID devices associated with facility 100, with various containers 110 and/or with various types and kinds of equipment thereof and carriers and other vehicles associated therewith, e.g., a ship 104, a railcar 160 and/or a truck 180, whether temporarily present as when delivering or picking up a load, e.g., a container 110, or more permanently, e.g., as with a lift truck 130 and/or a fork lift 140 of a facility 100. RFID readers 220 may operate with passive RFID tags 118 and/or with active RFID tags 118, and preferably can interrogate a substantial number of RFID tags 118 that are within its range, as is common when a substantial number of containers 100 bearing RFID tags 118 are within range, e.g., on a container ship 104, on a railcar 160, and/or on a stack of containers 100 being stored.

Typically, RFID readers 220 operate to read RFID tags 118 over a relatively long range, e.g., a range of about 10 meters (about 33 feet), or more, which is sufficient when a container 110 is proximate the various equipment, especially larger equipment, associated with facility 100 on which one or more RFID readers 220 are mounted. Examples include when a container 110 is between the towers 122 of a gantry 120, 120D, 120R, or is held by the lifting head 128, 138, 148 of a gantry 120 or a lift truck 130 or fork lift 140, respectively, or is being loaded onto and unloaded off of a railcar 160 or truck 180. Where RFID readers 220 are by configuration of the equipment on which they are mounted closer to the RFID devices which they are to read, RFID readers 220 with a lesser reading range may be employed.

One or more imaging sensors 230 (imagers 230) are located at one or more positions on the equipment with which it is or are associated with and each with its field of view directed so as to reliably sense (image) and provide data representative of the parameter, condition or thing that it is intended to sense, e.g., the unique identifying information 116 thereon, whether an alphanumeric identifier 116, a barcode 116 or another symbol. Each imager 230 has sufficient resolution to image each element of identifier 116 clearly enough for the data represented thereby to be reliably discerned and decoded.

The image resolution and reading range of imagers 230 may be adjusted by selecting the resolution of the imager 230, e.g., the solid-state image sensor thereof, and/or the optical characteristics of the lens and/or other optical elements associated therewith, however, given the wide availability of inexpensive, reliable and small high-resolution imagers, such high-resolution imagers may be preferred.

Preferably more than one imager 230 is provided on each item of equipment so that their respective fields of view can complement and supplement each other so that at least one imager 230 images an identifier 116 of container 110 whenever it is handled by that equipment. For example, when one image sensor's 230 view of an identifier 116 of a container 110 held by lifting head 138 is obstructed, e.g., by lifting structure 136, 146, the identifier 116 is in the view of the other imager 230. One example of this arrangement includes providing an imager 230 on each side of lifting structure 136 proximate the base thereof near the chassis 132 of lift truck 130 with their respective fields of view directed substantially along the length of lifting structure 136 with lifting head 138 being within the field of view of both imagers 230. Imagers 230 may also be employed with rail portal 154 and/or truck portal 170 for reading identification markings, e.g., alphanumeric markings and/or barcodes, a DOT registration numbers, and registration tags 184, for rail cars 160 and/or trucks 180 entering and/or leaving facility 100.

Video cameras or imagers 230 preferably include or are associated with optical character recognition (OCR) or similar processing for decoding identifying information and other data represented by the alphanumeric and/or symbolic marking 116 and/or barcode 116 and/or registration plate 184, whether that processing is included in an imager 230 or is provided by a separate processor 260.

Preferably, a load/unload sensor 240 is located at a position on each of the various pieces of equipment 120, 130, 140 of facility 100 that it is associated with as to reliably sense and provide data representative of the parameter, condition or thing that it is intended to sense, e.g., whether or not a load is being carried by that equipment. Typically that sensor position is on lifting head 128, 138, 148 where it will be relatively adjacent to a container 110 when that container 110 is held by the lifting head 128, 138, 148.

Sensing of when a load, e.g., a container 110, is grasped or is released by lifting head 128, 138, 148 may be accomplished by one or more load/unload sensors 240 of various types and kinds. For example, operator commands that signal the lifting head 128, 138, 148 to close to grasp a load 110 or to open to release a load 110 can be utilized, e.g., sensed 240, to cause the most recently sensed equipment identification data and container identification data relative to the time of the grasping of or of the releasing of the container 110 to be captured, associated with the location data and the date and time thereof, and stored in database 190D. As a result, the geo-tagged identification data constitutes a record in the relational database 190D that geo-locates where that container 110 was picked up or was set down in facility 100, 150, 170. The load/unload sensor 240 of such operating command signals may be within the electrical and/or electronic components of the equipment. The foregoing sensing 240 is suitable whether the lifting head 128, 138, 148 command signal is generated manually, e.g., by the operator of the equipment pressing a button or switch or touch screen icon, or is generated by an automated control, e.g., a computer controlling the lifting head 128, 138, 148.

Alternatively, load/unload sensor 240 may employ the opening and/or closing of electro-mechanical or other switches that are part of lifting head 128, 138, 148, e.g., such as limit switches that detect when lifting head 128, 138, 148 is open, e.g., not grasping a load, or is closed, e.g., is grasping a load 110, may be used to indicate the grasping and releasing actions, thereby to initiate capturing the equipment and container identifying data and associating it with the then present location of the lifting head 128, 138, 148 and the time and date to create a geo-tagged database record of the grasping and/or releasing of the container.

Further, and often preferably, load/unload sensor 240 may include a proximity sensor 240 for sensing the presence of a container 110, either alternatively to the foregoing or in addition thereto. A proximity type of load/unload sensor 240 may include, e.g., a load activated electro-mechanical switch 240, ultrasonic sensor 240, optical sensor 240, laser sensor 240 and/or a small radar sensor 240. Load/unload sensor 240 may be a simple sensing device that need only provide a "go-no go" indication as to whether a load, e.g., container 110, is present or is not present. Load/unload sensors 240 are typically located on the lifting head 128, 138, 148 of the various respective equipment. Alternatively, a load/unload indication can be provided by the equipment operator initiated command that initiates grasping or releasing a container 110.

A change in the indication provided by load/unload sensor 240, which occurs when a load is picked up or is released, may be and preferably is used for automatically initiating the geo-tagging of substantially contemporaneous location data from the location sensor 210 and identifying data from RFID reader 220 and/or from imager 230 relating to the particular load, e.g., container 110, that is then being picked up or released.

The geo-tagged location and identifying data is preferably then automatically communicated, e.g., via communication device 270C of communication system 270, to the communication device 190C of central facility 190 from which that geo-tagged data is stored in a relational database 190D. Each record of stored geo-tagged location data and stored geo-tagged identifying data in database 190D can thereafter be retrieved in any convenient manner, e.g., by searching the database 190D based upon a location, an identification and/or the date and/or time of the geo-tagging data, as may be desired.

As a result, database 190D will automatically accumulate substantially in real time records for each container 110 as to where and when it was picked up, where and when it was released, and the identification of the piece of equipment that picked it up, moved it and released it at the release location, for each time it was handled from when it first arrived into facility 100 until when it departed facility 100. In addition, data from plural records may be used to provide other information such as the tracking of containers, equipment and/or personnel, the monitoring of containers, equipment and/or personnel, operating reports, operating status, speeds of various equipment, maintenance alerts, personnel performance, and the like, as may be desirable or convenient to the operation and management of facility 100 and the equipment and personnel associated therewith.

Further, sensor sets 200 may include a biometric sensor 250 for reading biometric characteristics 189 of equipment operators, drivers, maintenance and repair workers, and other personnel working at, entering and/or leaving facility 100. Biometric identities of such personnel may be used to verify the identities and qualifications of personnel to operate certain equipment, to prevent the unauthorized or unqualified operation thereof, to access certain areas, e.g., restricted areas, to access certain functions, e.g., access database 190D and/or to make searches and/or pose queries thereof. Preferably, such personnel are pre-screened and/or pre-registered as security needs indicate, with their biometric characteristics 189 being stored in relational database 190D or in another database. Suitable biometric sensors 250 and characteristics may include, e.g., fingerprints, facial images, iris scanning, and the like, as may be appropriate to the facility, areas thereof, equipment and/or function, and the security considerations relating thereto.

Results from searching database 190D and the records thereof may be presented in any suitable form, such as tables, spreadsheets, text, and the like. The records and results may also be presented using a geographic information system (GIS) map which shows the locations of selected items, e.g., containers 110 and/or container handling equipment, overlaid on a map or plan view, e.g., of terminal facility 100.

GIS mapping is a system, e.g., a software system, that is designed to capture, store, manipulate, analyze, manage, and present spatial or geographic data in human perceivable form. GIS applications allow users to create interactive queries or searches, analyze spatial information, edit data in maps, and present the results of all these operations in a form that facilitates human understanding of the data presented. Because location data provided by locating devices 210 includes latitude and longitude, or another grid-based data form, it lends itself to being presented via a GIS map.

Figure 3:
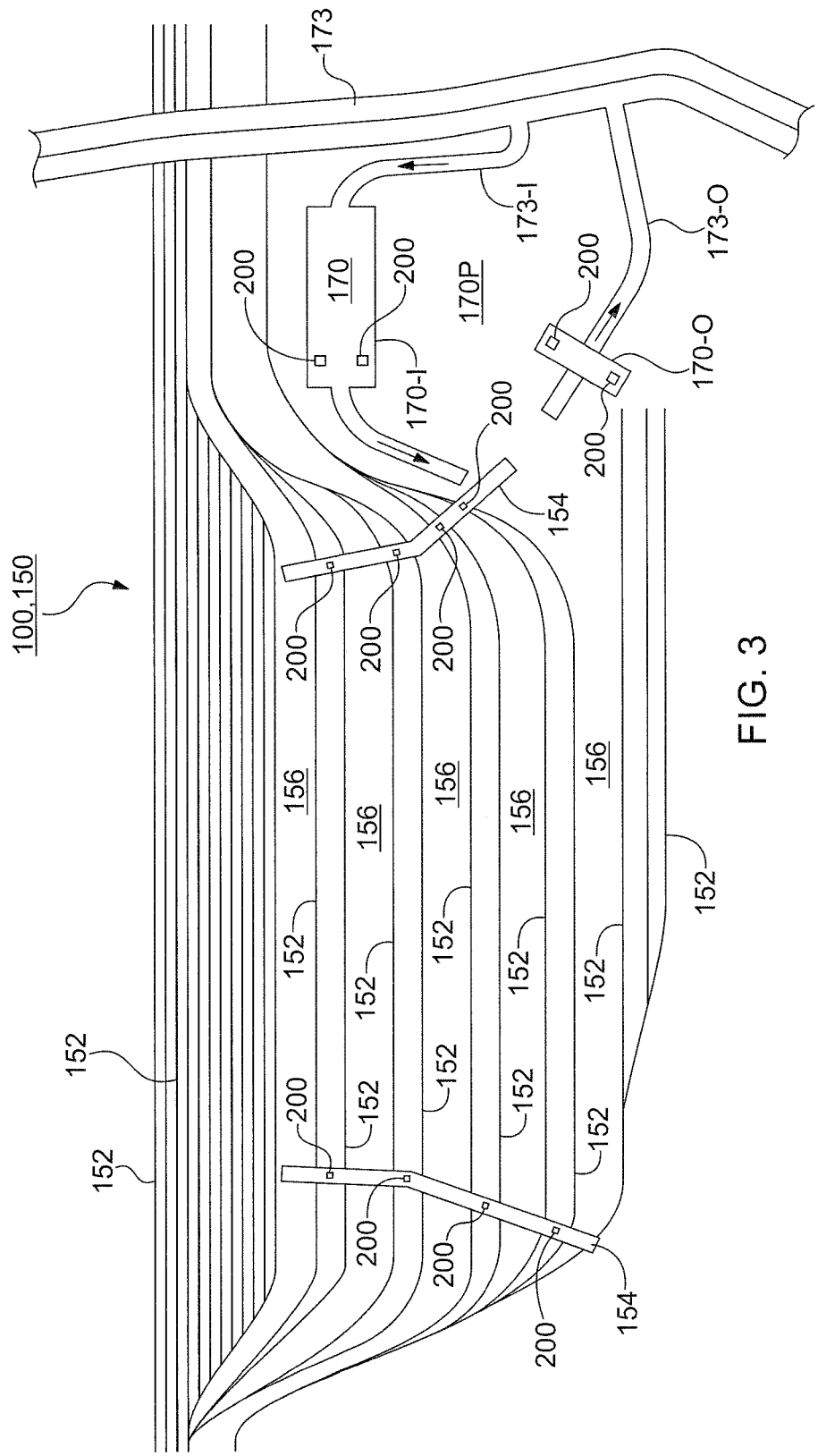
FIG. 3 is a diagram illustrating an example embodiment of a rail yard and FIG. 3A illustrates an example rail car suitable for use in and with the example rail yard.
Figure 3A:
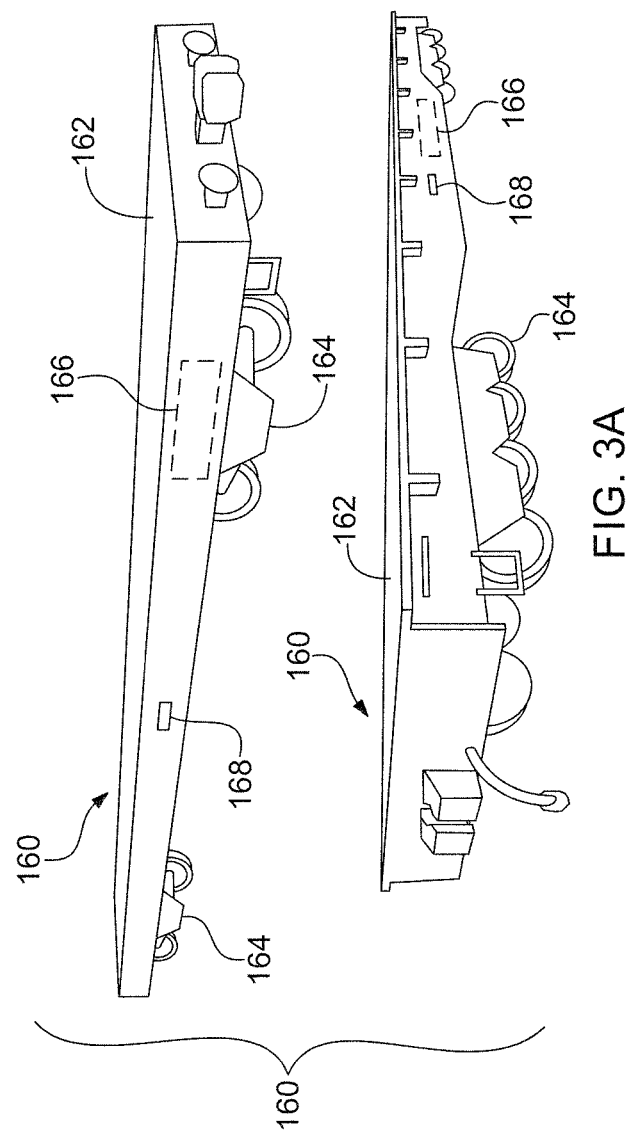

FIG. 3 is a diagram illustrating an example embodiment of a rail yard 150 and FIG. 3A illustrates an example rail car 160 suitable for use in and with the example rail yard 150. Example rail yard 150, which may itself be a facility 100 or may be part of a larger facility 100, provides a transfer and/or storage facility in which containers 100 may arrive by rail and leave by land vehicle, e.g., a truck, and/or may arrive by truck and leave by rail, and may be stored in rail yard 150 between its arriving and departing rail yard 150.

Rail cars 160 arrive at and depart from example rail yard 150 via a railroad line or main line, e.g., represented by plural parallel tracks 152 at the top of the Figure. Rail yard tracks 152 are typically switched from the main line tracks to enter and leave rail yard 150 and are further switched to provide sets of one or more tracks 152, e.g., preferably to provide pairs of parallel tracks 152, that are spaced apart or separated by work spaces 156 wherein various equipment for handling containers 100, e.g., as described above, operate.

Trucks 180 may enter and leave rail yard facility 100, 150 via access roads 173-I and 173-O from and to road 173 via a truck gate or portal 170. Truck portal 170 may include separate portals 170-I and 170-O for ingress and exit, respectively, and a parking area 170P may be provided. The facility for trucks 180 associated with rail yard 150 may have sufficient infrastructure to itself serve as a truck facility 100, 170 as well.

Work spaces 156 between one or more tracks 152 typically serve as loading and unloading areas 156 whereat containers 100 may be loaded onto and unloaded from rail cars 160, may be stored (individually and/or stacked) at locations of work spaces 156, and/or may be loaded onto and unloaded from trucks 180. Thus containers 100 may transit rail yard 160 arriving by rail car 160 and departing by rail car 160 and/or truck 180 or arriving by truck 180 and departing by rail car 160 and/or truck 180, whether transferred directly or stored at rail yard 150 for a time.

Rail cars 160 enter and leave rail yard 150 passing a rail gate 154 or portal 154 which includes one or more sets of sensors 200 similar to that described above, except that because portals 154 and sensor sets 200 thereof are in known, fixed locations, a location sensor 210 is not required, but may be provided for convenience, e.g., to identify the track 152 on which the rail car 160 is passing. Sensor sets 200 include, e.g., RFID reader 220 and imager 230 for determining the identities of rail cars 160 and the container or containers 100 carried thereby from the identifying markings 116, 166 and/or RFID devices 118, 168 thereof.

Example railcars 160 typically have a flat bed 162, e.g., are flatcars, on which one or more containers 110 may be placed and secured for transport, e.g., within facility 100 and/or outside of facility 100, e.g., over rail transport, and containers 100 may be released and/or removed from rail cars 160, e.g., at a destination such as a rail yard 150 or other facility 100. The chassis or bed 162 of flatcars 160 are supported on rail trucks 164 having one or more pairs of wheels configured to ride on tracks 152.

Identifying markings 166, similar to the markings 116 of containers 110, are preferably also provided on railcars 160, e.g., one on the right side of chassis 162 thereof and another on the left side thereof, so as to be easily read when railcars 160 pass through rail portal 154 of rail facility 100, 150.

In addition, RFID devices 168, similar to RFID devices 118 of containers 110, are preferably also provided on railcars 160, e.g., one on the right side of chassis 162 thereof and another on the left side thereof, so as to be easily read when railcars 160 pass through rail portal 154 of rail facility 100, 150, as well as when a container 110 is loaded onto or unloaded from a rail car 160. Thus, records stored in database 190D contain the geo-tagged identifying data and location data for both containers 110 and the rail cars 160 onto which and from which they are loaded and unloaded.

It is preferred that rail cars 160 utilizing facility 100, 150 have both identifiers 166 and RFID devices 168. Further, it is preferred that rail cars 160 be pre-registered and verified, and records of the identifying information 116 and/or of the RFID device 118 thereof be stored in the database 190D or in another database.

In addition, sensor sets 200 may include readers 230, 240, e.g., imagers 230, 240, that read alphanumeric identification 166 and/or RFID devices 168 of rail locomotives passing portals 154, either entering and/or exiting facility 100, 150. RFID devices 168 for locomotives and/or railcars 160 may be mounted on the underside of the locomotive or railcar and RFID readers 240 therefor may be mounted on tracks 152, e.g., on crossties thereof and/or embedded beneath the ground thereof, e.g., in the ballast between the rails. Such reading of RFID tags 168 can complement reading other alphanumeric identification 116, 166 and/or RFID devices 118, 168, however, it is preferred that rail cars 160 utilizing facility 100, 150 have both visible identifiers 116 and RFID devices 118.

Identifying data of the rail cars 160 and of containers 110 passing rail portal 154, determined from identifying markings 116, 166 and/or RFID devices 118, 168 thereon, is processed and communicated 270 to central location 190 substantially as described above.

Figure 4:
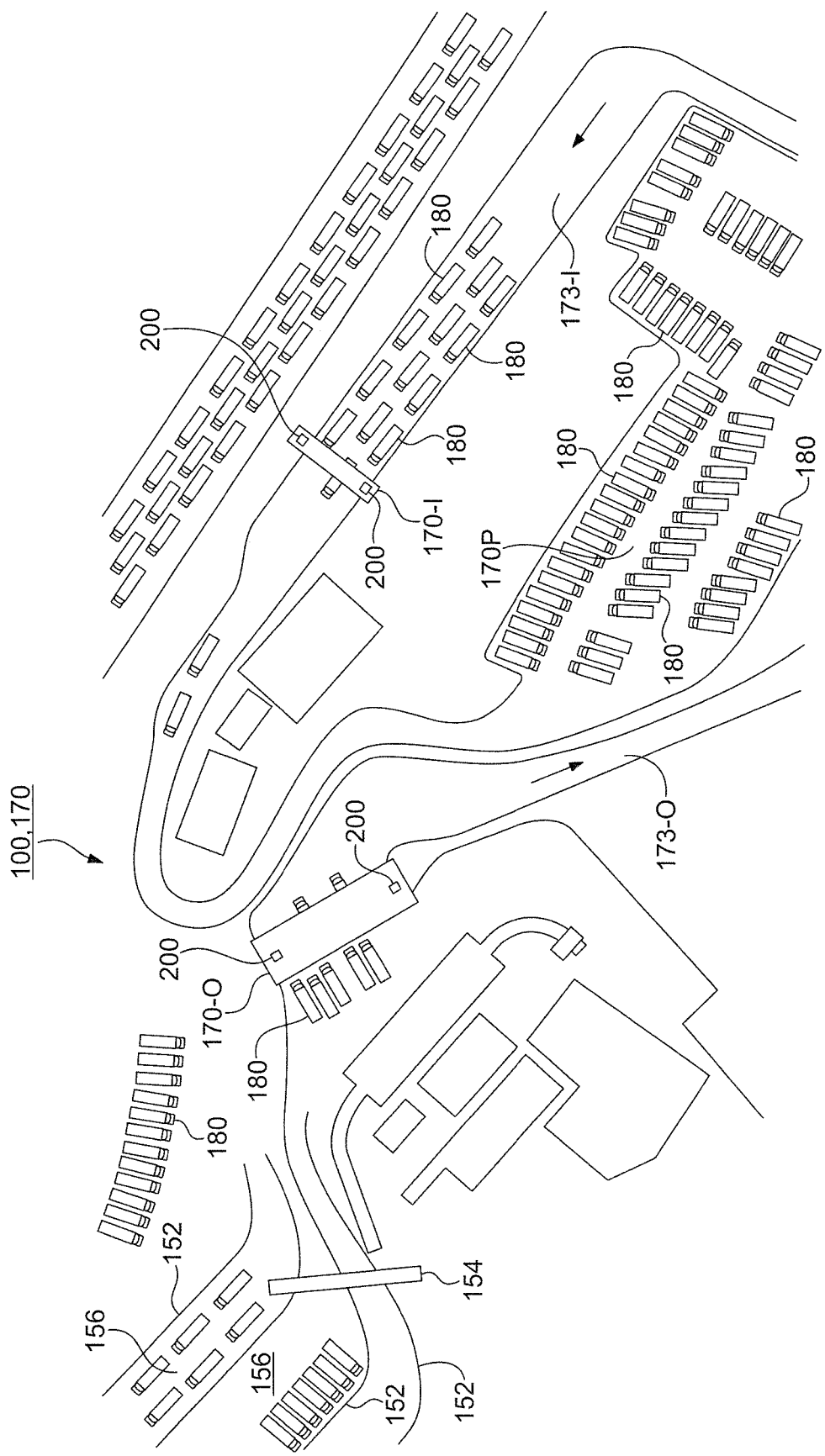
FIG. 4 is a diagram illustrating an example embodiment of a truck yard and portal and FIG. 4A illustrates example trucks suitable for use in and with the example truck yard and portal.
Figure 4A:
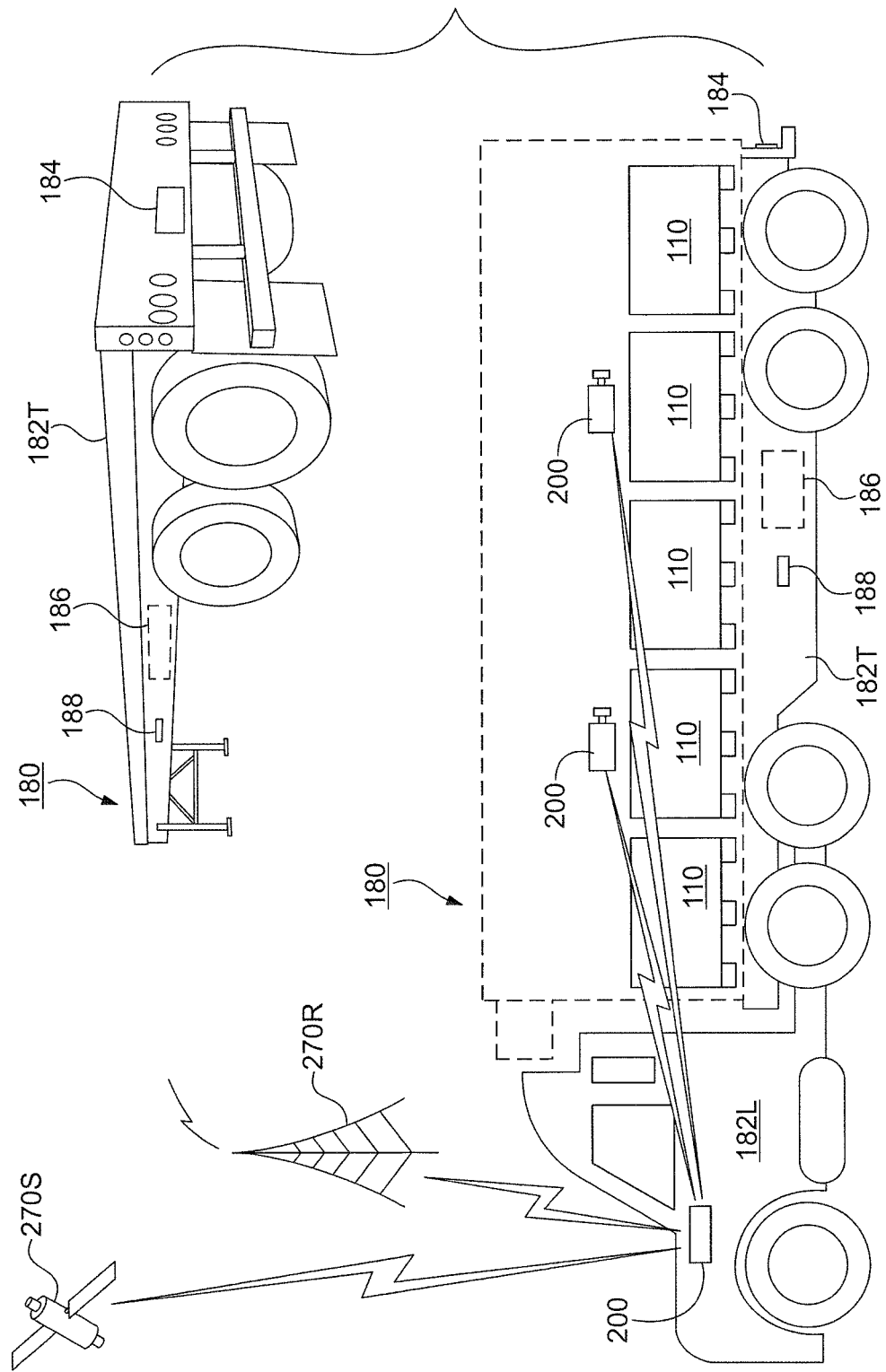

FIG. 4 is a diagram illustrating an example embodiment of a truck yard and portal 170 and FIG. 4A illustrates example trucks 180 suitable for use in and with the example truck portal 170. Example truck yard and portal 170, which may itself be a facility 100 or may be part of a larger facility 100, provides a transfer and/or storage facility in which containers 100 may arrive by truck and leave by land vehicle, e.g., a truck, and/or may arrive by truck and leave by rail, and may be stored in truck yard 170 in designated locations.

Trucks 180 enter and leave facility 100, 150 via access roads 173-I and 173-O via a truck gate or portal 170. Truck portal 170 may preferably include separate portals 170-I and 170-O for ingress and exit, respectively, and a parking area 170P may be provided. The facility for trucks 180 may have sufficient infrastructure to itself serve as a transfer and/or storage facility 100, 170 as well, including with an associated with rail yard 150.

Truck facility 170 may serve as a transfer facility 100, 170 for containers 100 arriving, e.g., on a smaller local or regional trucks 180 for transfer to a larger, or plural trailer, trucks 180 for long distance carriage, and/or for transfer from long distance trucks 180 to local trucks 180. Truck facility 170 may also serve as a transfer facility 100, 170 for containers 100 between trucks 180 and rail cars 160.

Where rail cars 160 arrive at and depart from example truck facility 170, or a rail yard 150 associated therewith, the arrangement of rail yard 150 is typically similar to that described above, e.g., preferably having pairs of parallel tracks 152 that are spaced apart or separated by work spaces 156 wherein various equipment for handling containers 100 operate. Thus containers 100 may transit truck yard 170 arriving by rail car 160 and departing by rail car 160 and/or truck 180 or arriving by truck 180 and departing by rail car 160 and/or truck 180, whether transferred directly or stored at truck yard 170 for a time.

Trucks 180 enter and leave truck portal or yard 170 passing an entry portal 170-I or an exit portal 170-O each of which includes one or more sets of sensors 200 similar to that described above, except that because portals 170-I and 170-O and sensor sets 200 thereof are in known, fixed locations, a location sensor 210 is not required, but may be provided for convenience, e.g., to identify the lane which a truck 180 is passing. Sensor sets 200 include, e.g., RFID reader 220 and imager 230 for determining the identities of trucks 180, including the locomotive 180L and trailer 180T parts thereof, and the of container or containers 100 carried thereby from the identifying markings 116, 186 and/or RFID devices 118, 188 thereof.

In addition, sensor sets 200 may include readers 230, e.g., imagers 230, that read license plates 184 and registration tags 184 of trucks 180 passing portals 170, either entering 170-I and/or exiting 170-O facility 100, 170, as well as when a container 110 is loaded onto or unloaded from a truck 180. Such reading of tags 184 can substitute for reading other alphanumeric identification 186 and/or RFID devices 188 thereof, however, it is preferred that trucks 180 utilizing facility 100, 170 have identifiers 186 and RFID devices 188 and be pre-registered and verified, and records thereof be stored in the database 190D or another database.

Additionally, sensor set 200 associated with a portal 170 may include additional sensors, e.g., magnetic sensors, x-ray scanners, radiation detectors, and the like, for further screening of carriers 180 and the containers 110 carried thereby. In one example, such sensors may be for comparing cargo characteristics with declared cargo and/or detecting security threats, e.g., security threats such as radioactivity, metallic masses inconsistent with its manifest, and the like.

Thus, records stored in database 190D contain the geotagged identifying data and location data for both containers 110 and the trucks 180 onto which and from which they are loaded and unloaded. Of course, where a truck 180 has permanently attached locomotive and load carrying parts, e.g., as does a box truck 180, only a single set of identifiers 186 and/or RFID devices 188 is needed.

Further, sensor sets 200 for portals 170 may include a biometric sensor 250 for reading biometric characteristics 189 of truck drivers and other personnel entering and/or leaving facility 100 as well as personnel operating portal 170. Preferably, such personnel are pre-screened and/or pre-registered as security needs indicate, with their biometric characteristics being stored in relational database 190D or in another database. Suitable biometric sensors 250 and characteristics 189 may include, e.g., fingerprints, facial images, iris scanning, and the like, as may be appropriate to the facility and the security considerations relating thereto.

Optionally, and preferably, a mobile application ("app") may be provided to carriers, e.g., truck drivers, for use on their smart phones, smart devices and the like for directing and/or timing the arrivals of trucks 180 and/or containers 110 at a portal 170 and within facility 100 for directing the driver where to drive truck 180 to for loading a container 110 and/or unloading a container 110. Such application allows the control of trucks at facility 100 using the limited accuracy of smart phone based GPS data without the need for the trucks 180 to be outfitted with more accurate and more expensive GPS receivers and other devices.

The smart phone software application also allows the arrival of trucks 180 at facility 100 to be anticipated, coordinated and planned for so that their entry, processing and container loading/unloading can be pre-planned and facilitated. Once in the described system is established, and possibly from the outset, drivers and trucks 180 preferably would be required to download and use the software app as described.

Example truck 180 typically has a locomotive part 182L and flat bed 182T on which one or more containers 110 may be placed and secured for transport, e.g., within facility 100 and/or outside of facility, e.g., over road transport, and may be released and removed, e.g., at a destination. Locomotive part 182L and flat bed 182T may be on a common chassis 182, e.g., as is common for a truck for local usage, or may be separate chassis parts, e.g., as is common for longer distance trucks 180.

Example trucks 180 typically have a flat bed 182L on which one or more containers 110 may be placed and secured for transport, e.g., within facility 100 and/or outside of facility 100, e.g., for over road transport, and containers 100 may be released and/or removed from trucks 180, e.g., at a destination such as a rail yard 150 or other facility 100. Typically, trucks 180 pick up containers 100 at an origin and deliver containers 100 to a destination, which containers 100 may be loaded with goods or may be empty when picked up or delivered.

Identifying markings 186, similar to the markings 116 of containers 110, are preferably also provided on trucks 180, e.g., one on the right side of chassis 182 thereof and another on the left side thereof, so as to be easily read when trucks 180 pass through truck portal 170, respectively, of a facility 100, 170.

RFID devices 188, similar to RFID devices 118 of containers 110, are preferably also provided on trucks 180, e.g., one on the right side of chassis 182L thereof and another on the left side thereof, so as to be easily read when trucks 180 pass through truck portal 170 of facility 100, 170.

Identifying data for the trucks 180 and containers 110 passing portal 170, determined from identifying markings 116, 186 and/or RFID devices 118, 188 thereon, is processed and communicated 270 to central location 190 substantially as described above. In addition, sensor set 200 of trucks 180, typically located on the locomotive part 182L thereof, may have communication devices 270C that are configured to communicate via radio relays 270R, cellular communication systems 270C and/or via satellite communication links 270S, typically to a facility associated with the truck owner and/or operator, and also to central facility 190 where data from sensor set 200, e.g., location data and identifying data, for locating and/or tracking containers 100 and/or truck 180. Further, one or more sensor sets 200 may be provided on the trailer 182T and similarly communicate, e.g., via relay 270R and/or satellite 270S, either directly or via sensor set 200 of locomotive part 182L.

Figure 5:
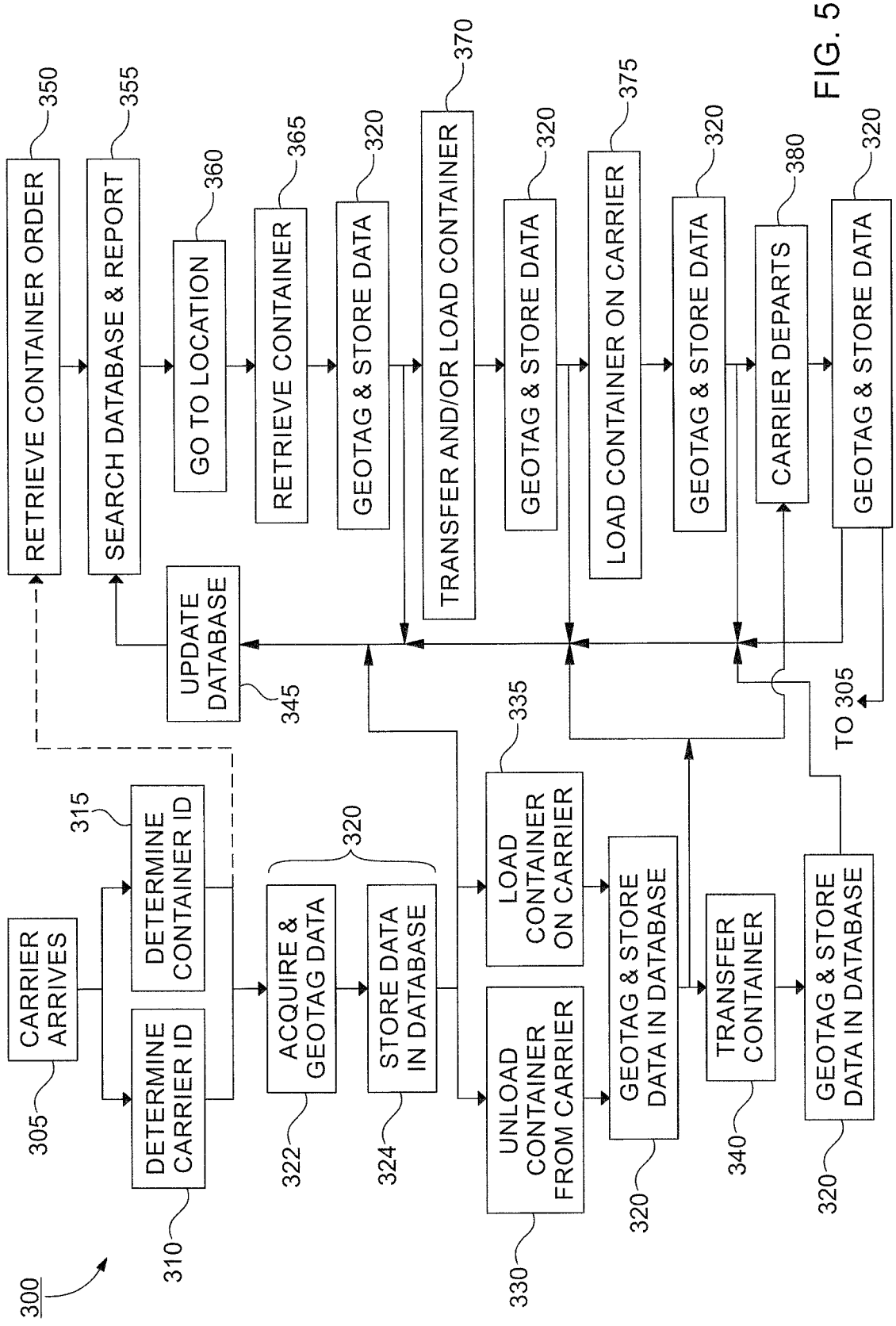
FIG. 5 is a flow diagram illustrating an example embodiment of a method or process relating to the example facility.

FIG. 5 is a flow diagram illustrating an example embodiment of a method 300 or process 300 relating to the example facility 100. Example process 300 is a representation of a continuous and fluid operation relating to a facility 100 at which many different operations may be occurring at substantially the same time involving many different equipment, vehicles, rail cars and the like and many different containers 100, and which acquires and stores data relating so such diverse operations in a searchable database for tracking, monitoring, managing and otherwise operating the facility 100. Accordingly, it should be understood that there may not be an actual "starting" point or an actual "ending" point for the facility 100 which can be in a substantially continuous and changing operating situations. Thus the description herein starts at a point selected for facilitating an orderly description of such operations.

When a carrier, e.g., a ship, train, truck or other carrier, for one or more containers 100, arrives 305, the identity of that carrier is determined 310, e.g., by a sensor set 200 from the identifying alpha-numeric identifier 166, 186 thereof and/or from an RFID device 168, 188 thereof, and/or from a registration plate 184 thereof. If the carrier is carrying one or more containers 100, the identity of that or those containers 100 is determined 315, e.g., by a sensor set 200 from the identifying alpha-numeric identifiers 116 thereof and/or from an RFID devices 118 thereof.

Regarding a ship, e.g., a container ship 104, which can carry a large number of containers 100, the identity of the ship may be acquired from a manifest, arrival schedule, port record, border control record, load schedule, and the like, whether received in hard copy and/or electronic form, e.g., a paper record, electronic file, e-mail, text message, computer disk, hard drive or any other form of information storage medium, and may be entered into the database either manually and/or electronically. While such records may ordinarily identify the containers 100, if any, carried by the ship, the identity of those containers 100 will in any event be acquired 322 as they are unloaded from the ship by equipment, e.g., by one or more gantries 120, of facility 100.

Identity data relating to the carrier and/or containers is acquired 322, e.g., by one or more sensors of a sensor set 200, and is geo-tagged 322 once acquired. The location data used to geo-tag the identity data will generally represent the location of the entry point which is usually fixed, e.g., a dock 106 and/or a portal 154, 170. The acquired and geo-tagged identity and location data is communicated to and stored 324 in a relational and searchable database 190D. Typically this involves communication of the data via a communication system 270 to a location whereat the database 190D is maintained, e.g., at a central or control facility 190. Acquiring, geo-tagging, communicating and storing such data may be referred to as a combined operation identified by the item number 320 (e.g., sometimes illustrated with a bracket). Storing data in the database 320 involves storing one or more additional records therein which results in the database being updated 345 to include the new record in addition to all of the records that were previously stored therein. Because database 190D is relational and is searchable, all data in all records therein are associated by any data that is contained in any record or is common to any two or more records. Thus, database 190D may be searched 355 by a search criterion that includes any one or more of such relatable data, e.g., by container 110 identity, by arrival location, by arrival time, by arrival carrier, by location in facility 100, by equipment identity, by present time (an instant inventory), by departure location, by departure time, by departure carrier, and by any other data stored in database 190D.

If the carrier is carrying one or more containers 100, those containers may be unloaded 330 from the carrier upon which event a sensor set 200 determines the identify of the container and the location at which it is unloaded, geo-tags that data and communicates and stores that data in the database 320. If the carrier is not carrying a container or has space into which one or more containers may be loaded, one or more containers 100 may be loaded 335 onto the carrier upon which event a sensor set 200 determines the identify of the container and the location at which it is loaded, geo-tags that data and communicates and stores that data in the database 320.

Preferably, equipment that loads and unloads containers 100 includes a load/unload sensor 240 in its sensor set 200 which produces an indication when a container is loaded and when a container is unloaded, e.g., when it is grasped and when it is released, and that load/unload indication preferably initiates action 320, e.g., the acquiring, geo-tagging, communicating and storing of the location and identifying data for that operation involving that container and that equipment in database 190D.

Thereafter the container 110 that was unloaded may be transferred 340 to a different location, either for storage at facility 100 or for removal therefrom on a carrier, as may be the case regarding the intended transport schedule for that container. Geo-tagged identifying and location data relating to the transfer 340, which includes such data for it being grasped by an equipment and released by the equipment, is also stored 320 in the database.

Transfer here includes unloading a container from the carrier upon which it arrived at facility 100 and loading it onto a carrier upon which it will leave at facility 100, unloading a container from the carrier upon which it arrived at facility 100 and placing it at a storage location of facility 100, loading a container from a storage location at facility 100 and loading it onto a carrier upon which it will leave facility 100, moving a container 110 from one storage location of facility 100 and placing it at another storage location of facility 100, and any combination of one or more of the foregoing.

Receipt 350 of an order to retrieve and/or ship any one or more containers 100, usually identified by the identity of the one or more containers, initiates the actions and operations needed to effect such retrieval and/or shipping. Execution of the retrieval order usually first involves searching the database 190D by a known search criterion, e.g., container identity, which provides a report 355 thereof which includes the locations of the desired containers in facility 100. Handling equipment is then sent to go 360 to the location at which the specified container is located to retrieve 365 that container, e.g., to grasp and lift the container, which produces a load indication to initiate acquiring the location and identity data of the container and geo-tagging and storing that data in the database, which confirms verifies that the retrieval order 350 is being properly executed.

The retrieved container 110 is then transferred 370 and/or loaded 375 onto a carrier in accordance with the retrieval order, each of which again produces geo-tagged location and identity data that is stored 320 in the database, thereby continuing to build the history of that container 110 relative to facility 100. Where such retrieval requires more than one operation, e.g., retrieval from a storage location by a gantry 120 or forklift 140, moving to a loading location by a lifting equipment 230, and loading onto a carrier 104, 160, 180, at each step along the way a new record is generated and stored 320 in the database 190D thereby to update 345 that database. As a result, the database 190D contains a historical record for each container, for each equipment, and for each carrier encountering facility 100, and for each operation performed in facility 100, and that historical record is acquired and stored 320 substantially in real time and is substantially instantly available by searching database 190D.

When an unloaded carrier and/or a carrier upon which a container 110 has been loaded, departs 380 facility 100, the identity and location thereof is also acquired, geo-tagged and stored 320 in database 190D. Process 300 may then return to step 305 or to any other step relating to an operation being performed at facility 100. As a result, a relatable and searchable record of all activity and operations, as well as of all physical items, e.g., containers and equipment and carriers, of facility 100 is generated and stored in database 190D.

Figure 5A:
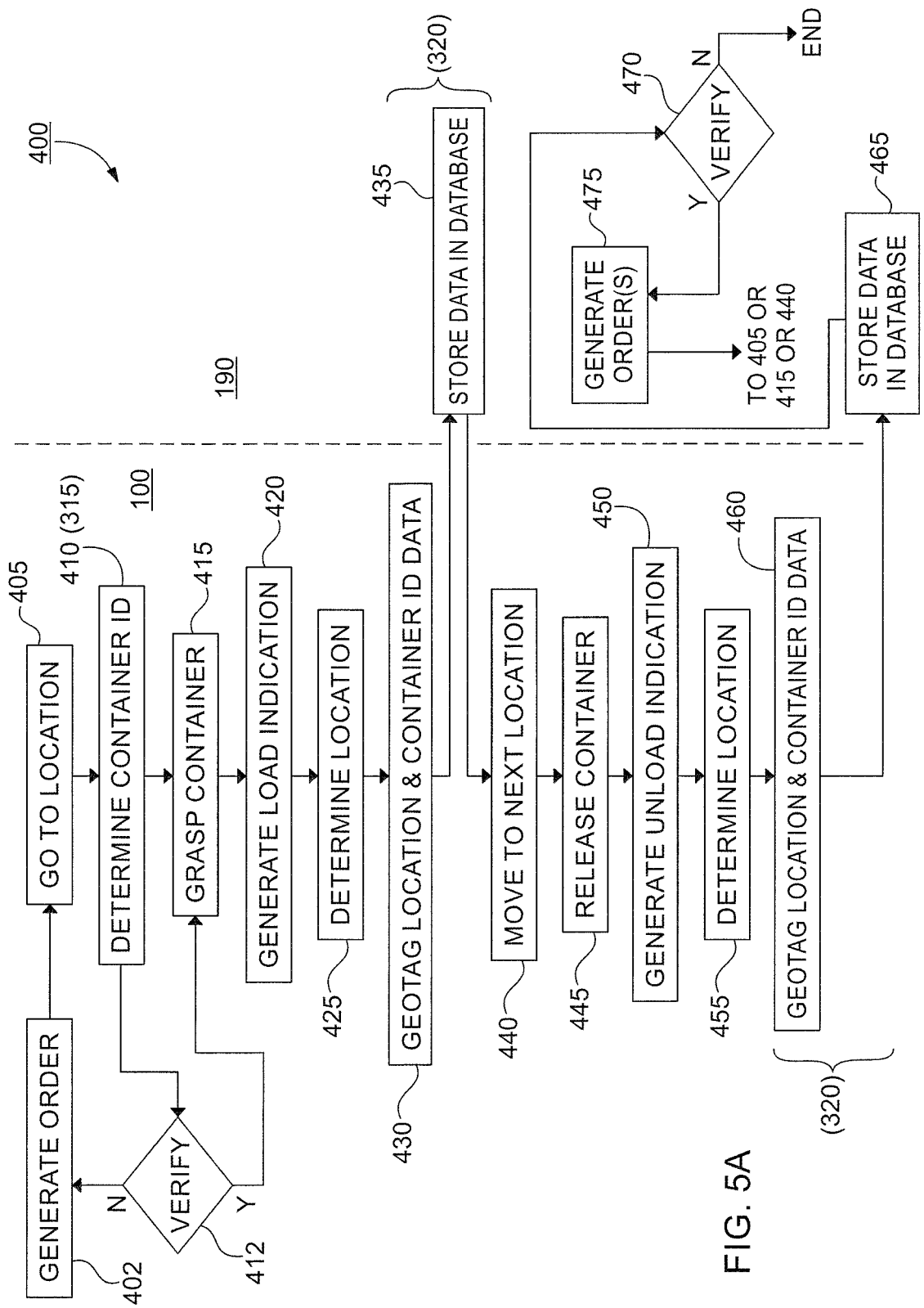
FIGS. 5A and 5B are flow diagrams illustrating certain aspects of the example embodiment of a method or process of FIG. 5 relating to the example facility.
Figure 5B:
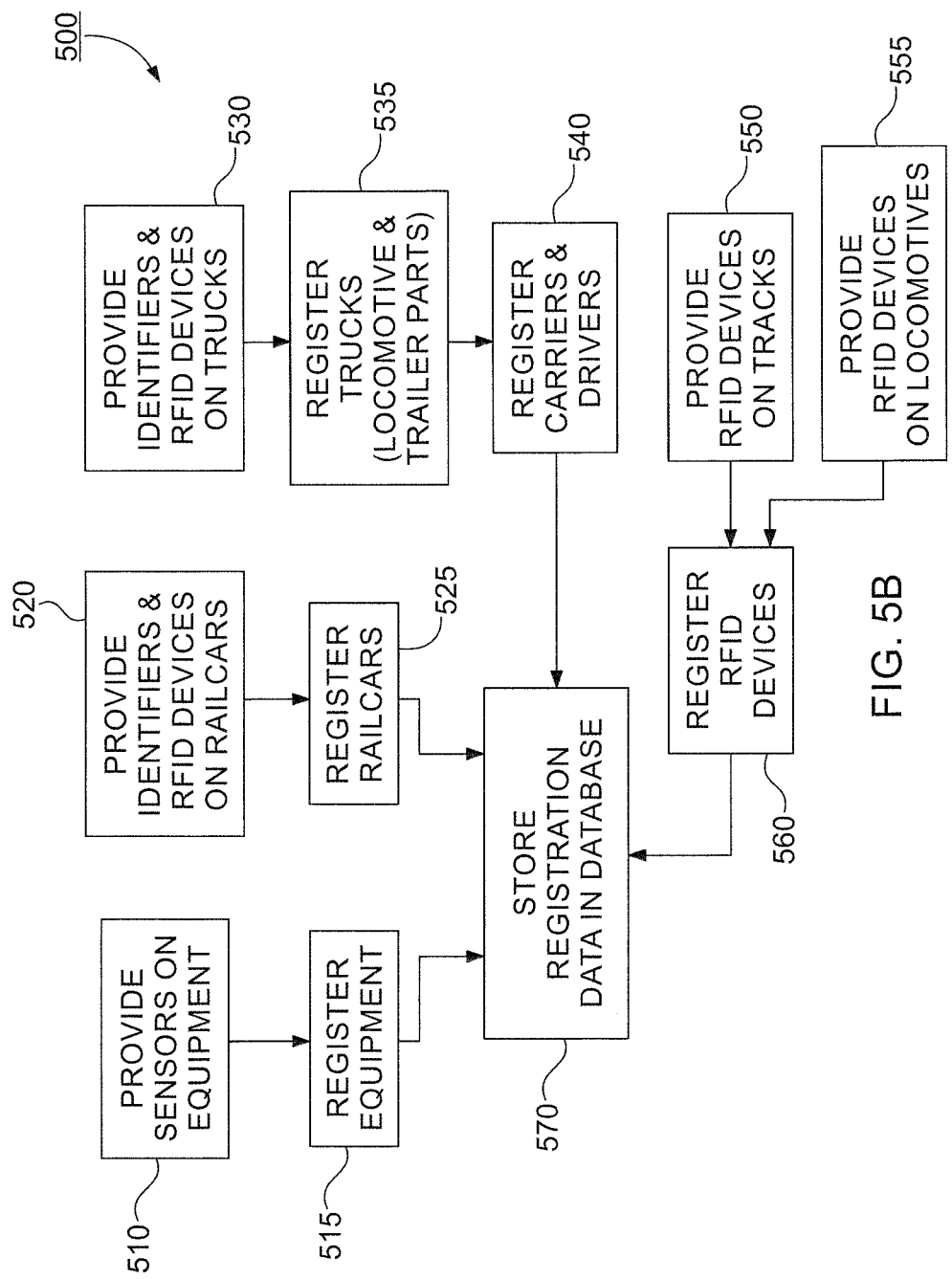

FIGS. 5A and 5B are flow diagrams illustrating certain aspects 400, 500 of the example embodiment of a method or process 300 of FIG. 5 relating to the example facility 100. Process 400 relates to details of the aspect of process 300 of transferring (moving) a container 110 from one location to another, whether that be from a carrier to the facility 100, from the facility 100 to a carrier, or between locations of facility 100, and combinations thereof. Such transfer or movement is typically initiated by generating 402 an order to do so, e.g., a transfer order or a movement order. The vertical dashed line indicates that while most of process 400 is performed at facility 100, a portion thereof, e.g., the storing of data, usually is performed at a central facility 190 or control facility 190 that may be at or remote from facility 100.

Equipment, e.g., a gantry 120, lifting truck 130 or forklift 140, is sent 405 to the location at which the container 110 to be retrieved is located as determined from the database 190D, e.g., from the geo-tagged location data for the most recent record relating to that container 110. At that location the identity of container 110 is determined 410 (315), e.g., by one or more of the sensors of sensor set 200 of the equipment reading the identifying information 116 and/or the RFID device 118 thereof, and if that is the correct container 110, then that container 110 is grasped 415 by the equipment, e.g., by the lifting head thereof.

Optionally, and preferably, at least the container identity may be verified 412 against the transfer order for verifying 412 that the correct container has been located. If not, then a further transfer order can be generated 402 and/or otherwise locating the correct container 110 may commence. If the correct container has been located, then physically moving the container 110 commences. Grasping 415 the container 110 generates 420 a load indication, e.g., from load/unload sensor 240 or by operator action, and the location of the equipment and/or container is determined 425.

The determined 425 location and container identifying data is geo-tagged 430 and is stored 435 in database 190D, e.g., typically at a central or control facility 190. Optionally, and preferably, when the location data and identification data is stored in the database, the control system can check 470 both the location data and the identifying data against the like data that was set forth in the order 402 to transfer and/or move the container 110 to verify 470 that the transfer and/or move was completed properly. If not completed properly 470-N, a corrective order may be generated 475 and/or one or more supplementary orders may be generated 475 so that the desired movement of container 110 is subsequently completed properly.

The equipment carrying the grasped container 110 then moves 440 to the next location where the container is to be moved, and releases 445 the container 110 to the designated location e.g., for storage, or onto the designated carrier, e.g., for transport. Releasing 445 container 110 generates 450 an unload indication, e.g., by a load/unload sensor 240 and/or operator action, which in turn causes the location of container 110 to be determined 455. The determined location data and container identification data is geo-tagged 460 and is stored 465 in database 190, thereby to complete the transfer or moving of the container 110 from its previous location to the designated location where it then resides.

It is noted that steps 430-435 and 460-465 together comprise the step 320, e.g., as described in relation to FIG. 5 and otherwise herein.

Process 500 of FIG. 5B relates to the equipping and registration of equipment, carriers and infrastructure associated with facility 100 and with process 300 therefor. Steps of process 500 may be performed at around the same time, e.g., when a facility 100 including the arrangement described herein is being established, or may be performed at different times, e.g., as various equipment and/or carriers become associated with a facility 100. For proper and complete operation of facility 100 according to method 300, equipment and carriers associated therewith need to be equipped with various devices, e.g., one or more sensor sets 200, that provide the various kinds of data that is to be stored in the database 190D. In some cases, personnel, e.g., equipment operators and truck drivers, may also be registered.

One or more sensor sets 200 are provided 505 on each of the various types and kinds of equipment, e.g., gantries 120, lifting trucks 130, forklifts 140 and the like, associated with facility 100. Each item of equipment is registered 515, and the registration data therefor is stored 570 in database 190D and/or in an auxiliary or facility database. Registration data typically includes, e.g., the type of equipment, the equipment identity, information pertaining to the sensors of sensor set 200 provided thereon, and the like, and optionally may include various operating and maintenance data that is useful in operating and/or maintaining the equipment.

Operators of such facility equipment may be, and preferably are, registered 515 and are provided 510 identification, e.g., chip cards and/or RFID badges, that can be read for authorizing operation of equipment on which the operator is qualified and/or assigned to operate and for tracking the location and operation of such equipment. Additional facility personnel identifiers, e.g., fingerprint, facial image recognition, and other biometric identifiers, may also be employed and registered 515.

Identifying information 166 and RFID devices 168 are provided 520 on each of the various types and kinds of rail carrier equipment, e.g., rail cars 160 and flatcars 160, and the like, that will deliver and/or remove containers 110 to and from facility 100. Each item of rail carrier equipment is registered 525, and the registration data therefor is stored 570 in database 190D and/or in an auxiliary or rail carrier database. Registration data typically includes, e.g., the type of rail car, the railcar identity including both identifying information 166 and RFID device 168 data, and if any sensors are provided thereon, then information pertaining to those sensors would also be registered 525 and stored 570. Typically, the identifying information is applied by the railcar owner or operator and the RFID devices are expected, at least initially, to be provided by facility 100 the first time a rail carrier arrives at facility 100. Eventually virtually all rail cars will have RFID devices thereon and will simply need to be registered with their corresponding identifying data and RFID device data.

Identifying information 186 and RFID devices 188 are provided 530 and one or more sensor sets 200 may be provided 530 on each of the various types and kinds of road carrier equipment, e.g., trucks 180, truck locomotives 182L, truck trailers 182L, and the like, that will deliver and/or remove containers 110 to and from facility 100. Each item of road carrier equipment is registered 535, and the registration data therefor is stored 570 in database 190D and/or in an auxiliary or road carrier database. Registration data typically includes, e.g., the type of road equipment, the identity thereof including both identifying information 186 and RFID device 188 data, registration plate 184 data, information pertaining to the sensors of sensor set 200, if any, provided thereon, and the like.

Typically, identifying information 186 is applied by the truck owner or operator and the RFID devices 188 are expected, at least initially, to be provided by facility 100 the first time a truck locomotive 182L or trailer 182T arrives at facility 100. Many truck locomotives 182T presently have at least a location sensor thereon, e.g., a GPS device that may or may not be in communication with the truck owner or operator, provided by their owners and operators, and so as the arrangement described herein proliferates to various facilities, truck owners and/or operators are likely to equip their road equipment with additional sensors that are compatible with and part of a sensor set like sensor set 200. Eventually virtually all road carriers will have RFID devices thereon and will simply need to be registered with their corresponding identifying data and RFID device data.

Operators (drivers) of such road carrier equipment may be, and preferably are, registered 535 and are provided 530 identification, e.g., chip cards and/or RFID badges, and/or have identification, e.g., owner/operator credentials and/or government issued driver licenses, that can be read for authorizing at facility 100 the operation of road carrier equipment on which the operator is qualified and/or assigned to operate and for tracking the location and operation of such equipment. Additional road carrier personnel identifiers, e.g., fingerprint, facial image recognition, and other biometric identifiers, may also be employed and registered 535.

In addition, RFID devices may be provided 550, 555 for equipment that operates on rails at facility 100 and such RFID devices may be registered 560 similarly to that described. One RFID device is provided 550 on the rails or tracks and a complementary RFID device is provided 555 on the facility locomotives, e.g., tugs and switching engines, wherein one RFID device is a reader configured to read the other RFID devices. The identifying RFID devices may be passive RFID devices or active RFID devices. Identifying and location data regarding all of the foregoing RFID devices are registered 560 and are stored 570, e.g., in database 190D and/or in a facilities database as above. Location data thereof should be of sufficient accuracy that the particular track that the RFID device is mounted on is discernable.

In one arrangement, RFID identifying devices are provided 550 at known locations of the various tracks 152 of facility 100, e.g., mounted on crossties thereof and/or embedded in the road bed thereof. The specific location of each track RFID device may be programmed therein, or alternatively, may be determined by a GPS device thereof, to be transmitted with the RFID device unique identifier or the location may be associated, e.g., in database 190D and/or in another facility database, with the RFID device identifier. As various ones of the facility locomotives pass over the track RFID devices, RFID readers provided 555 on the under side of the facility locomotives read the track RFID devices whereupon the RFID device identifying data and/or its location data is geo-tagged and stored the aforementioned database.

Alternatively, RFID readers may be provided at known locations on the tracks 152 and RFID identifying devices may be mounted on the underside of the facility locomotives, to be registered and operated in like manner to the former arrangement. Because RFID readers typically require more electrical power to operate, this arrangement may be subject to higher maintenance, e.g., for replacing batteries of the track mounted RFID readers, or need electrical infrastructure, e.g., buried electrical cables.

The former arrangement is preferred because the track RFID devices may be passive RFID devices and so not need a source of electrical power or may be an active RFID device with a long life battery, e.g., a 5-10 year battery, thereby to reduce maintenance. RFID readers mounted to facility locomotives operate from locomotive on-board electrical power.

The equipment identifying data and location data acquired during operation of facility 100 is useful for tracking, monitoring, and managing, facility 100 and all of the equipment and carriers associated therewith and/or passing therethrough.

Figure 6:
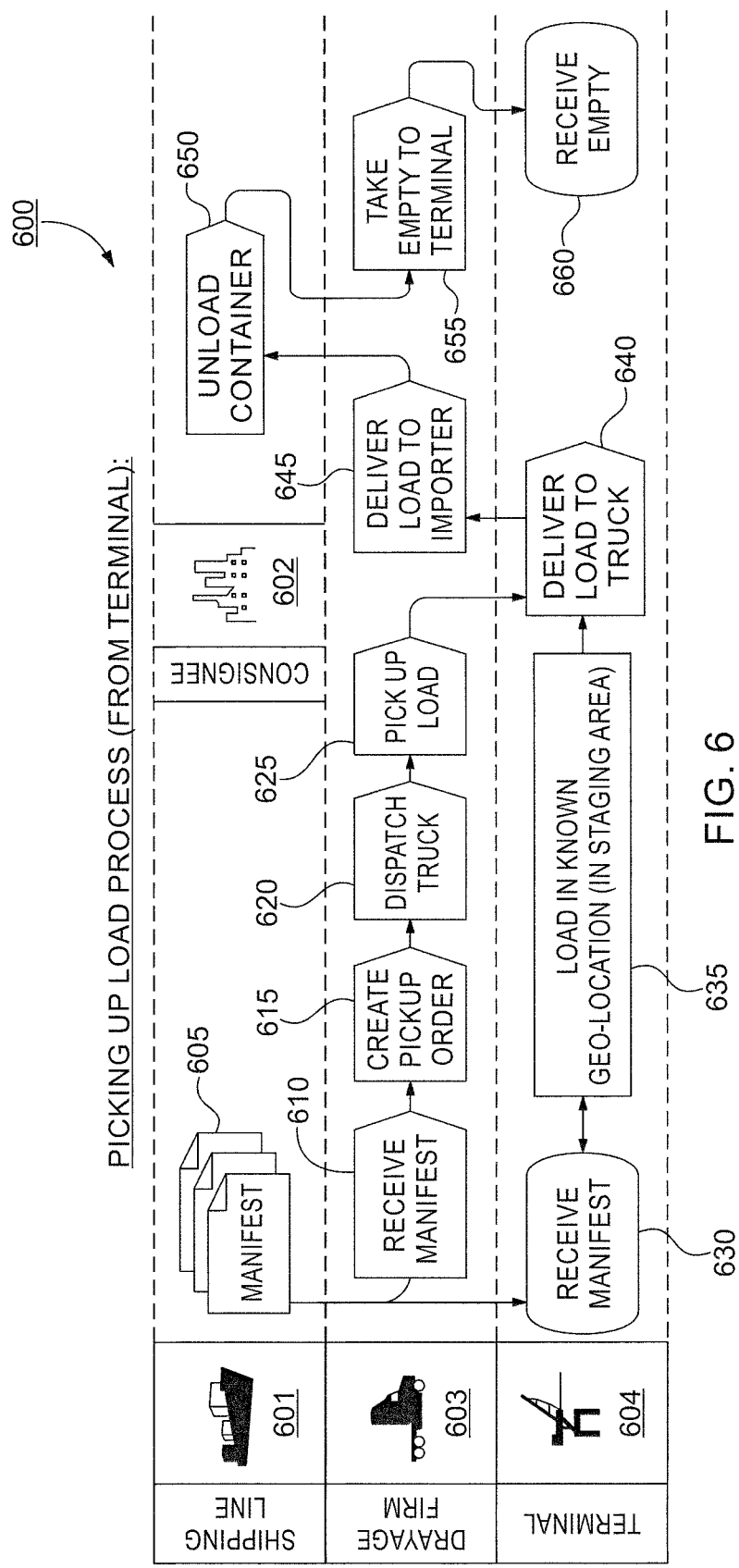
FIG. 6 is a flow diagram illustrating an example embodiment of a method or process relating to picking up loads at the example facility.

FIG. 6 is a flow diagram illustrating an example embodiment of a method 600 or process 600 relating to, e.g., picking up loads at the example facility 100. In this example process 600, the parties involved include, e.g., a shipping line 601 which transports a container 110 to a facility 100 here referred to as a terminal 604, a consignee 602 which is the intended recipient for the contents of the container 110, a drayage firm 603 or trucking company 603 which transports the container 110 from the facility 100 (terminal 604) to the consignee 602, and the terminal which receives the container 110 and provides it to drayage firm 603, and which ultimately receives the emptied container 110 for further use and/or disposal. The terminal facility 100 and the equipment thereof includes that described herein.

Shipping line 601 typically provides 605 a manifest that identifies the shipping container 110, the contents thereof, the source of the container, the source of its contents, the consignee of the container 110 and its contents, the drayage firm 603 that is to transport container 110 and/or the ultimate destination of the container, and possibly other information relating to the container 110 and/or the transaction that it is being utilized to perform. While traditional manifests have been paper documents, the manifest herein is typically an electronic communication, electronic document, and/or electronic file, that is communicated in the usual ways that such files are communicated, e.g., via various communication systems and/or links. Further, while a drayage firm is described in this example, and drayage sometimes implies a relatively short haul carrier, the carrier 603 may be a local, short haul, regional, and/or long distance or long haul carrier.

The provided 605 manifest is received 610 by the drayage firm 603 which creates 615 a pickup order for executing the manifest thereby initiating the dispatching 620 of an overland carrier, e.g., a truck 180, to pickup 625 the load, e.g., one or more containers 100. The pickup order preferably identifies the carrier 180 that will make the pickup and may identify the driver thereof. The pickup order preferably is communicated to the facility 100 and also preferably identifies the carrier vehicle 180 and the driver thereof, and provides carrier identifying information 186, 188 and preferably the biometric characteristic 189 of the driver.

In parallel therewith, facility 100, also referred to as terminal 100, 604, receives 630 the manifest and initiates a search 635 of the facility database 190D to identify 635 the area of facility 100, 604 in which the manifested containers 110 are in or are to be moved to, e.g., a staging area, at which the one or more containers 100, e.g., the load, are to be delivered 640 to the drayage carrier, e.g., a truck 180. These operations of facility 100, 604 employ steps of the method 300 described herein.

The foregoing parallel operations within method 600 are intended to bring together at a determined time and place, e.g., within terminal facility 100, 604, a designated carrier and one or more designated containers 110. Accordingly, and preferably, there is, substantive communication and/or coordination between the drayage firm 603 and the terminal 604 (indicated by the double ended arrow between dispatching step 620 and container staging step 635) so that the availability of the one or more containers 110 in a designated pickup location within terminal facility 100, 604 is consistent with the designated arrival of the carrier at the terminal facility 604 and is known to the drayage firm, e.g., to its operations management or dispatcher as well as to the operator, e.g., driver, of the truck 180.

This illustrates another advantage of the present arrangement in that not only are the precise present locations of containers 110 in facility 100 precisely known at all times for improving the operation and efficiency of facility 100, e.g., a terminal 604, but the present arrangement also coordinates the operation of facility 100 with external transport elements, e.g., ship operators, rail operators, overland carrier operators, and the like, so that their combined operations and efficiency may also be improved.

Carrier/truck 180 then transports and delivers 645 the one or more containers 110 called for by the manifest to consignee 602 which unloads 650 the one or more containers 110. Unloading 650 may include unloading one or more containers 110 from the carrier vehicle, e.g., truck 180, or unloading the contents of the one or more containers 110, or a combination thereof. Carrier 603 then takes 655 or transports 655 the empty container 110 or containers 110 to terminal 604 which receives 660 the empty container 110 following again steps of method 300.

This is only one example as many different sequences of events and/or additional parties may be involved in the basic picking up of a container 110 from a facility 100, 604. A railroad or freight company may replace the shipping carrier 601 and drayage carrier 603 may be replaced by a railroad or freight company, and the like. In addition, a container may pass through one or more additional facilities 100, 604 en route from the shipping carrier 601 to the ultimate consignee 602.

In any event, the described system and method provides for real time identification, tracking and monitoring of containers 110, carriers 180 and personnel therefor, including their locations, route and arrival information, including predicted arrival time, to all involved parties, including to the consignee, carrier operator (drayage firm) 603 and carrier driver, e.g., via the smart device application described. Additional data may be acquired and transmitted by the smart device if being used by an operator of equipment or a carrier.

Figure 7:
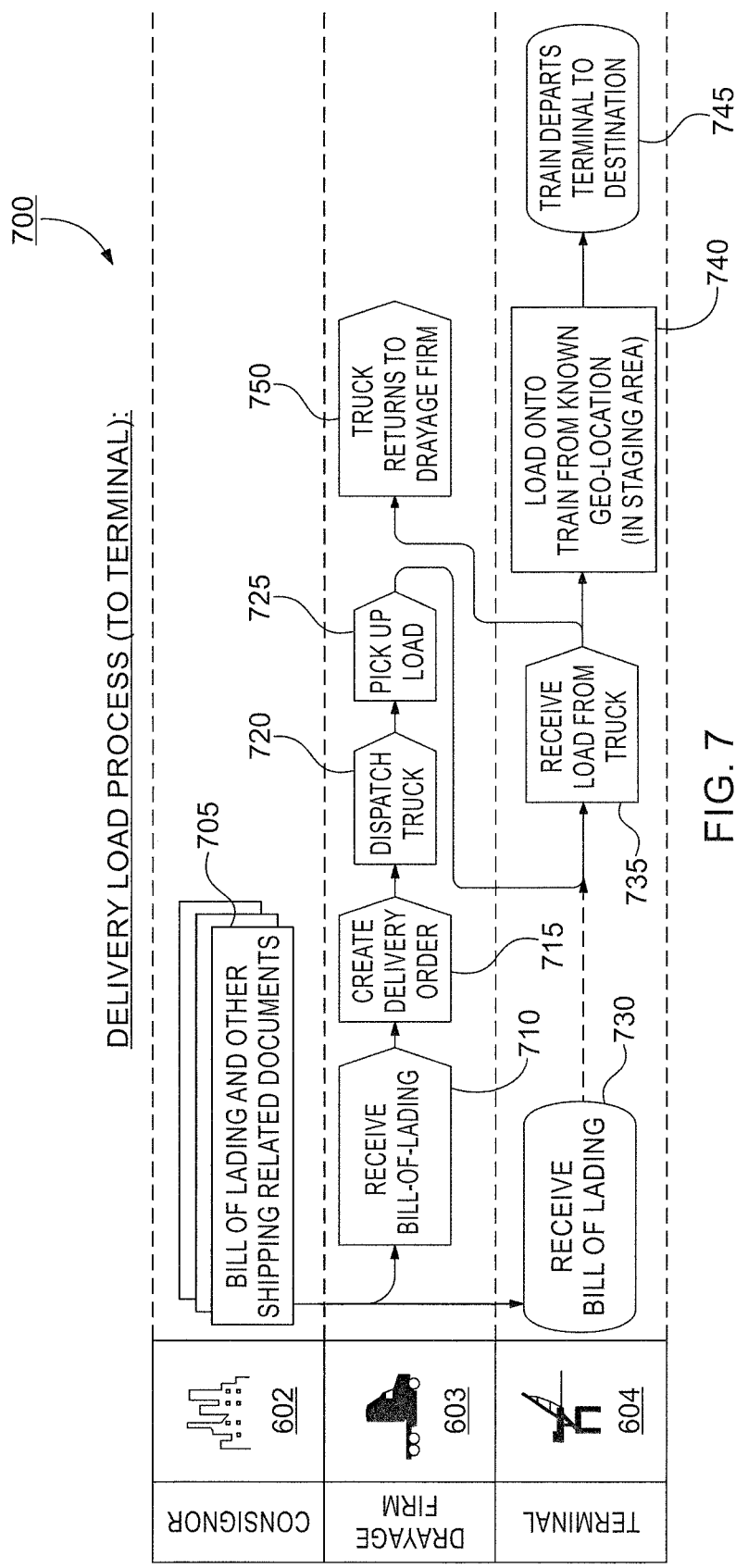
FIG. 7 is a flow diagram illustrating an example embodiment of a method or process relating to delivery of loads at the example facility.

FIG. 7 is a flow diagram illustrating an example embodiment of a method or process 700 relating to, e.g., delivery of loads at the example facility 100. In this example process 700, the same parties may be involved as in process 600 including, e.g., a facility 100 here referred to as a terminal 604 which is to receive a container 110, a consignor 602 (the same item number is used as for consignee 602 since the same entity may be both a consignor and a consignee, although that need not be the case) which is the originator of the contents of the container 110, a drayage firm 603 or trucking company 603 which transports the container 110 from the consignor 602 to facility 100 (terminal 604), and the terminal 604 which receives the container 110 from the drayage firm 603 and delivers the container 110 to a rail car (train) or other carrier for transport on its way to its destination. The terminal facility 100 and the equipment thereof includes that described herein.

Consignor 602 begins process 700 by generating a bill of lading, manifest and/or other shipping documents that are communicated to drayage firm 603 which is to transport one or more containers 110 and to terminal 604 which is to receive container 110 from drayage firm 603. These documents may be in various form as described above, and the various carriers and facilities may also take various forms as described.

Drayage firm 603 receives 710 the bill of lading and/or other shipping documents and creates 715 a delivery order assigning various carrier equipment and personnel to perform the transport requested 705 by the bill of lading and/or other shipping documents. The delivery order preferably identifies the carrier 180 that will make the pickup and may identify the driver thereof. The delivery order preferably is communicated to the facility 100 and also preferably identifies the carrier vehicle 180 and the driver thereof, and provides carrier identifying information 186, 188 and preferably the biometric characteristic 189 of the driver.

A carrier, e.g., a truck 180, is dispatched 720 to the consignor 602 location whereat the load, e.g., one or more containers 110, is picked up 725. Carrier/truck 180 then transports the one or more containers 110 to terminal 604 where the load, e.g., the one or more containers 110, are received 735 from the carrier/truck 180, including identifying the carrier 180 and container 110 and storing the geo-tagged data relating thereto as described in relation to process 300 herein.

Prior to the arrival at terminal 100, 604, of carrier/truck 180 with the one or more containers 110, the bill of lading and/or other shipping documents communicated by consignor 602 are received 730 by facility 100, 604 which generates the necessary orders and/or records for receiving 735 the one or more containers 110. When carrier/truck 180 and the one or more containers 110 arrive at terminal 604 where the load, e.g., the one or more containers 110, are received 735 from the carrier/truck 180 and the carrier 180 and one or more containers 110 are identified and the geo-tagged data relating thereto is stored in the relational database 190D as described in relation to process 300 herein.

At terminal 100, 604, the load received 735 from truck 180 is moved within terminal 604, e.g., to be retrieved from a known geo-tagged location (initially the location where it is received from truck 180 and/or from where it is subsequently stored, e.g., in a staging or storage area) to be loaded 740 onto a designated railcar or other carrier. In all of the receiving, unloading, storing, and loading that occurs within terminal 100, 604, and in departing 745 therefrom, geo-tagged data, e.g., location data and identity data of container 110, relating thereto is acquired and stored in the relational database 190D in accordance with process 300 described herein.

Once the load is delivered 735 to terminal 604, the unloaded truck 180 is free to return 750 to drayage firm 603 or to proceed to a different destination, e.g., a different consignor or consignee 602, empty or carrying a different load, e.g., one or more different containers 110, received from terminal 604, e.g., in accordance with process 600 herein.

As stated regarding process 600, many variations and alternatives are expected in process 700 regarding this one example because many different sequences of events and/or additional parties may be involved in the basic delivery of a container 110 to facility 100, 604.

In any event, the described system and method provides for real time identification, tracking and monitoring of containers 110, carriers 180 and personnel therefor, including their locations, route and arrival information, including predicted arrival time, to all involved parties, including to the consignor, carrier operator (drayage firm) 603 and carrier driver, e.g., via the smart device application described. Additional data may be acquired and transmitted by the smart device if being used by an operator of equipment or a carrier.

Figure 8:
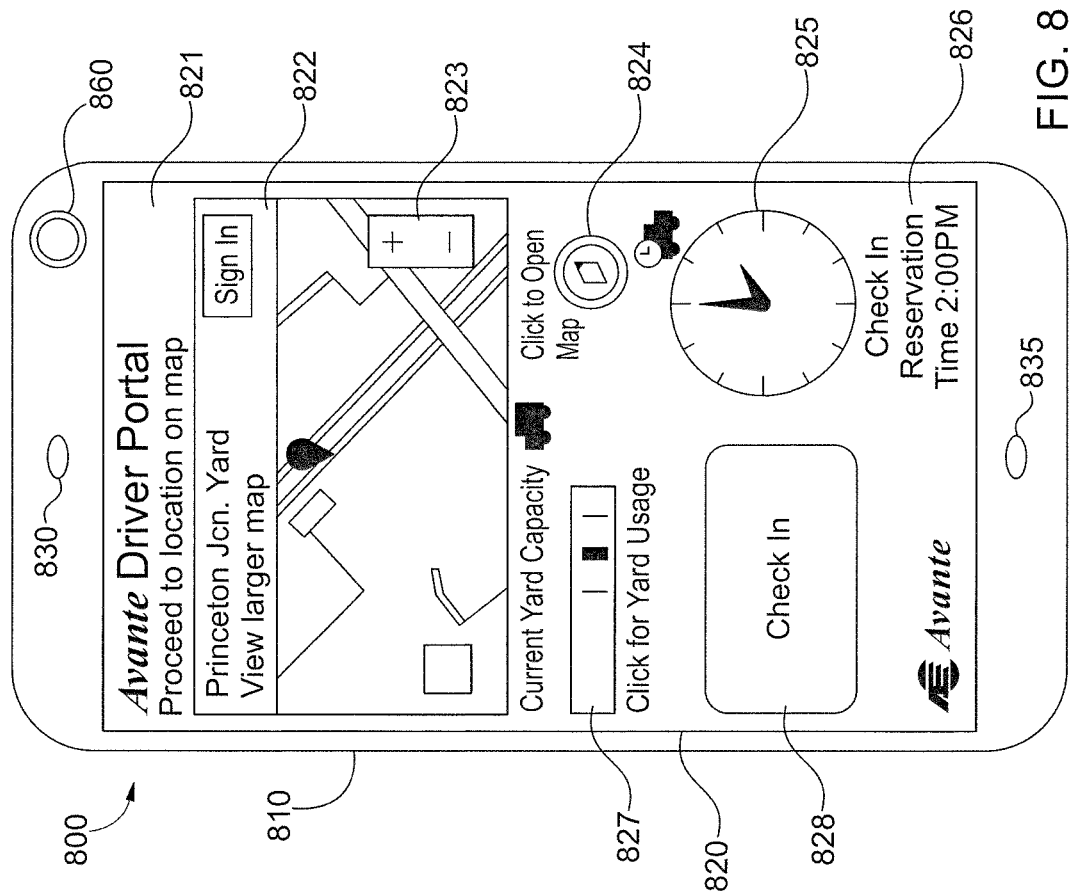
FIG. 8 is a schematic diagram illustrating an example embodiment of an electronic device usable with the example facility and example method described herein and FIG. 8A is a schematic block diagram of an example embodiment thereof.
Figure 8A:
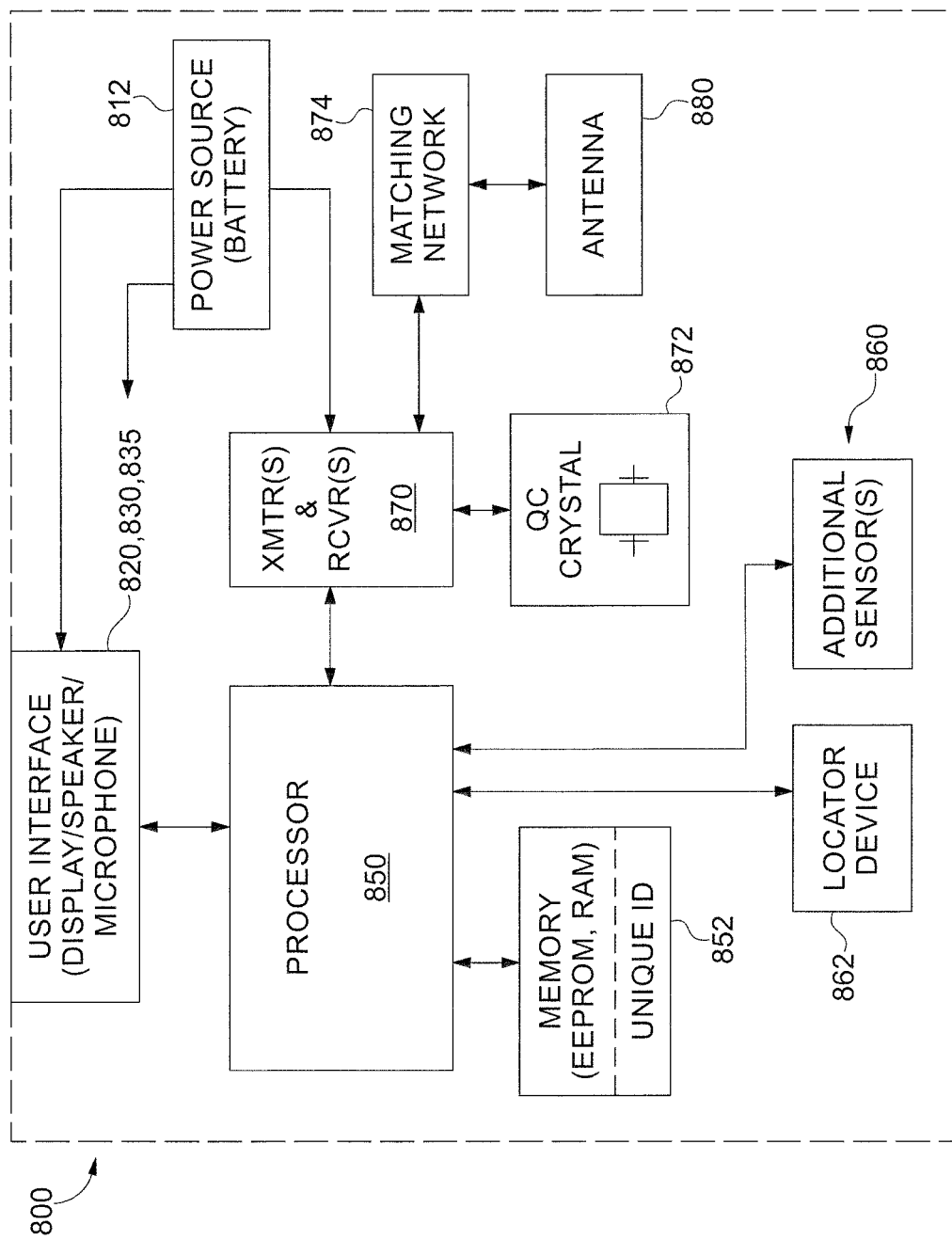

FIG. 8 is a schematic diagram illustrating an example embodiment of an example electronic device 800 usable with the example facility 100, 150, 170 and example method 300, 400, 500 described herein and FIG. 8A is a schematic block diagram of an example embodiment thereof. Example electronic devices 800 include a real time locating system (RTLS) that includes a global positioning device or an additional function that operates in conjunction therewith so that the location of incoming and outbound cargo, e.g., inbound and outbound carriers 180 and containers 110, is known in real time for facilitating logistical planning and execution of such plans, and the automated logging in of arriving and departing carriers 180, all preferably without the need for or the generation of paper records.

Example electronic device 800 includes a housing or case 810 which contains the various functional elements thereof. At the surface of housing 810 is a user interface 820, 830, 835 that provides and receives audio and visual indications to and from a user of carrier electronic device (CED) 800. User interface 820, 830, 835 includes visual transducer 820, e.g., a display screen 820, to provide information to a user in human perceivable visual form, audio or sound transducer 830, e.g., a speaker 830, to provide information to a user in human perceivable audible form, and audio transducer 835, e.g., a microphone 835, to receive information from a user in audible form, thereby being configured to provide information to a user in human perceivable form and to receive information from a user.

Carrier electronic device 800 may be and preferably is a smart phone or cellular telephone or tablet computer as illustrated, or may be a personal digital assistant, or similar electronic device 800, and may be portable to the user or installed or connected to the carrier vehicle 180. A software application (e.g., an "app" in everyday parlance) is preferably downloaded to CED 800 by or from facility 100, 150, 170 or an affiliate thereof to provide the functionality described herein. Such app may be specific to a particular facility 100, 150, 170 or may be or become a standardized app that is compatible with and usable for plural facilities 100, 150, 170, e.g., a standardized software application adopted by an industry to be compatible with various facilities and systems thereof.

An example screen display is illustrated on the monitor or display 120 of CED 800 wherein a header 810 provides identifying information for the screen, e.g., the source ("Avante" for Avante International Technology) and name ("Driver Portal") for the app, and an information bar 821 identifies the location displayed on the map 823 immediately below. The header bar 822 may include a link "View larger map" that enlarges the map to substantially full screen and the map 823 may include a zoom-in and zoom-out button represented by the "+" and "−" symbols in a box.

On display 820 below the foregoing header 822 and map 823 are several buttons that initiate functions and several iconic elements to communicate information to a user. "Click to open map" opens and removes the map display 823 while compass arrow 824 provides an azimuth reference for map 823. Clock face icon 825 and the "Check in reservation time . . . " message on the right hand side of display 820 indicate the time slot that has been reserved for carrier 180 to arrive at the entry (ingress) portal 170-I of a facility 100, 150, 170. Yard usage icon 170 indicates the degree that a yard 100, 150, 170 is presently being utilized and includes buttons "Current yard capacity" and "Click for yard usage" whereby the carrier operator, e.g., driver, can change what is displayed in icon 827. Finally a "Check In" button is provided which enables the driver to automatically check in by activating the "Check In" button upon arrival of the carrier vehicle 180 at the facility 100, 150, 170, e.g., at the entry (ingress) portal 170-I thereof.

Each CED 800 has a unique identifier stored in a memory 852 therein that is associated with each transmission made by CED 800 so as to become associated with data generated by CED 800 and to remain associated with that data when that data is stored in CED 800 as well as in a relational database, e.g., database 190C, that receives such data. Such unique identifier is typically assigned and permanently stored in each electronic device 800 as part of its manufacturing and/or set up, and is not changeable thereafter (except possibly by extraordinarily separate steps not capable of being performed by a user or service personnel). The unique identifier may be and preferably is associated with data generated by CED 800 and the geo-tagging and/or date-time stamping of such data as the data is generated. A unique identifier may be defined by the process of configuring the electronic device, e.g., during a setting up process or by installing a downloaded application (e.g., an "app").

Visual transducer 820, e.g., display screen 820, is coupled to processor 850 for receiving signals representing visual indications and/or notifications, e.g., instructions, images, alerts and warnings, to be provided to a user and preferably also for displaying video and/or still images that are communicated to processor 850. Visual transducer 820 preferably includes a display, e.g., a LCD display, an OLED display, or similar video display screen, but may also include a light, an LED, a flashing light, a light producing different colors, a heads up display, or other visually perceptible device that may be used to provide a notification.

Different visual devices 820 may be utilized to provide different kinds of notifications, e.g., images as compared to short messages, alerts and warnings. For example, a flashing amber light may be used to communicate an alert and a flashing red light a warning; a display screen and/or heads up display may be used to communicate what the alert or warning is and what action should be taken. Visual transducer 820 may be utilized independently of or in conjunction with any other user interface device. CED 800 may also include an imaging device, e.g., imager 860, to capture images, e.g., still and/or video images, for transmission to a monitoring station, thereby to enable monitors and/or managers at a remote location to "see" what personnel in the field are seeing.

Audio or sound transducer 830 is coupled to processor 850 for receiving signals representing audio indications and/or notifications, respectively, e.g., instructions, alerts and warnings, to be provided to a user of CED 800, and for communicating signals representing images and/or video images to processor 850. Processor 850 in turn couples the audio and/or visual signals to memory 852 to be stored and/or to transmitter 870 to be communicated to a monitoring system, e.g., to remote facility 190 and the equipment and database thereof. Sound transducer 830 may include a buzzer, beeper, annunciator, loudspeaker, earphone or other humanly perceptible device that may be used to provide an audible notification, and different audible devices may be utilized to provide different kinds of notifications, e.g., messages, alerts and warnings. For example, an on/off buzz or tone may be used to communicate an alert and a different on/off or continuous buzz or tone a warning; a loudspeaker or earphone may be used to communicate the alert or warning and/or what the alert or warning is and what action should be taken. Audible transducer 830 may be utilized independently of or in conjunction with any other user interface device.

Sound transducer 830 preferably also includes a microphone 835 or other sound pick up device 835 so that sound at the location of CED 800, voice communication from a user, can be communicated to facility 190, to an entity owning, operating and/or controlling a carrier, or to another monitoring station. Thus two way voice communication between a user of CED 800 and control facility 190 can be established, and used when necessary between personnel, e.g., to coordinate actions. It is noted that ordinarily, information is communicated to CED 800 from a control facility 190 associated with a facility 100, 150, 170 and/or with an owner, operator or controlling entity of a carrier 180.

Sensor element 860 includes at least a locator device 862 that determines the location of carrier 180 in latitude, longitude, and optionally elevation, in real time. A locator device 862, e.g., a global positioning system receiver, preferably determines the location of CED 800 from precise and reliable signals provided by an external source such as a satellite navigation system, a cellular system or other signal source. Suitable and available location determining satellite systems include, e.g., the US Global Positioning System (GPS), the Russian GLONASS system, the European Galileo system, the Indian IRNSS system and/or the Chinese BDS system.

A preferred locator device 862 utilizes the US GPS system with Wide Area Augmentation System (WAAS) which augments GPS to improve its locating accuracy to within about three meters (conservatively), and typically to within one meter horizontally and 1.5 meters vertically, where it is available, e.g., primarily in the continental United States, Alaska and Canada. The terms "global positioning system" and "GPS" are used herein to refer generically to any system for determining location from signals transmitted from a remote source, e.g., most commonly from an earth orbiting satellite, such as the "US GPS" system.

While two or more different and independent global positioning system receivers could be employed so that geographic location data is available even when one GPS system is out of range or out of service, the power consumption of locator device 862 may render such duplication impractical at present due to the limited capacity of battery 812. Alternatively, and in some instances preferably, locator device 862 may employ an inertial sensor, e.g., a gyroscopic device or accelerometer, to supplement the GPS locating device so that location data is provided substantially continuously even though signals from the GPS satellites may be obscured, masked, or interrupted.

Further, location data may be obtained by monitoring the strength and/or triangulation of signals transmitted by transmitter-receiver 870, e.g., a received signal strength indication (RSSI) from WiFi and/or Bluetooth and/or other protocol signals, received at CED 800 and/or at a relay and/or monitoring station, so that location data is provided substantially continuously even though signals from the GPS satellites may be obscured, masked, or interrupted. The RSSI locating device and trilateration (or triangulation) function may be provided by processor 850 in conjunction with transmitter-receiver 870 and may be considered as part of locator device 862, and/or of any other sensor 860. An example of an RSSI based locating system and method is described in U.S. Pat. No. 7,342,497 entitled "Object Monitoring, Locating, and Tracking System Employing RFID Devices" which is hereby incorporated herein in its entirety by reference.

Locating and tracking (which is merely an aggregation of locations over a period of time) will thus facilitate processing of the carrier upon its arrival at the facility 100, 150, 170 by making its arrival time known by a reasonably accurate estimation providing the facility 100, 150, 170 operator to plan for the handling of the carrier and any container 110 it may be carrying, upon its arrival by pre-assigning and pre-positioning container handling equipment 120, 130, 140 and storage/transfer locations within facility 100, 150, 170. Such notification may be based upon predetermined criteria, e.g., an operations plan, and/or by situational circumstances, e.g., the availability of container handling equipment, storage locations, other operations, e.g., planned placement and/or removal of containers 110 from storage locations, other carriers and the like.

In addition, an accelerometer motion sensor and/or an inertial motion device or both may indicate motion as a function of time that can be stored and processed to track the direction and distance a carrier of the device 800 moves, thereby to augment the locating function to include an indication of a present location relative to a previous location, even when there is no suitable GPS signal and/or the network signals used to determine location may be weak and/or subject to interference.

In addition, CED 800 may optionally include one or more sensors 860 having a field of view outward for sensing things and/or conditions in a predetermined direction relative thereto, e.g., most commonly in a "forward looking" direction. One or more imaging sensors 860 are typically included in housing 810 of CED 800 for capturing still and/or video images that are relayed to monitoring personnel in a remote monitoring station. e.g., facility control 190. Imager 860 may include an imager on the monitor screen 820 face of device 800, or may include an imager 860 on the rear face thereof, i.e. opposite to monitor screen 820, or may include imagers 860 on both faces of device 800. Imagers 860 may have zoom, face detection and/or other capabilities as are common for modern smart phones and similar devices.

This imaging 860 function allows for the carrier operator to transmit images of, e.g., identifying marking on the carrier vehicle 180 and/or on a container 110 thereon, or images of the operator's face, e.g., for biometric facial recognition and verification of the identity of the driver, which is useful when data is missing or its accuracy may be questionable or when verification of data is desired. Preferably, processor 850 of CED 800 processes the image signals, stores (records) them in memory 852, as well as couples them to transmitter-receiver 870 for transmission to monitoring station 190, preferably geo-tagged with the location data of carrier 180 and substantially in real time.

Transmitter-receiver 870 may include one or more transmitters that are coupled to processor 850 for receiving from processor 850 and memory 852 the unique identifier of CED 800 and data to be transmitted via matching network 874 and antenna 880 which are contained in housing 810. Transmitter-receiver 870 also includes one or more receivers that are coupled via matching network 874 to antenna 880 for receiving data signals thereat that are coupled to processor 850 to be processed thereby and/or stored in memory 852, and received data may be identified by including in the received data the unique identifier of the CED 800 to which it is intended to be sent.

Transmitter-receiver 870 preferably includes transmitters and/or receivers operating for several different communication protocols and/or in several different bands, including but not limited to WiFi, Bluetooth and other networking communication, VHF and/or UHF bands, cellular telephone, 3G and 4G and 5G LTE and other bands, so that CED 800 can communicate, e.g., via a cellular network or other communication path with facility 100, 150, 170 and other devices 800.

A crystal 872, or other frequency setting device 872, is provided to control the operating frequency of transmitter-receiver 870 so that data is transmitted and received at a predetermined frequency or frequencies, e.g., at about 433 MHz and/or other frequencies. Crystal 872 may also be utilized to control the clocking signals of processor 850, e.g., if processor 850 does not include a stable frequency reference and/or clock generator.

Memory 852 coupled to processor 850 may include volatile and/or non-volatile memory, e.g., EEPROM and/or RAM memory, for storing operating instructions for processor 850 by which operation of CED 800 is controlled, and for storing data captured by CED 800, e.g., by elements 820, 830, 835, 860 thereof and/or received by CED 800 via antenna 880 and receiver 870.

Data generated by CED 800, e.g., generated by elements 820, 830, 835, 860 thereof, is processed and transmitted substantially in real time, i.e. within less than a few seconds, and preferably in less than one second, of when it is generated, whether provided directly to transmitter 870 by processor 850 or indirectly via processor 850 and memory 852. The data generated by CED 800 is associated in memory 852 with the unique identifier of that CED 800 and so is related thereto to be uniquely identified therewith when transmitted. Preferably, the data is also geo-tagged with the location data from locator device 862 and a date-time stamp, e.g., from the cellular and/or GPS systems.

Because GPS signals include precision time data, accurate time data is available and is preferably utilized to associate time data, e.g., a date-time stamp, with each data produced by CED 800. Thus, the combination of location data of locator device 862 and the accurate time data, all location data, motion sensor data and other sensor data may be and preferably is both geo-tagged to the location of CED 800 and with accurate time. Also preferably, time data, e.g., a date-time stamp, is communicated along with location data and other data transmitted from CED 800. A clock operating with crystal 872 may be employed to maintain ongoing time data if external time data, e.g., time data from a GPS signal, should be lost or interrupted.

Power source 812 typically includes a battery 812 with sufficient capacity to power CED 800 for at least 1.5 times the normal working period, e.g., a shift, whether that be an 8-hour shift or a 16-hour shift. Power source 812 is preferably rechargeable, and may be recharged from an electrical system of carrier 180 or another source of charging power.

Additionally, and/or optionally, supplemental power may be provided by a solar cell charger, fast charge pack, or other alternative power source.

Figure 9:
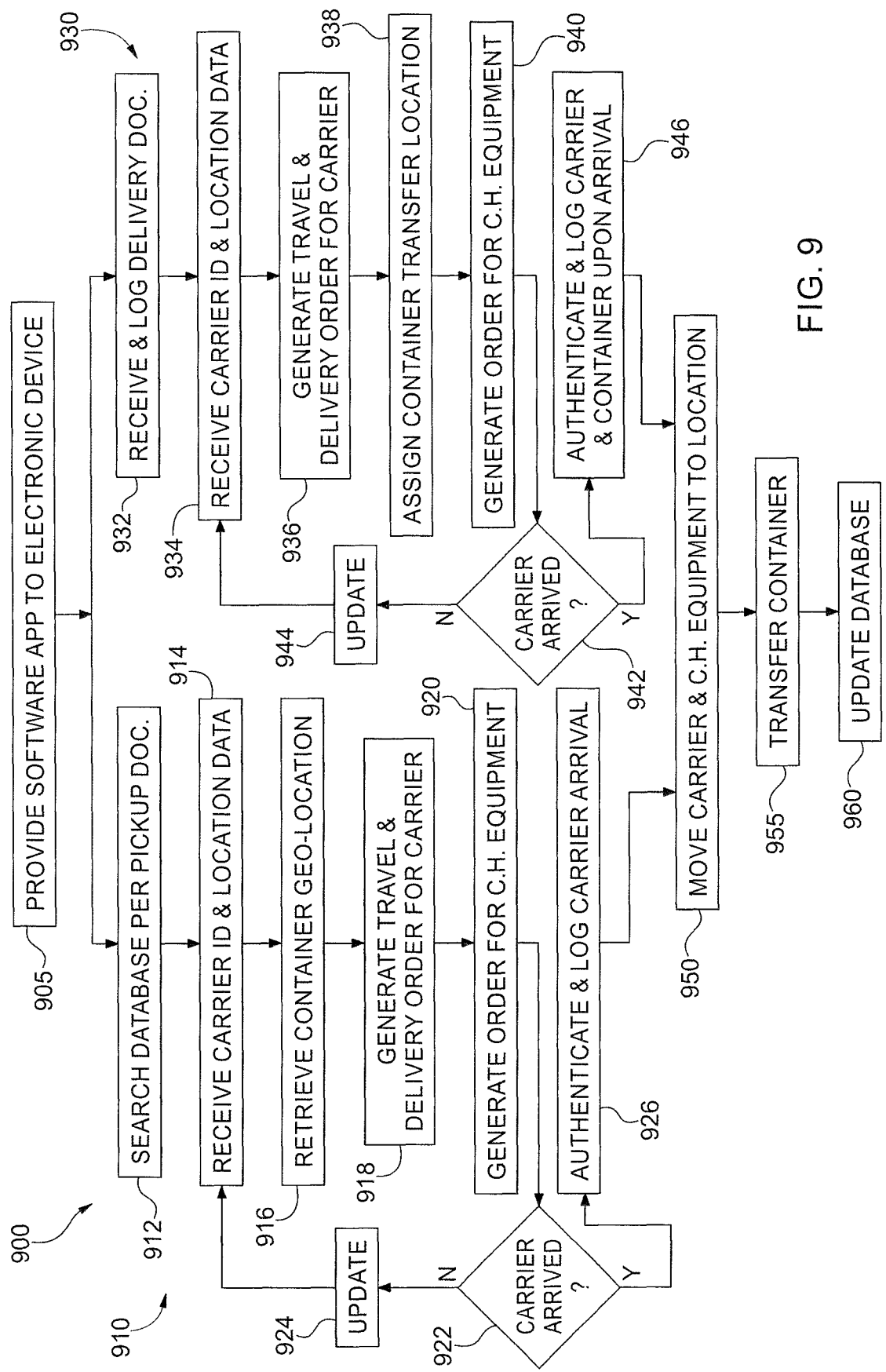
FIG. 9 is a flow diagram illustrating an example embodiment of an example method relating to the example electronic device of FIG. 8 when used with the example facility and example method herein.

FIG. 9 is a flow diagram illustrating an example embodiment of an example method 900 relating to the example electronic device 800 of FIG. 8 when used with the example facility 100, 150, 170 and example method 300, 400, 500 herein. Method 900 begins with providing 905 a software app to a CED 800 of a user, e.g., the operator of a carrier 180, which configures the device 800 to be operable and interoperable with the systems and methods of facility 100, 150, 170 and to cooperate with those systems and methods to facilitate cooperation between the carrier 180 and the facility 100, 150, 170, as described above, to the end of facilitating and improving the efficiency of the carrier 180 and the facility 100, 150, 170, and preferably both.

Desirably, the registration, and preferably pre-registration, of both carriers and drivers coupled with the real time tracking of their progress along their routes facilitates the automated providing of instructions and assistance to the carriers and their drivers whilst en-route to, upon arrival at and within facility 100, 150, 170, thereby reducing delays for both the carriers and the facility. Such real time tracking coupled with the automated reading of identifying information 116, RFID devices 118 and license plates 184 of carriers 180, e.g., by sensor sets 200, plus the automated identification of the pre-registered drivers thereof, e.g., using one or more of their biometric characteristics, further facilitates the providing of quick and easy and accurate, and paper free, access and departures from the facility.

Two complementary sub-processes 910 and 930 are illustrated in the diagram, one sub-process 910 relating to a carrier 180 picking up a container 110 at a facility 100, 150, 170 and the other 930 relating to a carrier 180 delivering a container 110 to a facility 100, 150, 170. The former may be considered in relation to the example pick up process of FIG.

6 and the latter in relation to the example delivery process of FIG. 7, although there may not be a one-to-one correlation therewith.

Preferably, each carrier 180, e.g., truck 180, and each operator thereof, e.g., the drivers thereof, is pre-registered with the facility 100, 150, 170, whether by a registration specific to that facility or by a registration common to plural facilities 100, 150, 170, including a standardized privately operated or governmentally operated registration system, e.g., the Uniform Intermodal Interchange Facilities Access Agreement (UIIA), and/or a Transportation Security Administration (TSA) and/or the US Coast Guard and/or a port authority registration system. Registration of carriers 180 typically includes creating verified records for each carrier vehicle 180, 182L, 182T, including, e.g., the identifying information 116 marked thereon, the RFID device 118 thereof, the registration tag or plate 184 thereof, the vehicle registration, the owner and/or operating entity thereof, the vehicle make, model, type and other characteristics, vehicle insurance, and the like.

Registration of operating personnel, e.g., drivers, assistants, and other carrier personnel, typically includes creating verified records for each person including, e.g., name, address, birth date, nationality, citizenship, physical characteristics (e.g., height and weight, eye and hair color), telephone number, commercial driver license (CDL) and other operating credentials, governmental port credentials as issued by the Transportation Security Administration (TSA) and/or the US Coast Guard and/or a port authority, employer name, employer address and other contact information, employee number or other identifier, one or more biometric identifiers including fingerprints, an image, a facial image, a voice print, a signature, a dynamic signature, and the like. Registration preferably also includes whatever background checks, safety checks, security checks and the like it may be necessary or desirable to conduct.

One example of a suitable registration system and method is described in U.S. Pat. No. 9,830,674 entitled Biometric Registration and/or Verification System and Method" issued to Amerasia International Technology, Inc. on Nov. 28, 2017, which is hereby incorporated herein by reference in its entirety. While the system and method thereof is primarily directed toward registering and verifying persons, it could be modified, e.g., by not using the biometric features, for registering objects such as carrier vehicles.

In sub-process 910, the database 190D is searched 912 in response to the information in a pick up document, e.g., bill or lading, manifest or other shipping document, that identifies a load, e.g., container 110, to be picked up and the carrier 180 that is to pick up that container 110. Receiving 914 carrier identification data and carrier location data provides data that is correlated 916 with the records of the database search 912 to retrieve 916 the geo-location of the identified container 110 in facility 100, 150, 170 from relational database 190D and to generate 918 the necessary travel orders and pick-up orders for carrier 180 to pick up the container 110. Generating 918 such orders typically includes estimating from the most recent location data for the carrier the arrival time of the carrier at entry portal 170-I and transmitting the travel and/or pick-up orders to the app of device 800 thereby to cause device 800 to display the map with container location, the reserved estimated arrival time, and the related information of display 820 thereof.

Similarly, generating 920 orders for container handling equipment 120, 130, 140 indicating the geo-location within facility 100, 150, 170 at which the container 110 is and from which it is to be picked up and transferred to the carrier, assigning specific container handling equipment 120, 130, 140 to move to the transfer location and at what time to be there to transfer the container to the carrier.

Generating 918, 920 the orders may be significantly more complex than might appear the case at first glance. For example, carrier 180 may not be on a direct and/or uninterrupted route to the facility 100, 150, 170, but may make planned and/or unplanned stops, may encounter detours and/or breakdowns or other events, which will have to be taken into account in scheduling and reserving its arrival time at portal 170-I of the facility 100, 150, 170, and probably more accurately, generating 918 additional orders rescheduling and modifying the reserved arrival time.

Likewise, and probably more likely, generating 920 orders for container handling equipment will be more complex. A possibly common occurrence would be that the container 110 to be picked up may not be in a location at which it can simply be transferred to the carrier 180 and/or retrieved. It might be necessary to move one or more other containers in order to grasp the desired container 110, e.g., where the desired container 110 is not at the top and at an accessible side of a stack of containers. Further, the location of the desired container 110 may not be one to which the carrier 180 can go, and so a simple transfer of the container 110 is not possible, necessitating it being moved to a different location from which it can be loaded onto the carrier. And those conditions may also require the handling of the desired container 110 by different container handling equipment, e.g., a gantry 120 to remove container 110 from a stack to where a lift truck 130 or fork lift 140 can grasp it and release it onto the carrier, either at the location at which the lift truck 130 or fork lift 140 grasps container 110 or another location to which it must move the container 110 in order to load it onto carrier 180.

Much of the foregoing is accomplished by testing 922 or determining 922 whether the carrier has arrived at the facility 100, 150, 170, e.g., at an ingress portal 170-I thereof. If carrier 180 has not arrived, path 922N is followed and updating 924 the relevant data ensues whereby updated orders are generated 918, 920 if necessary based upon the updated carrier location and estimated arrival time. This updating 924 also facilitates better utilization of container handling equipment since it can be assigned to other tasks if carrier 180 were to be delayed, thereby reducing idle time. Where plural operations are necessary to have the container 110 in proper position for transfer to carrier 180, those operations can be commenced in advance of carrier arrival, e.g., by the estimated time for such operations to be performed, thereby also facilitating more efficient operations.

If carrier 180 has arrived at facility 100, 150, 170, path 922Y is followed and process 900 continues by moving 950 the carrier 180 and/or container handling equipment 120, 130, 140 to the location whereat a container is to be transferred onto carrier 180, and by transferring 955 the container 110 onto the carrier 180. Updating 960 the database 190D with the data representing the transfer, e.g., container identity, location data, carrier data and the like, all preferably geo-tagged and date-time stamped, thus completing method 900, 910 wherein a container is picked up by a carrier.

In sub-process 930, the database 190D is searched 932 in response to the information in a delivery document, e.g., bill or lading, manifest or other shipping document, that identifies a load, e.g., container 110, to be delivered to facility 100, 150, 170 and the carrier 180 that is to deliver that container 110. Receiving 934 carrier identification data and carrier location data, and optionally but preferably container 110 identification data, provides data that will provide the basis for generating 936, 938, 940 orders relating to the impending container delivery.

Generating 936 the necessary travel orders and delivery orders for carrier 180 to deliver the container 110 to facility 100, 150, 170 typically includes estimating from the most recent location data for the carrier the arrival time of the carrier at entry portal 170-I thereof and transmitting the travel and/or delivery orders to the app of device 800 of the carrier 180 thereby to cause device 800 to display the map with container location, the reserved estimated arrival time, and the related information of display 820 thereof.

Determining 938 and/or assigning 938 a location at facility 100, 150, 170 at which the container 110 is to be delivered is performed using the data in the records stored in database 190D, in particular records relating to the delivery documents and forward shipping documents for the particular container 110 stored therein. Knowing in advance details of the container arriving and of its subsequent departure allows correlation of those database records to determine one or more locations at facility 100, 150, 170 at which container 110 can be stored so as to move it between its arrival at the facility and its later departure therefrom in an efficient manner, e.g., from arrival to initial unloading to transfers within the facility and in turn to its loading for departure therefrom. Among the determinative factors that may be considered are, e.g., identifying storage locations that are close to or at the next operational move or step of the container, identifying where at the storage locations the container will be stored so as to be easily accessible when the time comes for it next to be moved or transferred, whether that may be to another location at the facility or onto one or more carriers (e.g., boats, railcars, trucks, and the like) for transport elsewhere.

Similarly, generating 940 orders for container handling equipment 120, 130, 140 indicating the geo-location within facility 100, 150, 170 at which the delivered container 110 is to be unloaded from the carrier 180, transferred within the facility, and from which it will thereafter be picked up and transferred to another carrier, assigning specific container handling equipment 120, 130, 140 to move to the transfer location(s) and at what time to be there to unload the container 110 from the delivery carrier 180, and thereafter to transfer the container within the facility and to a carrier that will transport the container therefrom.

Generating 936, 940 the orders may be significantly more complex than might appear the case at first glance. For example, the delivering carrier 180 may not be on a direct and/or uninterrupted route to the facility 100, 150, 170, but may make planned and/or unplanned stops, may encounter detours and/or breakdowns or other events, which will have to be taken into account in scheduling and reserving its arrival time at portal 170-I of the facility 100, 150, 170, and probably more accurately, generating 918 additional orders rescheduling and modifying the reserved arrival time.

Likewise, and probably more likely, generating 940 orders for container handling equipment will be more complex. A possibly common occurrence would be that the container 110 being delivered may not be able to be stored in a location at which it can simply be transferred to the carrier 180 that will transport it onward. It is desirable to avoid having to move one or more other containers in order to store and/or retrieve the desired container 110, e.g., to avoid the desired container 110 not being at the top or at an accessible side of a stack of containers. Further, the location assigned to the delivered container 110 may not be one to which the carrier 180 can go, and so a simple transfer of the container 110 is not possible, necessitating it being moved to a different location from which it can subsequently be loaded onto the onward transport carrier. And those conditions may also require the handling of the desired container 110 by different container handling equipment, e.g., a gantry 120 to remove container 110 from a stack to where a lift truck 130 or fork lift 140 can grasp it and release it onto the carrier, either at the location at which the lift truck 130 or fork lift 140 grasps container 110 or another location to which it must move the container 110 in order to load it onto carrier 180.

Much of the foregoing is accomplished by testing 942 or determining 942 whether the carrier 180 has arrived at the facility 100, 150, 170, e.g., at an ingress portal 170-I thereof. If carrier 180 has not arrived, path 942N is followed and updating 944 the relevant data ensues whereby updated orders are generated 936, 940 if necessary based upon the updated carrier location and estimated arrival time. This updating 944 also facilitates better utilization of container handling equipment since the equipment can be assigned to other tasks if carrier 180 were to be delayed, thereby reducing idle time. Where plural operations are necessary to receive the delivered container 110 and to move it into proper position for transfer to an onward carrier 180, those operations can be planned and scheduled in advance of arrival of the carrier and its container, e.g., by the estimated time for such operations to be performed, thereby also facilitating more efficient operations.

If carrier 180 and container 110 thereon have arrived at facility 100, 150, 170, path 942Y is followed and process 900 continues by moving 950 the carrier 180 and/or container handling equipment 120, 130, 140 to the location whereat a container is to be delivered, e.g., transferred from carrier 180, and by transferring 955 the delivered container 110 off of the carrier 180. Updating 960 the database 190D with the data representing the delivery transfer, e.g., container identity, location data, carrier data and the like, all preferably geo-tagged and date-time stamped, thus completing method 900, 930 wherein a container is delivered to the facility by a carrier.

Moreover, the foregoing also facilitates the providing of accurate real time end-to-end tracking of containers 110 and the carriers 180 thereof by providing limited and controlled access at least to certain relevant records stored in relational database 190D to authorized customers and other parties outside of facility 100, 150, 170, e.g., to shippers, recipients, consignors, consignees, drayage firms and other carriers along a container's routing, and the like. The tracking and other information may be provided in text, table or graphic form, e.g., tabular reports and or mapped data including smart maps displaying the desired information in an easily understood human readable format, and may be transmitted via text message, e-mail and/or other electronic forms, either in real time or at regular intervals or at customer defined times. Such access by authorized third parties to database records may be via direct access to the relational database 190D or may be by access to a separate database established for third party access to which selected records from relational database 190D have been communicated, thereby isolating relational database for better security.

A system for a terminal facility 100, 150, 170 for handling containers 110, the containers 110 having container identifying information thereon and/or having an RFID device providing container identifying information, the terminal facility 100, 150, 170 may comprise: a plurality of container handling equipment 120, 130, 140 associated with the terminal facility 100, 150, 170, each container handling equipment 120, 130, 140 including a lifting head for grasping, carrying and releasing containers 110; an equipment sensor set 200 associated with each container handling equipment 120, 130, 140, the equipment sensor set 200 including at least an imaging device or an RFID reading device or both for providing container identification data from the container identifying information and/or the container RFID device when the container 110 is proximate the container handling equipment 120, 130, 140, a locating device for providing location data representing the location of the container handling equipment 120, 130, 140, and a communication device for communicating container identification data, container handling equipment location data and container handling equipment identification data to a relational database at least when the lifting head of the container handling equipment 120, 130, 140 grasps a container 110 and releases a container 110; whereby records of the identification data and location data for each container 110 and for each container handling equipment 120, 130, 140 at the terminal facility 100, 150, 170 are stored in the relational database; and wherein: the equipment sensor set 200 may further include a load/unload sensor for sensing when the container handling equipment 120, 130, 140 grasps a container 110 and when the container handling equipment 120, 130, 140 releases a container 110 and causing the communication device to communicate a record of the container identification data and the associated then present location data to be communicated to and stored in the relational database, whereby the relational database contains data records representing the then current location of each container 110 at the terminal facility 100, 150, 170 substantially in real time; and/or geo-tagged identification data and location data relating to carrier vehicles that are to arrive at the terminal facility 100, 150, 170 to pick up a container 110 and/or to deliver a container 110 are received and stored as records in the relational database, whereby the relational database contains data records from which arrival times of the carrier vehicles at the terminal facility 100, 150, 170 can be estimated. The system for a terminal facility 100, 150, 170 for handling containers 110 may further comprise: a portal through which containers 110 enter and/or exit the terminal facility 100, 150, 170, the portal including an entry portal or an exit portal or both; a portal sensor set 200 associated with each portal, the portal sensor set 200 including at least an imaging device or an RFID reading device or both for providing container identification data from the container identifying information and/or the container RFID device when the container 110 is proximate the portal, and a communication device for communicating container identification data and portal identification data to the relational database at least when a container 110 is proximate the portal. The system for a terminal facility 100, 150, 170 for handling containers 110 wherein: the portal identification data communicated to the relational database with the container identification data includes a representation of the location of the portal; or the portal sensor set 200 associated with each portal may include a locating device for providing portal location data representing the location of the portal wherein the portal location data is associated with the container identification data and portal identification data that is communicated to the relational database at least when a container 110 is proximate the portal, whereby the container identification data and the portal identification data communicated to the relational database is geo-tagged to the location of the portal. The system for a terminal facility 100, 150, 170 for handling containers 110 wherein: the container identification data and the portal identification data communicated to the relational database is geo-tagged to the location of the portal and is associated with the date and time at which the container 110 is proximate the portal. The system for a terminal facility 100, 150, 170 for handling containers 110 wherein a carrier entering and/or exiting the terminal facility 100, 150, 170 has carrier identifying information thereon and/or has an RFID device providing carrier identifying information, whether or not the carrier is carrying a container 110; and wherein: the imaging device or an RFID reading device or both of the portal sensor set 200 associated with each portal provide carrier identification data from the carrier identifying information and/or the carrier RFID device and/or a registration plate when the carrier is proximate the portal, and the communication device of the portal sensor set 200 communicates carrier identification data and portal identification data to the relational database at least when the carrier is proximate the portal, whereby records of the carrier identification data for each carrier entering and leaving the terminal facility 100, 150, 170 are stored in the relational database, and are related to the records of containers 110 carried by the carrier when entering and leaving the terminal facility 100, 150, 170. The system for a terminal facility 100, 150, 170 for handling containers 110 wherein the carrier may include: a ship, container ship, vessel, boat, barge, tender, railroad car, rail car, flatbed rail car, flatbed chassis, truck, road chassis, aircraft, and combinations thereof, that can carry one or more containers 110. The system for a terminal facility 100, 150, 170 for handling containers 110 wherein the portal sensor set 200 includes a biometric sensor for identifying carrier personnel by a personal biometric characteristic. The system for a terminal facility 100, 150, 170 for handling containers 110 wherein: the imaging device of the portal sensor set 200 determines identification data associated with a container 110 and/or with a carrier carrying a container 110 by optical character recognition of alphanumeric data thereon and/or by recognition of a barcode thereon; or the imaging device of the portal sensor set 200 determines identification data associated with a container 110 and/or with a carrier carrying a container 110 by optical character recognition of alphanumeric data thereon and/or by recognition of a barcode thereon, and the carrier includes: a ship, container ship, vessel, boat, barge, tender, railroad car, rail car, flatbed rail car, flatbed chassis, truck, road chassis, aircraft, and combinations thereof, that can carry one or more containers 110. The system for a terminal facility 100, 150, 170 for handling containers 110 wherein: the locating device of the equipment sensor set 200 associated with each container handling equipment 120, 130, 140 is mounted proximate the lifting head thereof, whereby the location data for the container handling equipment 120, 130, 140 at times when the lifting head grasps or releases a container 110 is representative of the locations at the terminal facility 100, 150, 170 at which the container 110 is grasped and is released. The system for a terminal facility 100, 150, 170 for handling containers 110 wherein: the equipment sensor set 200 associated with each container handling equipment 120, 130, 140 includes an additional locating device mounted on the container handling equipment 120, 130, 140 in a location that is spaced apart from the first recited locating device thereof, and wherein an orientation in azimuth of the container handling equipment 120, 130, 140 is determinable from the location data from both locating devices of the container handling equipment 120, 130, 140 at times when the lifting head thereof grasps or releases a container 110, whereby the location and the orientation in azimuth of the container 110 is determinable at times when the container 110 is grasped and is released by the lifting head. The system for a terminal facility 100, 150, 170 for handling containers 110 wherein: the first recited locating device of the equipment sensor set 200 associated with each container handling equipment 120, 130, 140 is at a central location of the lifting head thereof and the additional locating device thereof is: at a location on the lifting head that is spaced apart from the central location of the first recited locating device; or at a location on a chassis of the container handling equipment 120, 130, 140 that is spaced apart from the central location of the first recited locating device. The system for a terminal facility 100, 150, 170 for handling containers 110 wherein: the equipment sensor set 200 associated with each container handling equipment 120, 130, 140 may further include a load/unload sensor that provides an indication of the grasping of a container 110 and of the releasing of a container 110, wherein the indications of the grasping and of the releasing of a container 110 initiates associating location data, or date and time data, or both location data and date and time data, with the identification data of the container 110 that is grasped or is released. The system for a terminal facility 100, 150, 170 for handling containers 110 wherein: the communication device of the equipment sensor set 200 communicates to the relational database the associated location data, date and time data, and the identification data of the container 110 that is grasped or is released. The system for a terminal facility 100, 150, 170 for handling containers 110 wherein: the locating device of the equipment sensor set 200 includes: a GPS locating device, a satellite-based locating device, a global position determining unit responsive to two or more different and independent global positioning systems, a Russian GLONASS device, a European Galileo device, an Indian IRNSS device, a Chinese BDS device, a device determining location from plural sources of radio (wireless) signals of known location, a device determining location by triangulation, a device determining location from known signal strength, a device determining location from a received signal strength indication (RSSI), a device determining location from differential arrival times of signals, or any combination thereof. The system for a terminal facility 100, 150, 170 for handling containers 110 wherein the equipment sensor set 200 includes a biometric sensor for identifying personnel by a personal biometric characteristic. The system for a terminal facility 100, 150, 170 for handling containers 110 wherein the biometric sensor senses: a biometric characteristic including a fingerprint, a facial image, an iris scan, or a combination thereof, or a biometric characteristic of an operator of the container handling equipment 120, 130, 140, of an operator and/or of personnel associated with a carrier arriving at the terminal facility 100, 150, 170, or of both of the foregoing, or a biometric characteristic including a fingerprint, a facial image, an iris scan, or a combination thereof, of an operator of the container handling equipment 120, 130, 140, of an operator and/or of personnel associated with a carrier arriving at the terminal facility 100, 150, 170, or of both of the foregoing. The system for a terminal facility 100, 150, 170 for handling containers 110 wherein the container handling equipment 120, 130, 140 includes: cranes, overhead hoists, gantry cranes, mobile lifts, straddle carriers, sprinter carriers, front end loaders, forklifts, trucks, lift trucks, terminal tractors, guided vehicles, and any combination thereof, whether operated by a human operator or through automation, and whether the operator and/or automation is located on the container handling equipment 120, 130, 140 or is located remotely from the container handling equipment 120, 130, 140. The system for a terminal facility 100, 150, 170 for handling containers 110 wherein the locating device providing location data represents the location of the container handling equipment 120, 130, 140: on a grid; or on a grid including latitude and longitude; or on a grid and in height above the grid; or on a grid including latitude and longitude and in height above the grid; wherein the location on the grid represents location in the terminal facility 100, 150, 170 and location in height represents distance above ground level, whereby the location of a container 110 in a stack of containers 110 can be determined. The system for a terminal facility 100, 150, 170 for handling containers 110 wherein: the imaging device of the equipment sensor set 200 determines identification data associated with a container 110 by optical character recognition of alphanumeric data thereon and/or by recognition of a barcode thereon; and when the container 110 is carried by a carrier, the imaging device of the equipment sensor set 200 determines identification data associated with a container 110 and/or with the carrier carrying a container 110 by optical character recognition of alphanumeric data thereon and/or by recognition of a barcode thereon, and wherein the carrier includes: a ship, container ship, vessel, boat, barge, tender, railroad car, rail car, flatbed rail car, flatbed chassis, truck, road chassis, aircraft, and combinations thereof, that can carry one or more containers 110. The system for a terminal facility 100, 150, 170 for handling containers 110 wherein a mobile device application operable on a smart electronic device provides to an operator of a carrier that will pick up a container 110 at the terminal facility 100, 150, 170 and/or deliver a container 110 to the terminal facility 100, 150, 170 a tracking number that is associated with one or more of a bill of lading, a manifest, and a shipping document associated with the carrier and causes the tracking number and geo-tagged carrier location data to be communicated to and stored in the database, whereby a record of carrier activity relating to the pick up and/or delivery of a container 110 at the terminal facility 100, 150, 170 is stored in the database for searching. The system for a terminal facility 100, 150, 170 for handling containers 110 may further comprise: a processor associated with the relational database for storing records of container shipping data and container shipping orders from manifests, bills of lading and other shipping documents in the relational database; the processor searching the relational database in response to a query to determine the presence of a container 110 in the terminal facility 100, 150, 170, the location of a container 110 in the terminal facility 100, 150, 170, the location of container handling equipment 120, 130, 140 in the terminal facility 100, 150, 170, or any combination thereof; the processor generating orders relating to containers 110 in the terminal facility 100, 150, 170 and/or relating to container handling equipment 120, 130, 140 in the terminal facility 100, 150, 170, and/or generating reports relating to containers 110 in the terminal facility 100, 150, 170 and/or relating to container handling equipment 120, 130, 140 in the terminal facility 100, 150, 170; and wherein the container handling equipment 120, 130, 140 is operated to execute the orders generated by the processor for locating and moving containers 110 designated in the orders, and in the course thereof, the communication device of the equipment sensor set 200 associated with the container handling equipment 120, 130, 140 communicates container identification data, container handling equipment location data and container handling equipment identification data to the relational database at least when the lifting head of the container handling equipment 120, 130, 140 grasps a container 110 and releases a container 110; whereby records of the identification data and location data for each container 110 and for each container handling equipment 120, 130, 140 at the terminal facility 100, 150, 170 stored in the relational database are updated as the orders generated by the processor are executed. The system for a terminal facility 100, 150, 170 for handling containers 110 wherein a mobile device application operable on a smart electronic device provides to an operator of a carrier that will pick up a container 110 at the terminal facility 100, 150, 170 and/or deliver a container 110 to the terminal facility 100, 150, 170 an order generated by the processor relating to the picking up of the container 110 and/or the delivery of the container 110 to the terminal facility 100, 150, 170 and updates to that order.

A method for operating a terminal facility 100, 150, 170 for handling containers 110, wherein the containers 110 have container identifying information thereon and/or have an RFID device providing container identifying information, and container handling equipment 120, 130, 140 associated with the terminal facility 100, 150, 170 include a lifting head for grasping, carrying and releasing containers 110 and an equipment sensor set 200 for providing container identification data from the container identifying information and/or the container RFID device when the container 110 is proximate the container handling equipment 120, 130, 140 and location data representing the location of the container handling equipment 120, 130, 140, and for communicating container identification data, equipment location data and equipment identification data; the method for operating the terminal facility 100, 150, 170 may comprise: sensing a container 110 entering and/or exiting the terminal facility 100, 150, 170 including: imaging the container identifying information and/or reading the container RFID device or both for providing container identification data from the container identifying information and/or the container RFID device when the container 110 enters the terminal facility 100, 150, 170 and exits the terminal facility 100, 150, 170, and communicating the container identification data and location data to a relational database at least when a container 110 enters the terminal facility 100, 150, 170 and exits the terminal facility 100, 150, 170; operating the lifting head of the container handling equipment 120, 130, 140 for grasping, carrying and releasing containers 110 including: imaging container identifying information or reading the container RFID device or both for providing container identification data at least when the container handling equipment 120, 130, 140 grasps a container 110 and releases a container 110; providing location data representing the location of the container handling equipment 120, 130, 140 at least when the container handling equipment 120, 130, 140 grasps a container 110 and releases a container 110; and communicating container identification data, container handling equipment location data and container handling equipment identification data to the relational database at least when the container handling equipment 120, 130, 140 grasps a container 110 and releases a container 110; whereby records of the identification data and location data for each container 110 and for each container handling equipment 120, 130, 140 at the terminal facility 100, 150, 170 are stored in the relational database; the method may further comprise: sensing when the container handling equipment 120, 130, 140 grasps a container 110 and when the container handling equipment 120, 130, 140 releases a container 110, and causing a record of the container identification data and the associated then present location data to be communicated to and stored in the relational database, whereby the relational database contains data records representing the then current location of each container 110 at the terminal facility 100, 150, 170 substantially in real time; and/or receiving geo-tagged identification data and location data relating to carrier vehicles that are to arrive at the terminal facility 100, 150, 170 to pick up a container 110 and/or to deliver a container 110, and storing the geo-tagged identification data and location data relating to carrier vehicles as records in the relational database, whereby the relational database contains data records from which arrival times of the carrier vehicles at the terminal facility 100, 150, 170 can be estimated. The method for operating a terminal facility 100, 150, 170 for handling containers 110 wherein containers 110 enter the terminal facility 100, 150, 170 and/or exit the terminal facility 100, 150, 170 at a portal and wherein the sensing a container 110 entering and/or exiting the terminal facility 100, 150, 170 includes: communicating portal identification data to the relational database with the container identification data and a representation of a location of the portal; or sensing location for providing portal location data representing the location of the portal wherein the portal location data is associated with the container identification data and portal identification data that is communicated to the relational database at least when the container 110 is proximate the portal, whereby the container identification data and the portal identification data communicated to the relational database is geo-tagged to the location of the portal. The method for operating a terminal facility 100, 150, 170 for handling containers 110 wherein the container identification data and the portal identification data communicated to the relational database is geo-tagged to the location of the portal and is associated with the date and time at which the container 110 is proximate the portal. The method for operating a terminal facility 100, 150, 170 for handling containers 110 wherein a carrier entering and/or exiting the terminal facility 100, 150, 170 has carrier identifying information thereon and/or has an RFID device providing carrier identifying information, whether or not the carrier is carrying a container 110; and wherein the sensing a container 110 entering and/or exiting the terminal facility 100, 150, 170 may further include: sensing carrier identification data from the carrier identifying information and/or the carrier RFID device and/or a registration plate when the carrier is entering and/or exiting the terminal facility 100, 150, 170, and communicating carrier identification data and carrier location data to the relational database at least when the carrier is entering and/or exiting the terminal facility 100, 150, 170, whereby records of the carrier identification data for each carrier entering and leaving the terminal facility 100, 150, 170 are stored in the relational database, and are related to the records of containers 110 carried by the carrier when entering and leaving the terminal facility 100, 150, 170. The method for operating a terminal facility 100, 150, 170 for handling containers 110 wherein the carrier includes: a ship, container ship, vessel, boat, barge, tender, railroad car, rail car, flatbed rail car, flatbed chassis, truck, road chassis, aircraft, and combinations thereof, that can carry one or more containers 110. The method for operating a terminal facility 100, 150, 170 for handling containers 110 wherein the sensing a container 110 entering and/or exiting the terminal facility 100, 150, 170 may further include: identifying carrier personnel by sensing a personal biometric characteristic. The method for operating a terminal facility 100, 150, 170 for handling containers 110 wherein the providing location data representing the location of the container handling equipment 120, 130, 140 includes: sensing the location of the lifting head thereof, whereby the location data for the lifting head of the container handling equipment 120, 130, 140 at times when the lifting head grasps or releases a container 110 is representative of the locations at the terminal facility 100, 150, 170 at which the container 110 is grasped and is released. The method for operating a terminal facility 100, 150, 170 for handling containers 110 wherein the providing location data representing the location of the container handling equipment 120, 130, 140 includes: sensing the location at a first part of the lifting head of the container handling equipment 120, 130, 140 and sensing the location at a second part of the container handling equipment 120, 130, 140 that is spaced apart from the first part of the lifting head thereof, wherein an orientation in azimuth of the lifting head is determinable from the location data for the first part of the lifting head and location data for the second part of the container handling equipment 120, 130, 140 at times when the lifting head thereof grasps or releases a container 110, whereby the location and the orientation in azimuth of the container 110 is determinable at times when the container 110 is grasped and is released by the lifting head. The method for operating a terminal facility 100, 150, 170 for handling containers 110 wherein the first part of the lifting head is a central part thereof and wherein: the second part of the container handling equipment 120, 130, 140 is on a second part of the lifting head that is spaced apart from the central part thereof; or the second part of the container handling equipment 120, 130, 140 is on a chassis thereof. The method for operating a terminal facility 100, 150, 170 for handling containers 110 further including: providing an indication of the grasping of a container 110 and of the releasing of a container 110, and associating location data, or date and time data, or both location data and date and time data, with the identification data of the container 110 that is grasped or is released in response to the indications of the grasping and of the releasing of a container 110. The method for operating a terminal facility 100, 150, 170 for handling containers 110 further including: communicating to the relational database the associated location data, date and time data, and the identification data of the container 110 that is grasped or is released. The method for operating a terminal facility 100, 150, 170 for handling containers 110 wherein: the location data for the container handling equipment 120, 130, 140 is provided: by a GPS locating device, by a satellite-based locating device, by a global position determining unit responsive to two or more different and independent global positioning systems, by a Russian GLONASS device, by a European Galileo device, by an Indian IRNSS device, by a Chinese BDS device, by determining location from plural sources of radio (wireless) signals of known location, by determining location by triangulation, by determining location by known signal strength, by determining location from a received signal strength indication (RSSI), by determining location from differential arrival times of signals, or by any combination thereof. The method for operating a terminal facility 100, 150, 170 for handling containers 110 further including: sensing a personal biometric characteristic for identifying personnel by the personal biometric characteristic. The method for operating a terminal facility 100, 150, 170 for handling containers 110 wherein the personnel biometric characteristic includes: a fingerprint, a facial image, an iris scan, or a combination thereof, or a biometric characteristic of an operator of the container handling equipment 120, 130, 140, of an operator and/or of personnel associated with a carrier arriving at the terminal facility 100, 150, 170, or of both of the foregoing, or a fingerprint, a facial image, an iris scan, or a combination thereof, of an operator of the container handling equipment 120, 130, 140, of an operator and/or of personnel associated with a carrier arriving at the terminal facility 100, 150, 170, or of both of the foregoing. The method for operating a terminal facility 100, 150, 170 for handling containers 110 wherein the container handling equipment 120, 130, 140 includes: cranes, overhead hoists, gantry cranes, mobile lifts, straddle carriers, sprinter carriers, front end loaders, forklifts, trucks, lift trucks, terminal tractors, guided vehicles, and any combination thereof, whether operated by a human operator or through automation, and whether the operator and/or automation is located on the container handling equipment 120, 130, 140 or is located remotely from the container handling equipment 120, 130, 140. The method for operating a terminal facility 100, 150, 170 for handling containers 110 wherein providing location data includes providing data representing the location of the container handling equipment 120, 130, 140: on a grid; or on a grid including latitude and longitude; or on a grid and in height above the grid; or on a grid including latitude and longitude and in height above the grid; wherein the location on the grid represents location in the terminal facility 100, 150, 170 and location in height represents distance above ground level, whereby the location of a container 110 in a stack of containers 110 can be determined. The method for operating a terminal facility 100, 150, 170 for handling containers 110 wherein: the imaging the container identifying information includes the providing container identification data by optical character recognition of alphanumeric data thereon and/or by recognition of a barcode thereon; or the imaging the container identifying information includes the providing container identification data by optical character recognition of alphanumeric data thereon and/or by recognition of a barcode thereon, and the carrier includes: a ship, container ship, vessel, boat, barge, tender, railroad car, rail car, flatbed rail car, flatbed chassis, truck, road chassis, aircraft, and combinations thereof, that can carry one or more containers 110. The method for operating a terminal facility 100, 150, 170 for handling containers 110 may further comprise: providing a mobile device application operable on a smart electronic device that provides to an operator of a carrier vehicle that will pick up a container 110 at the terminal facility 100, 150, 170 and/or deliver a container 110 to the terminal facility 100, 150, 170 a tracking number that is associated with one or more of a bill of lading, a manifest, and a shipping document associated with the carrier vehicle and that causes the tracking number and geo-tagged carrier location data to be communicated to and stored in the database, whereby a record of carrier activity relating to the pick up and/or delivery of a container 110 at the terminal facility 100, 150, 170 is stored in the database for searching. The method for operating a terminal facility 100, 150, 170 for handling containers 110 may further comprise: storing records of container shipping data and container shipping orders from manifests, bills of lading and other shipping documents in the relational database; searching the relational database in response to a query to determine the presence of a container 110 in the terminal facility 100, 150, 170, the location of a container 110 in the terminal facility 100, 150, 170, the location of container handling equipment 120, 130, 140 in the terminal facility 100, 150, 170, or any combination thereof; generating orders relating to containers 110 in the terminal facility 100, 150, 170 and/or relating to container handling equipment 120, 130, 140 in the terminal facility 100, 150, 170, and/or generating reports relating to containers 110 in the terminal facility 100, 150, 170 and/or relating to container handling equipment 120, 130, 140 in the terminal facility 100, 150, 170; and operating the container handling equipment 120, 130, 140 to execute the orders generated for locating and moving containers 110 designated in the orders, and in the course thereof, communicating container identification data, container handling equipment location data and container handling equipment identification data to the relational database at least when the container handling equipment 120, 130, 140 grasps a container 110 and releases a container 110; whereby records of the identification data and location data for each container 110 and for each container handling equipment 120, 130, 140 at the terminal facility 100, 150, 170 stored in the relational database are updated as the orders are executed. The method for operating a terminal facility 100, 150, 170 for handling containers 110 may further comprise: providing a mobile device application operable on a smart electronic device that provides to an operator of a carrier vehicle that will pick up a container 110 at the terminal facility 100, 150, 170 and/or deliver a container 110 to the terminal facility 100, 150, 170 an order relating to the picking up of the container 110 and/or the delivery of the container 110 to the terminal facility 100, 150, 170 and updates to that order.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Although terms such as "front," "back," "rear," "side," "end," "top," "bottom," "up," "down," "left," "right," "upward," "downward," "forward," "backward," "under" and/or "over," "vertical," "horizontal," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

As used herein, the term "and/or" encompasses both the conjunctive and the disjunctive cases, so that a phrase in the form "A and/or B" encompasses "A" or "B" or "A and B." In addition, the term "at least one of" one or more elements is intended to include one of any one of the elements, more than one of any of the elements, and two or more of the elements up to and including all of the elements, and so, e.g., the phrase in the form "at least one of A, B and C" includes "A," "B," "C," "A and B," "A and C," "B and C," and "A and B and C."

While various operations, steps and/or elements of a process or method or operation may be described in an order or sequence, the operations, steps and/or elements do not need to be performed in that order or sequence, or in any particular order or sequence, unless expressly stated to require a particular order or sequence.

As used herein, the terms "connected" and "coupled" as well as variations thereof may or may not be intended to be exact synonyms, but may also encompass some similar things and some different things. The term "connected" as indicated by its context may be used generally to refer to elements that have a direct electrical and/or physical contact to each other, whereas the term "coupled" as indicated by its context may be used generally to refer to elements that have an indirect electrical and/or physical contact with each other, e.g., via one or more intermediate elements, so as to cooperate and/or interact with each other, and may include elements in direct contact as well. Nevertheless, the terms "connected" and "coupled" may be used interchangeably herein.

It is noted that various data, sensor values and alarm values may represent actual physical conditions of different places and/or different equipment and/or different parts of an installation, facility, location, article, conveyance, carrier, vehicle, vessel and/or other place, e.g., generally local conditions, that may be transformed by the system and method described herein to provide a representation of the overall state and/or condition of the installation, facility, location, article, conveyance, carrier, vehicle, vessel and/or place, e.g. a representation of the complete installation, facility, location, conveyance, carrier, vehicle, vessel, article and/or place. That representation may be transformative of a representation of a nominal overall state and/or condition thereof, e.g., in a prior or different condition and/or time, to a representation of an actual overall state and/or condition thereof, e.g., in a present or more recent or otherwise different condition and/or time. Further, the system and method may generate tasks and commands that are executed to transform the installation, conveyance, carrier, vehicle, vessel, article and/or place into a different configuration, i.e. into a different installation, conveyance, carrier, vehicle, vessel, article and/or place, and a representation of that different configuration is provided or displayed, e.g., to human operators. The system described herein may include one or more general purpose and/or special purpose computers, or microprocessors or other processors, and the method described herein may be performed in part by one or more general purpose and/or special purpose computers, or microprocessors or other processors.

As used herein, image and/or information are used interchangeably with respect to what is captured by an imaging device and/or is displayed on a display device, and are intended to encompass any and all of the wide variety of devices that a user may desire, including, but not limited to, visual images and pictures, whether still or moving, whether captured and/or generated by a camera, computer or any other source, whether true, representative or abstract or arbitrary, whether or not including symbols or characters such as alphanumeric characters or mathematical notations, whether captured and/or displayed in black and white, monochrome, polychrome or full color.

Also, the terms data and information may also be used interchangeably. Further, what is stated as being "optimum" or "deemed optimum" may or may not be a true optimum condition, but is the condition deemed to be desirable or acceptably "optimum" by virtue of its being selected in accordance with the decision rules and/or criteria defined by the designer and/or applicable controlling function, e.g., the efficient movement and monitoring and management of containers 110 at a facility 100.

The present arrangement can be and preferably is at least in part embodied as a computer implemented process or processes and/or apparatus for performing such computer-implemented process or processes, and can also be embodied in the form of a tangible medium containing a non-transitory computer program or other machine-readable instructions (herein "computer program"), wherein when the computer program is loaded into a computer or other processor (herein "computer") and/or is executed by the computer, the computer becomes an apparatus for practicing the process or processes. Storage media for containing such computer program include, for example, floppy disks and diskettes, compact disk (CD)-ROMs (whether or not writeable), DVD digital disks, RAM and ROM memories, computer hard drives and back-up drives, external hard drives, "thumb" drives, and any other non-transitory storage medium readable by a computer. The process or processes can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes a non-transitory apparatus for practicing the process or processes. The process or processes may be implemented on a general purpose microprocessor or on a digital processor specifically configured to practice the process or processes. When a general-purpose microprocessor is employed, the computer program code configures the circuitry of the microprocessor to create specific logic circuit arrangements. Storage medium readable by a computer includes medium being readable by a computer per se or by another machine that reads the computer instructions for providing those instructions to a computer for controlling its operation. Such machines may include, for example, a punched card reader, a magnetic tape reader, a magnetic card reader, a memory card reader, an optical scanner, as well as machines for reading the storage media mentioned above.

While the present invention has been described in terms of the foregoing example embodiments, variations within the scope and spirit of the present invention as defined by the claims following will be apparent to those skilled in the art. For example, geo-tagging of data may associate the data with an Earth-based latitude and longitude, e.g., relative to the equator and the Greenwich based longitude, or with a local facility grid, or another suitable locating scheme or X-Y grid.

Additionally and/or optionally, elevation (Z-axis) location data representing distance above a ground or floor level may be measured by electro-mechanical, ultrasonic, radar and/or optical sensors that directly measure the elevation of the lifting head above the ground or floor on which the equipment is operated.

While the description herein is set in the example setting of a facility 100, the system and method described herein is suitable for use at and in facilities of other types and kinds. For example, they may be employed in a warehouse or station or other storage facility for tracking, monitoring and managing the arrival, movement, storage and departure of pallets and other cargo containers or large items of cargo, e.g., storage/moving pods, and the like. In such instance, the equipment would likely include forklifts having suitable sensor sets thereon, and the storage locations may include bins or floor locations, and the sensing ranges and fields of view of the various sensors are adjusted to the smaller scale of the particular facility.

It is preferred that the elements of the described system, e.g., the various sensors, communication paths, processors, data storage devices and databases be provided by or with physically separate redundant elements, including ones that may be located remotely from the primary elements, so as to protect the operation of the system and to protect and preserve the integrity of the data acquired and stored thereby.

Each of the U.S. Provisional applications, U.S. patent applications, and/or U.S. patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A system for a terminal facility for handling containers, the containers having container identifying information thereon and/or having an RFID device providing container identifying information, the terminal facility comprising:
    a plurality of container handling equipment associated with the terminal facility, each said container handling equipment including a lifting head for grasping, carrying and releasing containers;
    an equipment sensor set associated with each said container handling equipment, the equipment sensor set including at least an imaging device or an RFID reading device or both for providing container identification data from the container identifying information and/or the container RFID device when the container is proximate said container handling equipment, a locating device for providing location data representing the location of said container handling equipment, and a communication device for communicating container identification data, container handling equipment location data and container handling equipment identification data to a relational database at least when the lifting head of said container handling equipment grasps a container and releases a container;
    whereby records of identification data and location data for each container and for each container handling equipment at the terminal facility are stored in the relational database; and
    wherein:
        said equipment sensor set further includes a load/unload sensor for sensing when said container handling equipment grasps a container and when said container handling equipment releases a container and causing the communication device to communicate a record of the container identification data and the associated then present location data to be communicated to and stored in the relational database, whereby the relational database contains data records representing the then current location of each container at said terminal facility substantially in real time; and/or
        geo-tagged identification data and location data relating to carrier vehicles that are to arrive at said terminal facility to pick up a container and/or to deliver a container are received and stored as records in the relational database, whereby the relational database contains data records from which arrival times of the carrier vehicles at said terminal facility can be estimated.

2. The system for a terminal facility for handling containers of claim 1 further comprising:
    a portal through which containers enter and/or exit the terminal facility, said portal including an entry portal or an exit portal or both;
    a portal sensor set associated with each portal, the portal sensor set including at least an imaging device or an RFID reading device or both for providing container identification data from the container identifying information and/or the container RFID device when the container is proximate said portal, and a communication device for communicating container identification data and portal identification data to the relational database at least when a container is proximate said portal.

3. The system for a terminal facility for handling containers of claim 2 wherein:
the portal identification data communicated to the relational database with the container identification data includes a representation of the location of said portal; or
the portal sensor set associated with each portal includes a locating device for providing portal location data representing the location of said portal wherein the portal location data is associated with the container identification data and portal identification data that is communicated to the relational database at least when a container is proximate said portal,
whereby the container identification data and the portal identification data communicated to the relational database is geo-tagged to the location of said portal.

4. The system for a terminal facility for handling containers of claim 2 wherein: the container identification data and the portal identification data communicated to the relational database is geo-tagged to the location of said portal and is associated with the date and time at which the container is proximate said portal.

5. The system for a terminal facility for handling containers of claim 2 wherein a carrier entering and/or exiting the terminal facility has carrier identifying information thereon and/or has an RFID device providing carrier identifying information, whether or not said carrier is carrying a container; and wherein:
the imaging device or an RFID reading device or both of said portal sensor set associated with each portal provide carrier identification data from the carrier identifying information and/or the carrier RFID device and/or a registration plate when the carrier is proximate said portal, and the communication device of said portal sensor set communicates carrier identification data and portal identification data to the relational database at least when the carrier is proximate said portal,
whereby records of the carrier identification data for each carrier entering and leaving the terminal facility are stored in the relational database, and are related to the records of containers carried by the carrier when entering and leaving the terminal facility.

6. The system for a terminal facility for handling containers of claim 5 wherein the carrier includes: a ship, container ship, vessel, boat, barge, tender, railroad car, rail car, flatbed rail car, flatbed chassis, truck, road chassis, aircraft, and combinations thereof, that can carry one or more containers.

7. The system for a terminal facility for handling containers of claim 5 wherein said portal sensor set includes a biometric sensor for identifying carrier personnel by a personal biometric characteristic.

8. The system for a terminal facility for handling containers of claim 2 wherein:
the imaging device of the portal sensor set determines identification data associated with a container and/or with a carrier carrying a container by optical character recognition of alphanumeric data thereon and/or by recognition of a barcode thereon; or
the imaging device of the portal sensor set determines identification data associated with a container and/or with a carrier carrying a container by optical character recognition of alphanumeric data thereon and/or by recognition of a barcode thereon, and the carrier includes: a ship, container ship, vessel, boat, barge, tender, railroad car, rail car, flatbed rail car, flatbed chassis, truck, road chassis, aircraft, and combinations thereof, that can carry one or more containers.

9. The system for a terminal facility for handling containers of claim 1 wherein: the locating device of said equipment sensor set associated with each said container handling equipment is mounted proximate the lifting head thereof, whereby the location data for said container handling equipment at times when the lifting head grasps or releases a container is representative of the locations at the terminal facility at which the container is grasped and is released.

10. The system for a terminal facility for handling containers of claim 1 wherein: said equipment sensor set associated with each said container handling equipment further includes a load/unload sensor that provides an indication of the grasping of a container and of the releasing of a container, wherein the indications of the grasping and of the releasing of a container initiates associating location data, or date and time data, or both location data and date and time data, with the identification data of the container that is grasped or is released.

11. The system for a terminal facility for handling containers of claim 10 wherein: the communication device of said equipment sensor set communicates to the relational database the associated location data, date and time data, and the identification data of the container that is grasped or is released.

12. The system for a terminal facility for handling containers of claim 1 wherein: the locating device of said equipment sensor set includes: a GPS locating device, a satellite-based locating device, a global position determining unit responsive to two or more different and independent global positioning systems, a Russian GLONASS device, a European Galileo device, an Indian IRNSS device, a Chinese BDS device, a device determining location from plural sources of radio (wireless) signals of known location, a device determining location by triangulation, a device determining location from known signal strength, a device determining location from a received signal strength indication (RSSI), a device determining location from differential arrival times of signals, or any combination thereof.

13. The system for a terminal facility for handling containers of claim 1 wherein the equipment sensor set includes a biometric sensor for identifying personnel by a personal biometric characteristic.

14. The system for a terminal facility for handling containers of claim 13 wherein said biometric sensor senses:
a biometric characteristic including a fingerprint, a facial image, an iris scan, or a combination thereof, or
a biometric characteristic of an operator of said container handling equipment, of an operator and/or of personnel associated with a carrier arriving at said terminal facility, or of both of the foregoing, or
a biometric characteristic including a fingerprint, a facial image, an iris scan, or a combination thereof, of an operator of said container handling equipment, of an operator and/or of personnel associated with a carrier arriving at said terminal facility, or of both of the foregoing.

15. The system for a terminal facility for handling containers of claim 1 wherein said container handling equipment includes: cranes, overhead hoists, gantry cranes, mobile lifts, straddle carriers, sprinter carriers, front end loaders, forklifts, trucks, lift trucks, terminal tractors, guided vehicles, and any combination thereof, whether operated by a human operator or through automation, and whether the operator and/or automation is located on said container handling equipment or is located remotely from said container handling equipment.

16. The system for a terminal facility for handling containers of claim 1 wherein the locating device providing location data represents the location of said container handling equipment:
   on a grid; or
   on a grid including latitude and longitude; or
   on a grid and in height above the grid; or
   on a grid including latitude and longitude and in height above the grid;
   wherein the location on the grid represents location in the terminal facility and location in height represents distance above ground level, whereby the location of a container in a stack of containers can be determined.

17. The system for a terminal facility for handling containers of claim 1 wherein:
   the imaging device of the equipment sensor set determines identification data associated with a container by optical character recognition of alphanumeric data thereon and/or by recognition of a barcode thereon; and
   when the container is carried by a carrier, the imaging device of the equipment sensor set determines identification data associated with a container and/or with the carrier carrying a container by optical character recognition of alphanumeric data thereon and/or by recognition of a barcode thereon, and wherein the carrier includes: a ship, container ship, vessel, boat, barge, tender, railroad car, rail car, flatbed rail car, flatbed chassis, truck, road chassis, aircraft, and combinations thereof, that can carry one or more containers.

18. The system for a terminal facility for handling containers of claim 1 wherein a mobile device application operable on a smart electronic device provides to an operator of a carrier that will pick up a container at the terminal facility and/or deliver a container to the terminal facility a tracking number that is associated with one or more of a bill of lading, a manifest, and a shipping document associated with the carrier and causes the tracking number and geo-tagged carrier location data to be communicated to and stored in the database, whereby a record of carrier activity relating to the pick up and/or delivery of a container at the terminal facility is stored in the database for searching.

19. The system for a terminal facility for handling containers of claim 1 further comprising:
   a processor associated with the relational database for storing records of container shipping data and container shipping orders from manifests, bills of lading and other shipping documents in the relational database;
   said processor searching the relational database in response to a query to determine the presence of a container in the terminal facility, the location of a container in the terminal facility, the location of container handling equipment in the terminal facility, or any combination thereof;
   said processor generating orders relating to containers in the terminal facility and/or relating to container handling equipment in the terminal facility, and/or generating reports relating to containers in the terminal facility and/or relating to container handling equipment in the terminal facility; and
   wherein said container handling equipment is operated to execute the orders generated by said processor for locating and moving containers designated in the orders, and in the course thereof, the communication device of said equipment sensor set associated with said container handling equipment communicates container identification data, container handling equipment location data and container handling equipment identification data to the relational database at least when the lifting head of said container handling equipment grasps a container and releases a container;
   whereby records of the identification data and location data for each container and for each container handling equipment at the terminal facility stored in the relational database are updated as the orders generated by said processor are executed.

20. The system for a terminal facility for handling containers of claim 19 wherein a mobile device application operable on a smart electronic device provides to an operator of a carrier that will pick up a container at the terminal facility and/or deliver a container to the terminal facility an order generated by said processor relating to the picking up of the container and/or the delivery of the container to the terminal facility and updates to that order.

21. A system for a terminal facility for handling containers, the containers having container identifying information thereon and/or having an RFID device providing container identifying information, the terminal facility comprising:
   a plurality of container handling equipment associated with the terminal facility, each said container handling equipment including a lifting head for grasping, carrying and releasing containers;
   an equipment sensor set associated with each said container handling equipment, the equipment sensor set including at least an imaging device or an RFID reading device or both for providing container identification data from the container identifying information and/or the container RFID device when the container is proximate said container handling equipment, a locating device for providing location data representing the location of said container handling equipment, and a communication device for communicating container identification data, container handling equipment location data and container handling equipment identification data to a relational database at least when the lifting head of said container handling equipment grasps a container and releases a container;
   whereby records of identification data and location data for each container and for each container handling equipment at the terminal facility are stored in the relational database; and
   wherein:
      said equipment sensor set further includes a load/unload sensor for sensing when said container handling equipment grasps a container and when said container handling equipment releases a container and causing the communication device to communicate a record of the container identification data and the associated then present location data to be communicated to and stored in the relational database, whereby the relational database contains data records representing the then current location of each container at said terminal facility substantially in real time; and/or
      geo-tagged identification data and location data relating to carrier vehicles that are to arrive at said terminal facility to pick up a container and/or to deliver a container are received and stored as records in the relational database, whereby the relational database contains data records from which arrival times of the carrier vehicles at said terminal facility can be estimated; and wherein: said equipment sensor set associated with each said container handling equipment includes an additional locating device mounted on said container handling equipment in a location that is spaced apart from the first recited locating device thereof, and wherein an orientation in azimuth of said container handling equipment is determinable from the location data from both locating devices of said container handling equipment at times when the lifting head thereof grasps or releases a container, whereby the location and the orientation in azimuth of the container is determinable at times when the container is grasped and is released by the lifting head.

22. The system for a terminal facility for handling containers of claim 21 wherein: the first recited locating device of said equipment sensor set associated with each said container handling equipment is at a central location of the lifting head thereof and the additional locating device thereof is:

at a location on the lifting head that is spaced apart from the central location of the first recited locating device; or at a location on a chassis of the container handling equipment that is spaced apart from the central location of the first recited locating device.

23. A method for operating a terminal facility for handling containers, wherein the containers have container identifying information thereon and/or have an RFID device providing container identifying information, and wherein container handling equipment associated with the terminal facility include a lifting head for grasping, carrying and releasing containers and an equipment sensor set for providing container identification data from the container identifying information and/or the container RFID device when the container is proximate the container handling equipment and location data representing the location of the container handling equipment, and for communicating container identification data, equipment location data and equipment identification data;

the method for operating the terminal facility comprising:

sensing a container entering and/or exiting the terminal facility including:

imaging the container identifying information and/or reading the container RFID device or both for providing container identification data from the container identifying information and/or the container RFID device when the container enters the terminal facility and exits the terminal facility, and communicating the container identification data and location data to a relational database at least when a container enters the terminal facility and exits the terminal facility;

operating the lifting head of the container handling equipment for grasping, carrying and releasing containers including:

imaging container identifying information or reading the container RFID device or both for providing container identification data at least when the container handling equipment grasps a container and releases a container;

providing location data representing the location of the container handling equipment at least when the container handling equipment grasps a container and releases a container; and communicating container identification data, container handling equipment location data and container handling equipment identification data to the relational database at least when the container handling equipment grasps a container and releases a container;

whereby records of identification data and location data for each container and for each container handling equipment at the terminal facility are stored in the relational database;

the method further comprising:

sensing when the container handling equipment grasps a container and when the container handling equipment releases a container, and causing a record of the container identification data and the associated then present location data to be communicated to and stored in the relational database, whereby the relational database contains data records representing the then current location of each container at said terminal facility substantially in real time;

and/or receiving geo-tagged identification data and location data relating to carrier vehicles that are to arrive at the terminal facility to pick up a container and/or to deliver a container, and storing the geo-tagged identification data and location data relating to carrier vehicles as records in the relational database, whereby the relational database contains data records from which arrival times of the carrier vehicles at said terminal facility can be estimated.

24. The method for operating a terminal facility for handling containers of claim 23 wherein containers enter the terminal facility and/or exit the terminal facility at a portal and wherein the sensing a container entering and/or exiting the terminal facility includes:

communicating portal identification data to the relational database with the container identification data and a representation of a location of the portal; or sensing location for providing portal location data representing the location of the portal wherein the portal location data is associated with the container identification data and portal identification data that is communicated to the relational database at least when the container is proximate the portal, whereby the container identification data and the portal identification data communicated to the relational database is geo-tagged to the location of the portal.

25. The method for operating a terminal facility for handling containers of claim 24 wherein the container identification data and the portal identification data communicated to the relational database is geo-tagged to the location of the portal and is associated with the date and time at which the container is proximate the portal.

26. The method for operating a terminal facility for handling containers of claim 23 wherein a carrier entering and/or exiting the terminal facility has carrier identifying information thereon and/or has an RFID device providing carrier identifying information, whether or not the carrier is carrying a container; and wherein the sensing a container entering and/or exiting the terminal facility further includes:

sensing carrier identification data from the carrier identifying information and/or the carrier RFID device and/or a registration plate when the carrier is entering and/or exiting the terminal facility, and communicating carrier identification data and carrier location data to the relational database at least when the carrier is entering and/or exiting the terminal facility, whereby records of the carrier identification data for each carrier entering and leaving the terminal facility are stored in the relational database, and are related to the records of containers carried by the carrier when entering and leaving the terminal facility.

27. The method for operating a terminal facility for handling containers of claim 26 wherein the carrier includes: a ship, container ship, vessel, boat, barge, tender, railroad car, rail car, flatbed rail car, flatbed chassis, truck, road chassis, aircraft, and combinations thereof, that can carry one or more containers.

28. The method for operating a terminal facility for handling containers of claim 26 wherein the sensing a container entering and/or exiting the terminal facility further includes: identifying carrier personnel by sensing a personal biometric characteristic.

29. The method for operating a terminal facility for handling containers of claim 23 wherein the providing location data representing the location of the container handling equipment includes: sensing the location of the lifting head thereof, whereby the location data for the lifting head of the container handling equipment at times when the lifting head grasps or releases a container is representative of the locations at the terminal facility at which the container is grasped and is released.

30. The method for operating a terminal facility for handling containers of claim 23 further including: providing an indication of the grasping of a container and of the releasing of a container, and associating location data, or date and time data, or both location data and date and time data, with the identification data of the container that is grasped or is released in response to the indications of the grasping and of the releasing of a container.

31. The method for operating a terminal facility for handling containers of claim 30 further including: communicating to the relational database the associated location data, date and time data, and the identification data of the container that is grasped or is released.

32. The method for operating a terminal facility for handling containers of claim 23 wherein: the location data for the container handling equipment is provided: by a GPS locating device, by a satellite-based locating device, by a global position determining unit responsive to two or more different and independent global positioning systems, by a Russian GLONASS device, by a European Galileo device, by an Indian IRNSS device, by a Chinese BDS device, by determining location from plural sources of radio (wireless) signals of known location, by determining location by triangulation, by determining location by known signal strength, by determining location from a received signal strength indication (RSSI), by determining location from differential arrival times of signals, or by any combination thereof.

33. The method for operating a terminal facility for handling containers of claim 23 further including: sensing a personal biometric characteristic for identifying personnel by the personal biometric characteristic.

34. The method for operating a terminal facility for handling containers of claim 33 wherein the personnel biometric characteristic includes:

a fingerprint, a facial image, an iris scan, or a combination thereof, or a biometric characteristic of an operator of the container handling equipment, of an operator and/or of personnel associated with a carrier arriving at the terminal facility, or of both of the foregoing, or a fingerprint, a facial image, an iris scan, or a combination thereof, of an operator of the container handling equipment, of an operator and/or of personnel associated with a carrier arriving at the terminal facility, or of both of the foregoing.

35. The method for operating a terminal facility for handling containers of claim 23 wherein the container handling equipment includes: cranes, overhead hoists, gantry cranes, mobile lifts, straddle carriers, sprinter carriers, front end loaders, forklifts, trucks, lift trucks, terminal tractors, guided vehicles, and any combination thereof, whether operated by a human operator or through automation, and whether the operator and/or automation is located on the container handling equipment or is located remotely from the container handling equipment.

36. The method for operating a terminal facility for handling containers of claim 23 wherein providing location data includes providing data representing the location of the container handling equipment:

on a grid; or on a grid including latitude and longitude; or on a grid and in height above the grid; or on a grid including latitude and longitude and in height above the grid;

wherein the location on the grid represents location in the terminal facility and location in height represents distance above ground level, whereby the location of a container in a stack of containers can be determined.

37. The method for operating a terminal facility for handling containers of claim 23 wherein:

the imaging the container identifying information includes the providing container identification data by optical character recognition of alphanumeric data thereon and/or by recognition of a barcode thereon; or the imaging the container identifying information includes the providing container identification data by optical character recognition of alphanumeric data thereon and/or by recognition of a barcode thereon, and the carrier includes: a ship, container ship, vessel, boat, barge, tender, railroad car, rail car, flatbed rail car, flatbed chassis, truck, road chassis, aircraft, and combinations thereof, that can carry one or more containers.

38. The method for operating a terminal facility for handling containers of claim 23 further comprises: providing a mobile device application operable on a smart electronic device that provides to an operator of a carrier vehicle that will pick up a container at the terminal facility and/or deliver a container to the terminal facility a tracking number that is associated with one or more of a bill of lading, a manifest, and a shipping document associated with the carrier vehicle and that causes the tracking number and geo-tagged carrier location data to be communicated to and stored in the database, whereby a record of carrier activity relating to the pick up and/or delivery of a container at the terminal facility is stored in the database for searching.

39. The method for operating a terminal facility for handling containers of claim 23 further comprising:

storing records of container shipping data and container shipping orders from manifests, bills of lading and other shipping documents in the relational database;

searching the relational database in response to a query to determine the presence of a container in the terminal facility, the location of a container in the terminal facility, the location of container handling equipment in the terminal facility, or any combination thereof;

generating orders relating to containers in the terminal facility and/or relating to container handling equipment in the terminal facility, and/or generating reports relating to containers in the terminal facility and/or relating to container handling equipment in the terminal facility; and operating the container handling equipment to execute the orders generated for locating and moving containers designated in the orders, and in the course thereof, communicating container identification data, container handling equipment location data and container handling equipment identification data to the relational database at least when the container handling equipment grasps a container and releases a container;

whereby records of the identification data and location data for each container and for each container handling equipment at the terminal facility stored in the relational database are updated as the orders are executed.

40. The method for operating a terminal facility for handling containers of claim 39 further comprises: providing a mobile device application operable on a smart electronic device that provides to an operator of a carrier vehicle that will pick up a container at the terminal facility and/or deliver a container to the terminal facility an order relating to the picking up of the container and/or the delivery of the container to the terminal facility and updates to that order.

41. A method for operating a terminal facility for handling containers, wherein the containers have container identifying information thereon and/or have an RFID device providing container identifying information, and wherein container handling equipment associated with the terminal facility include a lifting head for grasping, carrying and releasing containers and an equipment sensor set for providing container identification data from the container identifying information and/or the container RFID device when the container is proximate the container handling equipment and location data representing the location of the container handling equipment, and for communicating container identification data, equipment location data and equipment identification data;

the method for operating the terminal facility comprising:

sensing a container entering and/or exiting the terminal facility including:

imaging the container identifying information and/or reading the container RFID device or both for providing container identification data from the container identifying information and/or the container RFID device when the container enters the terminal facility and exits the terminal facility, and communicating the container identification data and location data to a relational database at least when a container enters the terminal facility and exits the terminal facility;

operating the lifting head of the container handling equipment for grasping, carrying and releasing containers including:

imaging container identifying information or reading the container RFID device or both for providing container identification data at least when the container handling equipment grasps a container and releases a container;

providing location data representing the location of the container handling equipment at least when the container handling equipment grasps a container and releases a container; and communicating container identification data, container handling equipment location data and container handling equipment identification data to the relational database at least when the container handling equipment grasps a container and releases a container;

whereby records of identification data and location data for each container and for each container handling equipment at the terminal facility are stored in the relational database;

the method further comprising:

sensing when the container handling equipment grasps a container and when the container handling equipment releases a container, and causing a record of the container identification data and the associated then present location data to be communicated to and stored in the relational database, whereby the relational database contains data records representing the then current location of each container at said terminal facility substantially in real time;

and/or receiving geo-tagged identification data and location data relating to carrier vehicles that are to arrive at the terminal facility to pick up a container and/or to deliver a container, and storing the geo-tagged identification data and location data relating to carrier vehicles as records in the relational database, whereby the relational database contains data records from which arrival times of the carrier vehicles at said terminal facility can be estimated; and wherein the providing location data representing the location of the container handling equipment includes:

sensing the location at a first part of the lifting head of the container handling equipment and sensing the location at a second part of the container handling equipment that is spaced apart from the first part of the lifting head thereof, wherein an orientation in azimuth of the lifting head is determinable from the location data for the first part of the lifting head and location data for the second part of the container handling equipment at times when the lifting head thereof grasps or releases a container, whereby the location and the orientation in azimuth of the container is determinable at times when the container is grasped and is released by the lifting head.

42. The method for operating a terminal facility for handling containers of claim 41 wherein the first part of the lifting head is a central part thereof and wherein:

the second part of the container handling equipment is on a second part of the lifting head that is spaced apart from the central part thereof; or the second part of the container handling equipment is on a chassis thereof.

* * * * *